US006561301B1

(12) United States Patent
Hattori et al.

(10) Patent No.: US 6,561,301 B1
(45) Date of Patent: May 13, 2003

(54) COLLISION DISCRIMINATING APPARATUS FOR VEHICLES

(75) Inventors: Katsuhiko Hattori, Aichi-ken (JP); Yoshikatsu Kisanuki, Aichi-ken (JP); Takayuki Kato, Aichi-ken (JP); Akio Kozato, Aichi-ken (JP); Tetsuzo Inoue, Aichi-ken (JP); Sadayuki Hayashi, Aichi-ken (JP); Kazuo Miki, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/256,209

(22) Filed: Feb. 24, 1999

(30) Foreign Application Priority Data

| Feb. 24, 1998 | (JP) | ............................................. | 10-060541 |
| Dec. 13, 1998 | (JP) | ............................................. | 10-375335 |
| Feb. 24, 1999 | (JP) | ............................................. | 11-046043 |
| Feb. 24, 1999 | (JP) | ............................................. | 11-046501 |

(51) Int. Cl.$^7$ ............................................. B60K 28/10
(52) U.S. Cl. ............................................. 180/274; 280/734
(58) Field of Search .................. 180/274; 340/436; 280/734

(56) References Cited

U.S. PATENT DOCUMENTS

| 5,419,407 A | | 5/1995 | Meyer et al. |
| 5,547,216 A | * | 8/1996 | Iwata et al. .................. 280/735 |

FOREIGN PATENT DOCUMENTS

| DE | 2 212 190 | | 9/1973 | |
| DE | 42 13 926 | | 11/1992 | |
| DE | 42 42 230 | | 6/1994 | |
| DE | 197 18 803 | | 10/1998 | |
| GB | 2270183 | * | 3/1994 | .................. 280/735 |
| JP | 8-216826 | | 8/1996 | |
| JP | 8-230610 | | 9/1996 | |
| JP | 11-28994 | | 2/1999 | |
| WO | WO97/18108 | | 5/1997 | |

* cited by examiner

*Primary Examiner*—Eric Culbreth
(74) *Attorney, Agent, or Firm*—Oblon, Spivak, McClelland, Maier & Neustadt, P.C.

(57) ABSTRACT

A collision discriminating apparatus for vehicles having a collision detection device mounted on a part of the vehicle to detect the deformed amount of a collided portion deformed by collision of a collision object against the vehicle, and a collision object presuming device for presuming what object collided against the vehicle on the basis of the deformed amount of the collided portion detected, and the vehicle speed when the vehicle collided.

22 Claims, 68 Drawing Sheets

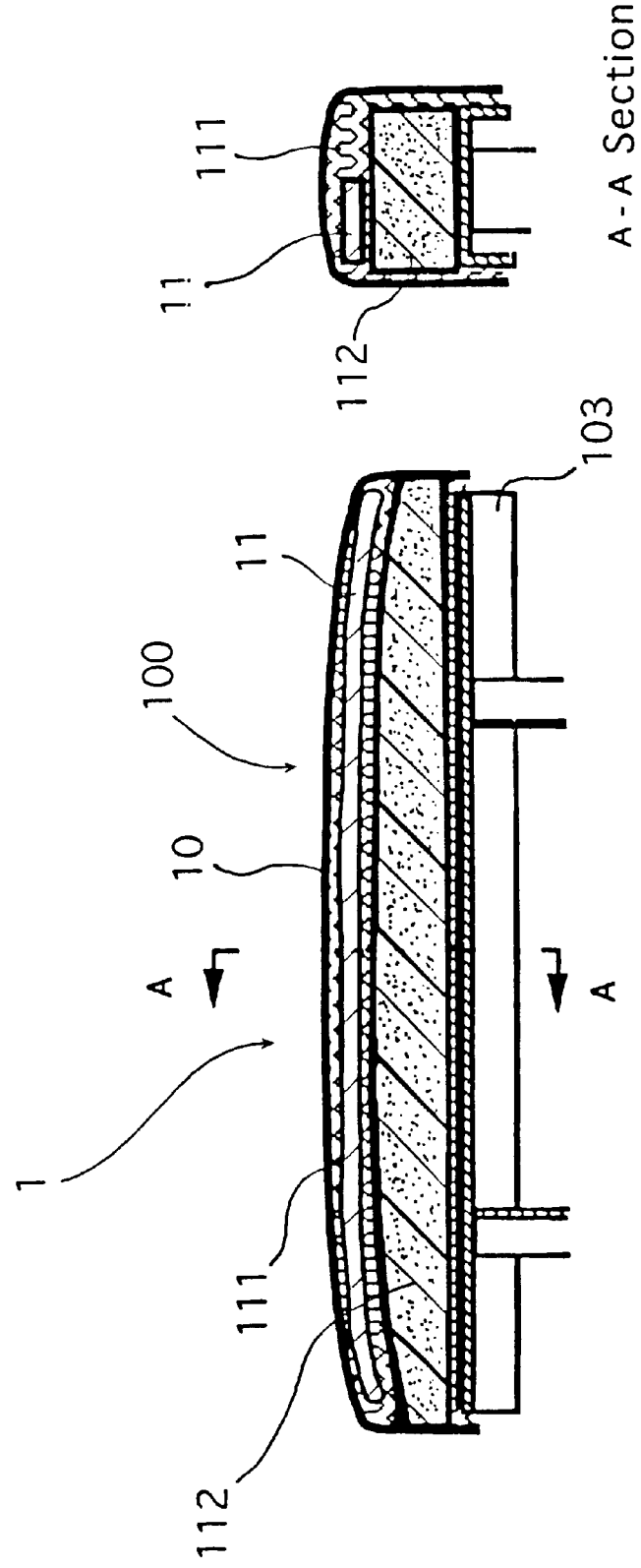

C.S.: COLLISION STRENGTH
P.P.D: PEDESTRIAN PROTECTION DEVICE

T0: TIME WHEN OUTPUT REACHES A THRESHOLD
T1: T0+Δt

T0: TIME WHEN OUTPUT REACHES A THRESHOLD
T1: T0+Δt
T2: T1+Δt

|  | PEDESTRIAN | POLE | VEHICLE |
|---|---|---|---|
| FIRST COLLISION DETECTION MEANS | X11>X10 | X11>X10 | X11>X10 |
| SECOND COLLISION DETECTION MEANS | X21<X20 | X21>X20 | X21>X20 |

S.M.M: SECOND MEMORY MEANS
C.D.M: COLLISION DETECTION MEANS
F.M.M: FIRST MEMORY MEANS
F.C.D.M: FIRST COLLISION DETECTION MEANS

C.S: COLLISION STRENGTH
P.P: PEDESTRIAN PROTECTION
O.P: OCCUPANT PROTECTION
M.M: MEMORY MEANS

F I G. 2 1 A
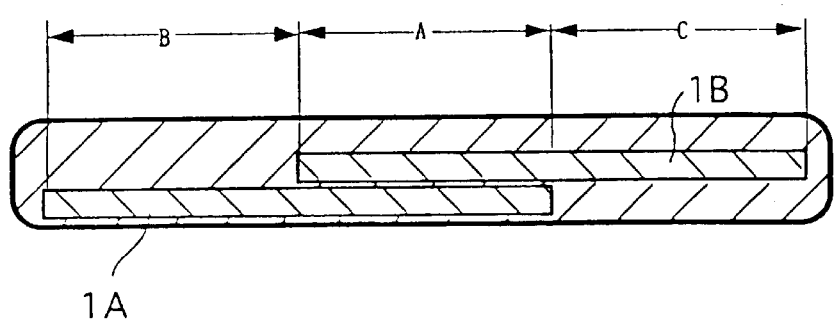
F I G. 2 1 B
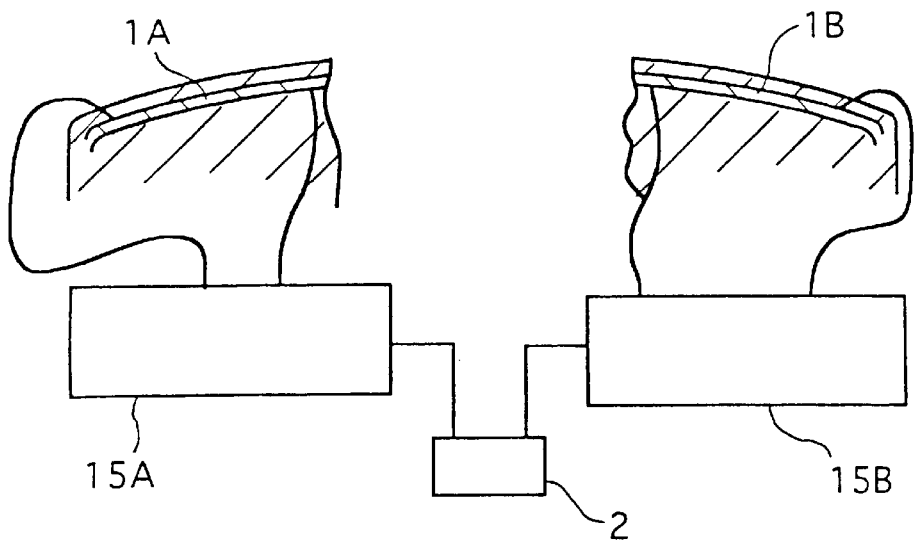

FIG. 22

| | FIRST COLLISION DETECTION MEANS | SECOND COLLISION DETECTION MEANS | COLLISION POSITION |
|---|---|---|---|
| WITH PEDESTRIAN | COLLISION STRENGTH E | COLLISION STRENGTH E | CENTER |
| WITH PEDESTRIAN | — | COLLISION STRENGTH E | RIGHT |
| WITH POLE | COLLISION STRENGTH D | — | LEFT |
| WITH VEHICLE — FRONT COLLISION | COLLISION STRENGTH A | COLLISION STRENGTH A | CENTER |
| WITH VEHICLE — OFFSET COLLISION | — | COLLISION STRENGTH A | RIGHT |
| WITH VEHICLE — OFFSET COLLISION | COLLISION STRENGTH A | — | LEFT |
| WITH VEHICLE — REAR-END COLLISION (STOPPED VEHICLE) | COLLISION STRENGTH B | COLLISION STRENGTH C | CENTER-LEFT |
| WITH VEHICLE — REAR-END COLLISION (RUNNING VEHICLE) | COLLISION STRENGTH C | COLLISION STRENGTH C | CENTER |

S.M.M: SECOND MEMORY MEANS
C.D.M: COLLISION DETECTION MEANS
F.M.M: FIRST MEMORY MEANS

C.S: COLLISION STRENGTH
P.P: PEDESTRIAN PROTECTION
O.P: OCCUPANT PROTECTION

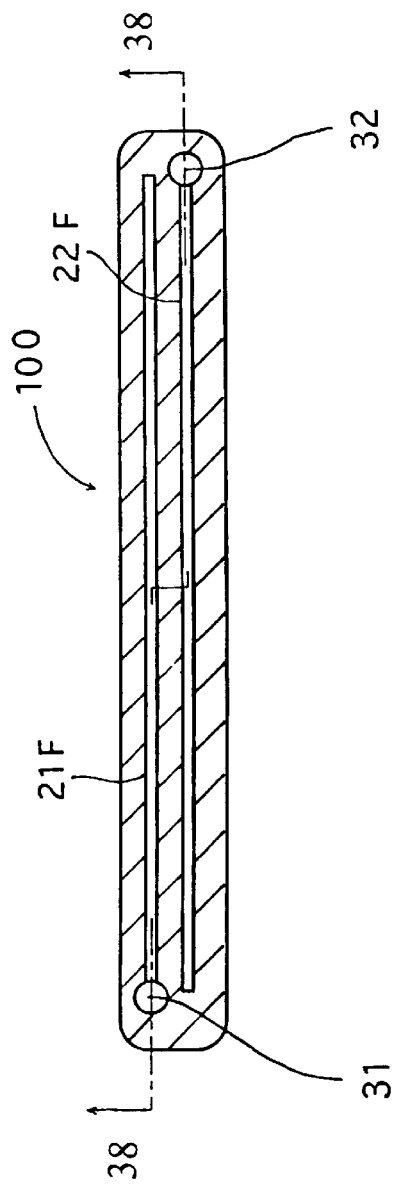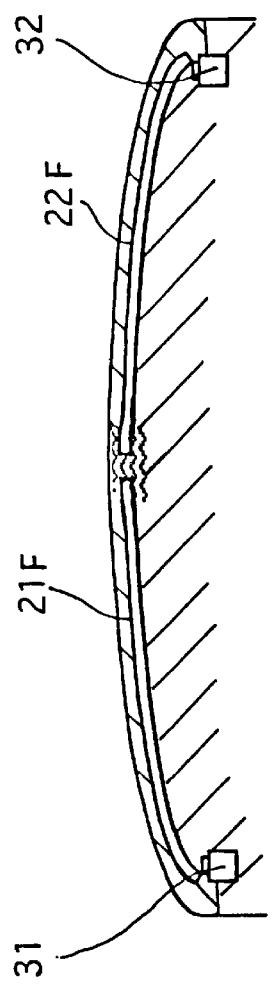
FIG. 37
FIG. 38

M.M: MEMORY MEANS
C.D.M: COLLISION DETECTION MEANS
F.M.M: FIRST MEMORY MEANS
P.P: PEDESTRIAN PROTECTION
O.P: OCCUPANT PROTECTION
C.S: COLLISION STRENGTH

CONDUCTTIVE WIRE COATED WITH INSULATOR

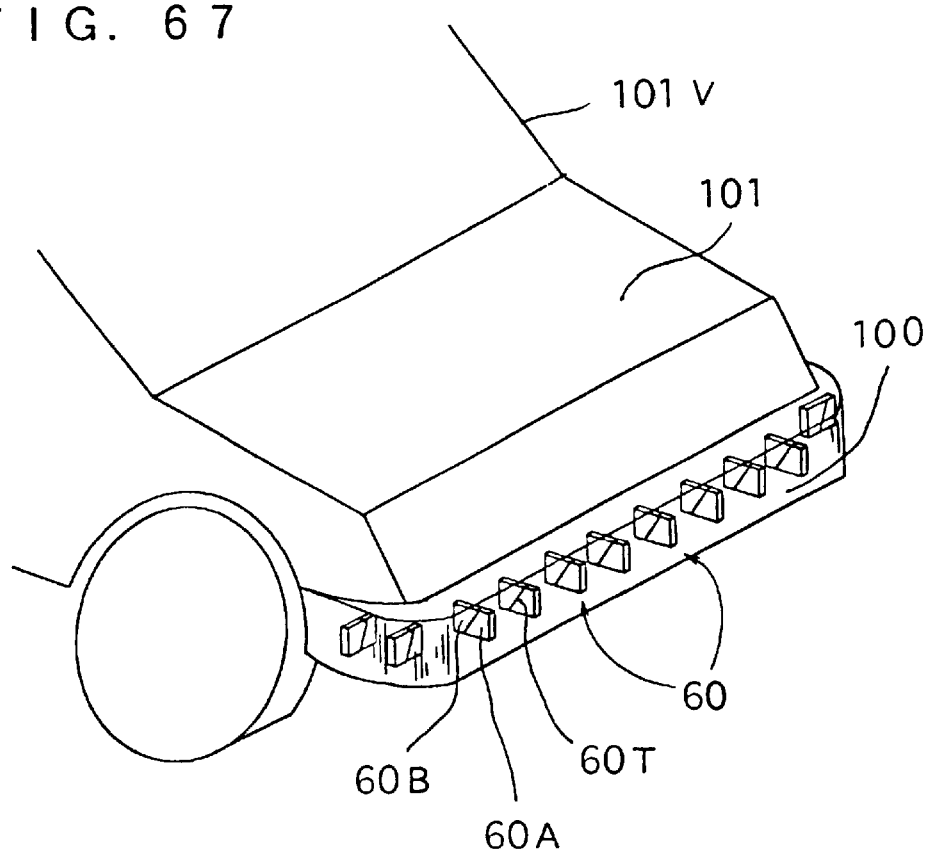
F I G. 67

COLLISION DISCRIMINATING APPARATUS FOR VEHICLES

BACKGROUND OF THE INVENTION

1. Field of the Invention

The present invention relates to a collision discriminating apparatus for vehicles for presuming a collision object collided against the vehicle on the basis of the deformed amount of a collided portion caused by the collision of the collision object against the vehicle, and the vehicle speed when the vehicle collided.

The present invention also relates to a collision discriminating apparatus for vehicles comprising a collision object presuming means for presuming a collision object on the basis of an output signal from a collision detection means for detecting collision from deformation of a collided surface of the vehicle, the apparatus comprising a judgement means for judging the collision object from the strength of collision by comparing an electric signal from an electrostatic capacity type collision detection sensor for detecting a change of electrostatic capacity accompanied by collision of a dielectric comprising opposed electrodes disposed with a suitable distance therebetween on the collided surface and an elastic substance interposed between the opposed electrodes, with data on a map prepared for every vehicle speed in advance and stored to thereby judge the collision object the strength of the collision.

The present invention further relates to a collision discriminating apparatus for vehicles in which pressure of a incompressive fluid within a chamber of a detection portion mounted on a part of the vehicle is detected at the time of collision with a collision object, and the collision object is presumed by a rising pattern of a pressure waveform resulting from collision with the collision object on the basis of a pressure signal within the chamber according to the collision with the collision object detected.

The present invention further relates to a collision discriminating apparatus for a vehicle comprising a collision detection means for detecting, in the collision between the vehicle and a pedestrian or other obstacles, the collision with the collision object as a change of an electric signal accompanied by a change of a connection in an electric circuit network, and a collision object presuming means for presuming a collision object on the basis of detection information detected by the collision detection means.

2. Description of the Related Art

In the conventional collision detector for an unmanned carrier (Japanese Patent Application Laid-Open No. 60-191855), a fluid is sealed into an outer peripheral portion of the vehicle body B, and a tube T having an elasticity is provided, as shown in FIG. 72 whereby a change of internal pressure caused by deformation of the tube T as the collision occurs is measured by a pressure sensor P to detect collision of the vehicle body.

In the embodiment, the pressure sensor P is constituted by a pressure switch, and when pressure generated by collision exceeds a certain reference value, the contact is short-circuited, and a control circuit causes the vehicle to be stopped. There is no description that a change of a pressure level is subjected to sampling.

Further, in the conventional pedestrian protective safety device (U.S. Pat. No. 4,249,632), a pedestrian protective device is actuated by a trigger signal of a collision detection sensor S of a bumper portion BP, as shown in FIG. 73. The device is constituted by the pedestrian collision detection sensor S mounted on the front bumper BP of the vehicle and one or a plurality of displacement means G for raising a bonnet BN.

The displacement means G has a gas bag, and there are the case of raising the rear end of the bonnet BN, and the case of raising both the front and the rear end thereof. This gas bag operates as follows: the sensor S incorporated into the bumper BP outputs a trigger signal at the time of collision, and the gas is generated by an inflator of the thrust device.

Further, the conventional hood air bag sensor system (Japanese Patent Application Laid-Open No. 8-216826) relates to a pedestrian collision discriminating apparatus for positively developing a hood air bag F as a pedestrian protective device at the time of collision with a pedestrian as shown in FIG. 74.

In the pedestrian collision discriminating apparatus, as a means for detecting that a pedestrian comes into collision with the vehicle, the collision with the pedestrian is judged when both two signals from the bumper sensor S embedded into the bumper BP and a hood sensor FS incorporated into the hood edge are input.

The bumper sensor S is prepared in the procedure described below. A conductive rubber integrally pressed by a silicone rubber having metal fine particles blended therewith is sandwiched from opposite sides by two electrodes each comprising a bundle of plain-woven copper wires, and the outside thereof is integrally coated with the silicone rubber to be lengthy. The hood sensor S is turned "ON" when a load is applied to the front end of the hood to provide the electric conductive state.

In other conventional occupant protective devices, an acceleration for the vehicle body is detected, and when a level thereof exceeds a predetermined level, the air bag in the vehicle is developed. It is generally well known that as described above, occupants are protected from the obstacle. The position in the compartment or the presence of an occupant is detected to set adequate developing conditions.

It is known that when the pedestrian comes into collision with the running vehicle, the lower limbs of the collided pedestrian are dipped up by the vehicle, and after this, the pedestrian comes into collision with the bonnet. According to the conventional pedestrian collision discriminating apparatus and method (Japanese Patent Application Laid-Open No. 08-216826), in the hood air bag sensor system as shown in FIG. 75, a contact sensor S is installed on the bumper portion, and a hood sensor F is installed on the hood edge portion, whereby in the case where the vehicle C comes into collision with the pedestrian H, when signals are detected first by the bumper sensor S and detected next by the hood sensor F in said order, it is judged that a collided body be the pedestrian, and the air bag G is developed. However, in the case other than said order or in the case of detection of only one, it is judged that a collided body be that other than pedestrian, and the air bag G is not developed.

In a collision detection switch of the conventional occupant protecting apparatus for vehicles, as shown in FIG. 76, an annular insulating member Z is fallen into a locating pin R protruded from a first electrode F secured to a recess of a side lace S, and conductive rubber D formed with a plurality of holes and a second electrode T are further fallen therein. Then the switch is inserted into a mounting hole bored in advance in an outer panel such as a door of the vehicle and secured by a fixing member.

In the collision detection switch, when the collision object collides from the sideways of the vehicle, and an external force in excess of a predetermined value is applied whereby the conductive rubber D becomes deformed, the resistance between the first electrode F and the second electrode T is varied to detect the collision.

Further, in the conventional vehicle collision sensor for sensing breakage, as shown in FIG. 77, a conductive rod RD is coaxially disposed in a conductive tube C, and at least two annular insulating means RZ are interposed in order to insulate the rod RD from the tube C.

At the time of collision of the vehicle, the conductive tube C is deformed by the force in excess of a predetermined magnitude, and the tube C comes in contact with the rod RD according to the breakage of the vehicle to detect the collision.

In the conventional pedestrian sensing device (Japanese Patent Application Laid-Open No. 11-28994) a time period, which output signal from a collision sensor is higher than a threshold level and reference time period are compared. When the detected time period is shorter than the reference time period, pedestrian protection device is operated.

In the above-described collision detector for an unmanned carrier, the means for detecting the collision replaces the deformation of the tube into which fluid is sealed with the change of pressure. This poses a problem in that what body is collided cannot be judged though there is a difference depending on a degree of collision.

Particularly, in the case where a pressure switch is used as in the embodiment, the body cannot be detected unless it is deformed over the wide range and to some extent, and it is not completely possible to determine what is collided. In the case of the unmanned carrier which runs at low speeds, this will suffice, but in the vehicles such as an automobile which runs on the road at various speeds, it is necessary to vary how to operate the protective device according to the object to be collided.

When a fluid is merely sealed, the tube T expands and contracts due to the heat therearound in the normal state, whereby a pressure level is varied. Therefore, for detecting a fine pressure change, it is necessary to provide a control circuit capable of detecting the pressure change. However, the above-described conventional apparatus has no description therefor. Judging from the embodiments, a pressure level taking expansion and contraction due to heat into consideration is set, and judgement can be merely made whether or not a level exceeds the aforesaid pressure level. Therefore, it is difficult to detect the strength of collision which varies with the vehicle speed or the collision object.

In the above-described conventional pedestrian protective safety device, since the collision is detected merely by the sensor S housed in the bumper portion BP, it poses a problem in that the safety device is to operate not only at the time of collision with the pedestrian but also at the time of collision with the vehicle.

In the above-described conventional hood air bag sensor system, since the collision with the pedestrian is not judged unless both the bumper sensor S and the hood sensor FS are turned ON, the judgement of the collision cannot be made till at least the pedestrian collides with the hood. Therefore, there is no time to spare for operating the pedestrian protective device, this posing a problem in that a protective device which responds at high speeds is desired.

Further, there is a possibility of posing a problem in that even in the case where the vehicle collides with trees or the like so that the trees are broken and fallen on the hood sensor, a signal similar to that in the case of a pedestrian is output.

In other conventional occupant protective devices, a threshold is set to a fixed acceleration level in order to prevent the erroneous operation. Thereby, a relatively small acceleration as in the collision with the pedestrian is less than the threshold, and there is a possibility that in the collision between the pedestrian and the vehicle at middle and low speeds, particularly, at a low speed, information capable of judging the collision with the pedestrian cannot be obtained.

In the above-described hood air bag sensor system and method, when signals are detected first by the bumper sensor S and next by the hood sensor F, in said order, the collision body is judged to be a pedestrian so that an air bag G on the bonnet is developed. However, there is a problem in that in the case where the pedestrian perceives a danger of collision and tries to avoid the collision, the pedestrian instantaneously acts to restrain the vehicle by hands. In such a case, the hands and bonnet first come in contact, after which the lower limbs come in contact with the bumper. As a result, the contact of the pedestrian with the vehicle sometimes does not result in the development of the air bag G.

Further, in some case, both the bonnet portion and the bumper portion come in instantaneous contact with a pedestrian irrespective of the pedestrian's consciousness depending on the vehicle-body condition and vehicle-speed conditions. Analyzing in more detail the contact order of the running vehicle with the pedestrian, this does not always occur in the order of the bumper and the hood as assumed in the above-described conventional apparatus and method but its order sometimes changes depending on the conscious conditions of the pedestrian or the vehicle body and vehicle speed conditions, etc. Since the definite discrimination between the pedestrian and those other than the pedestrian cannot be made, which poses a problem in that the pedestrian is possibly erroneous decided to be those other than the pedestrian. There is a further problem in that it requires time till detection by the hood sensor so that a small power protective device is delayed in operation.

Further, even if judgement could be made that the collision object is a person or a vehicle, it is not possible to judge at which position the pedestrian collides, or the front collision or the offset collision of the vehicle. In the case where the vehicle bumps into the rear of a truck, an erroneous judgement possibly occurs.

Furthermore, the above-described conventional occupant protecting apparatus is constituted on the assumption that a sensor for detecting collision is properly operated even at the time of collision. However, there is a problem in that actually, a part of a sensor is damaged due to the collision so that the sensor is not properly operated, as the case may be.

In the conventional pedestrian sensing device, the detected time period exceeding the threshold level is compared with the reference time period, an amplitude of the detected signal is not checked in order to check the collision strength.

Accordingly the conventional pedestrian sensing device cannot presume accurately the collision objects such as vehicle, fixed object and pedestrian.

SUMMARY OF THE INVENTION

It is a general object of the present invention to provide a collision discriminating apparatus for vehicles enabling a prediction of the collision object, that is, the discrimination between the collision with the pedestrian and the collision with the vehicle or other obstacles.

It is a more specific object of the present invention to provide a collision discriminating apparatus for vehicles wherein the deformed amount of a collided portion deformed by the collision of the collision object against the vehicle is detected, and the collision object which comes in collision with the vehicle is presumed on the basis of the deformed amount of the collided portion detected and the vehicle speed of the vehicle before or when the vehicle collided.

It is another object of the present invention to provide a collision discriminating apparatus positively discriminating whether or not the collision object is a pedestrian or those other than the pedestrian to enable selection of operation for a pedestrian protection or an occupant protection.

It is still another object of the present invention to provide a collision discriminating apparatus for vehicles comprising a collision object presuming means for presuming a collision object on the basis of an output signal from a collision detection means for detecting collision from deformation of the collided surface of the vehicle, wherein the change in electrostatic capacity as a result of collision between opposed electrodes disposed at a suitable distance on or within said collided surface and a dielectric comprising an elastic substance interposed between said opposed electrodes is detected and compared with data on a map prepared and stored for every vehicle speed in advance to determine the collision object from the strength of collision.

It is a still further object of the present invention to provide a collision discriminating apparatus for vehicles in which pressure of a incompressive fluid within a chamber of a detection portion mounted on a part of the vehicle when collided with the collision object is detected, and the collision object is presumed by a rising pattern of a pressure waveform caused by the collision of the collision object on the basis of a pressure signal in the chamber according to the collision with the collision object.

It is a yet further object of the present invention to provide a collision discriminating apparatus for vehicles wherein a portion to be positively broken by the collision between the vehicle and the collision object is prepared in advance to presume the collision object from how the portion is broken (quantities and shapes).

It is a yet further object of the present invention to provide a collision discriminating apparatus for vehicles in which the change of a connection in an electric circuit network disposed on a part of the vehicle corresponding to the deformed amount of a collided portion deformed according to the size and the shape of the collision object caused by the collision of the collision object against said vehicle is detected as an electrical signal; and the size and the shape of the collision object collided against the vehicle is presumed on the basis of the change amount of the electric signal corresponding to the deformed amount of a collided portion detected to thereby presume the collision object.

It is an object of the present invention to provide a collision discriminating apparatus for vehicles comprising: a collision detection means mounted on a part of a vehicle to detect a deformed amount of a collided portion deformed by collision of a collision object against the vehicle; and a collision object presuming means for presuming the collision object collided against the vehicle on the basis of the deformed amount of the collided portion detected.

It is another object of the present invention to provide a collision discriminating apparatus for vehicles wherein the collision object presuming means comprises means for presuming the collision object based on a time variation (a variation per unit time) of the deformed amount.

It is a further object of the present invention to provide a collision discriminating apparatus for vehicles comprising: a collision detection means mounted on a part of a vehicle to detect a deformed amount of a collided portion deformed by collision of a collision object against the vehicle; and a collision object presuming means for presuming the collision object collided against the vehicle on the basis of the deformed amount of the collided portion detected, and a vehicle speed before or when the vehicle collided.

It is a still further object of the present invention to provide a collision discriminating apparatus for vehicles wherein the collision object presuming means comprises a means for presuming the collision object by comparing a time variation of the deformed amount with judgement reference data stored in advance.

It is a yet further object of the present invention to provide a collision discriminating apparatus for vehicles comprising: a collision detection means for detecting collision from deformation of a collided surface of a vehicle; and a collision object presuming means for presuming a collision object on the basis of an output signal from the collision detection means, wherein the collision detection means comprises an electrostatic capacity type collision detecting sensor for detecting the change in electrostatic capacity caused by the collision to output an electric signal, and including opposed electrodes disposed at a suitable distance on or within the collided surface and an elastic substance as a dielectric interposed between the opposed electrodes; and the collision object presuming means comprises a judgement means for judging the collision object from a time variation (a variation per unit time) of the electric signal, that is, from the strength of the collision by comparing the electric signal from the collision detection means with data on a map prepared and stored for vehicle speed in advance.

It is a yet further object of the present invention to provide a collision discriminating apparatus for vehicles wherein the collision detection means further comprises an electrostatic capacity detection circuit for detecting a floating capacity generated between one of the opposed electrodes and a pedestrian; and the collision object presuming means further comprises a discriminating means for discriminating between the pedestrian and an obstacle by comparing an output value of the floating capacity from the electrostatic capacity detection circuit with a threshold before the pedestrian or the obstacle comes into collision with the collided surface.

It is another object of the present invention to provide a collision discriminating apparatus for vehicles comprising: a pressure detection means which comprises a detection portion mounted on a part of a vehicle and a chamber into which an incompressive fluid is sealed and being deformable according to a collision against a collision object, and detects pressure within the chamber at the time of the collision to output a pressure signal; and a collision object presuming means for presuming the collision object from a rising pattern of a pressure waveform caused by the collision on the basis of the pressure signal corresponding to the collision output by the pressure detection means.

It is a further object of the present invention to provide a collision discriminating apparatus for vehicles wherein the detection portion comprises a vehicle body side member formed from a hard material and a surface side member formed from a soft material, and the chamber is formed within the surface side member.

It is a still further object of the present invention to provide a collision discriminating apparatus for vehicles comprising: a collision detection means which comprises an electric circuit network disposed on a part of a vehicle and detects, as a change of an electric signal, a change of a connection in the electric circuit network corresponding to a deformed amount of a collided portion deformed by a collision of a collision object against the vehicle and according to a size and a shape of the collision object; and a collision object presuming means for presuming the collision object by presuming the size and the shape of the collision object on the basis of the change amount of the electric signal corresponding to the deformed amount of the collided portion detected.

It is a further object of the present invention to provide a pedestrian collision discriminating apparatus wherein the electric circuit network of the collision detection means comprises a wiring disposed on a part of the vehicle, a part of the wiring disposed on the collided portion is constituted to be cut, in response to the collision and the cutting of the wiring in the collided portion is detected as a change of a voltage signal.

According to the present invention, a collision detection means mounted on a part of a vehicle detects a deformed amount of a collided portion deformed by collision of a collision object against the vehicle; and a collision object presuming means presumes the collision object collided against the vehicle on the basis of the deformed amount of the collided portion detected, and the vehicle speed when the vehicle collided. This exhibits the effect of enabling the presumption of the collision object, that is, the discrimination between the collision with the pedestrian and the collision with the vehicle or other.

According to the present invention, the collision object presuming means presumes the collision object by comparing a time variation (a variation per unit time) of said deformed amount with judgement reference data stored in advance. This exhibits the effect of capable of more accurately performing the presumption of the collision object, in addition to the operation and effect of the intention.

According to the present invention, the electrostatic capacity type collision detection sensor constituting the collision detection means detect the change in electrostatic capacity resulting from the collision by opposed electrodes disposed with a suitable distance therebetween on or within said collided surface and an elastic substance as a dielectric interposed between the opposed electrodes to output an electric signal, and the judgement means constituting the collision object presuming means compares the electric signal from the collision detection means with data on a map prepared and stored for every vehicle speed in advance to thereby judge the collision object from the strength of the collision.

According to the present invention, the change in electrostatic capacity resulting from the collision is detected by the opposed electrodes disposed at fixed intervals on the collided surface and an elastic substance as a dielectric interposed between the opposed electrodes to output an electric signal, and the judgement means compares the output electric signal with data on a map prepared and stored for every vehicle speed in advance to thereby judge the collision object from the strength of the collision. This exhibits the effect of positively discriminating whether or not the collision object is a pedestrian or those other than the pedestrian and enabling the selection of operation of pedestrian protection or occupant protection.

According to the present invention, the electrostatic capacity detection circuit constituting the collision detection means detects, prior to the collision, a floating capacity generated between one of the opposed electrodes of the electrostatic capacity type collision detection sensor and a pedestrian, and the discriminating means compares the output value of the floating capacity from the electrostatic capacity detection circuit with the threshold before the pedestrian or the obstacle comes into collision with the collided surface of said collision detection means to discriminate a pedestrian from the obstacle.

According to the present invention, the electrostatic capacity detection circuit detects, prior to the collision, a floating capacity generated between one of the opposed electrodes of the electrostatic capacity type collision detection sensor and a pedestrian, and the discriminating means compares the output value of the floating capacity from the electrostatic capacity detection circuit with the threshold before the pedestrian or the obstacle comes into collision with the collided surface of said collision detection means to discriminate a person from the obstacle. This exhibits the effect of enabling the discrimination between a person and the obstacle prior to collision.

According to the present invention, the deformable chamber formed on the detection portion mounted on a part of the vehicle and into which a incompressive fluid is sealed is deformed according to the collision against a collision object, and the pressure detection means detects pressure within the chamber at the time of collision with said collision object and outputs a pressure signal; and a collision object presuming means presumes the collision object by a rising pattern of a pressure waveform caused by the collision of said collision object on the basis of the pressure signal according to the collision with said collision object output by the pressure detection means. This exhibits the effect of enabling the presumption of the collision object, that is, the discrimination between the collision with a pedestrian and the collision with the vehicle.

According to the present invention, the vehicle body side member of the detection portion mounted on a part of the vehicle is formed from a hard material, the surface side member of the detection portion is formed from a soft material, and said chamber is formed in said surface side member so that the chamber is deformed according to the collision object and the strength of the collision. This exhibits the effect that the pressure detection means accurately detects the pressure in the chamber at the time of collision with the collision object to enable the accurate presumption of the collision object, that is, the positive discrimination between the collision with a pedestrian and the collision with the vehicle.

According to the present invention, the collision detection means detects, as a change of an electric signal, the change of a connection in the electric circuit network disposed on a part of the vehicle corresponding to the deformed amount of a collided portion deformed by the collision of the collision object against said vehicle and according to the size and the shape of the collision object; and the collision object presuming means presumes the collision object by presuming the size and the shape of the collision object collided against the vehicle on the basis of the change amount of the electric signal corresponding to the deformed amount of a collided portion detected. This exhibits the effect to enable the presumption of the collision object, that is, the discrimination between the collision with a pedestrian and the collision with the vehicle or other obstacles.

According to the present invention, the cutting of the wiring constituting the electric circuit network disposed in the collided part of the vehicle against which collision object collided is detected as a change of a voltage signal. This exhibits the effect that the size and the shape of the collision object is positively presumed by a simple sensor to thereby enable positively presuming the collision with a pedestrian, vehicles and other obstacles.

BRIEF DESCRIPTION OF THE DRAWINGS

FIGS. 2A and 2B are sectional views in different section showing a collision detection means according to the first aspect and the first embodiment;

FIGS. 21A and 21B are a vertical sectional view and a horizontal sectional view respectively showing an arrangement in a bumper of a collision detection portion in a collision discriminating apparatus for vehicles according to a seventh embodiment;

FIG. 22 is a matrix view showing a relationship between outputs of the first and second collision detection means, a collision position and a collision object acceding to the seventh embodiment;

FIG. 37 is a sectional view showing a modification of a sensor arrangement according to the eleventh embodiment;

FIG. 38 is a sectional view taken on line abcd of FIG. 37 in a modification of according to eleventh embodiment;

FIG. 67 is a perspective view showing the disposition form of a collision detection means in a pedestrian collision discriminating apparatus according to a twenty-first embodiment into a bumper;

DETAILED DESCRIPTION OF THE PREFERRED EMBODIMENTS

Various aspects of the present invention will now be explained with reference to the drawings.

The collision discriminating apparatus for vehicles according to a first aspect of the invention will be explained with reference to FIGS. 1 to 3B.

Figure 1:
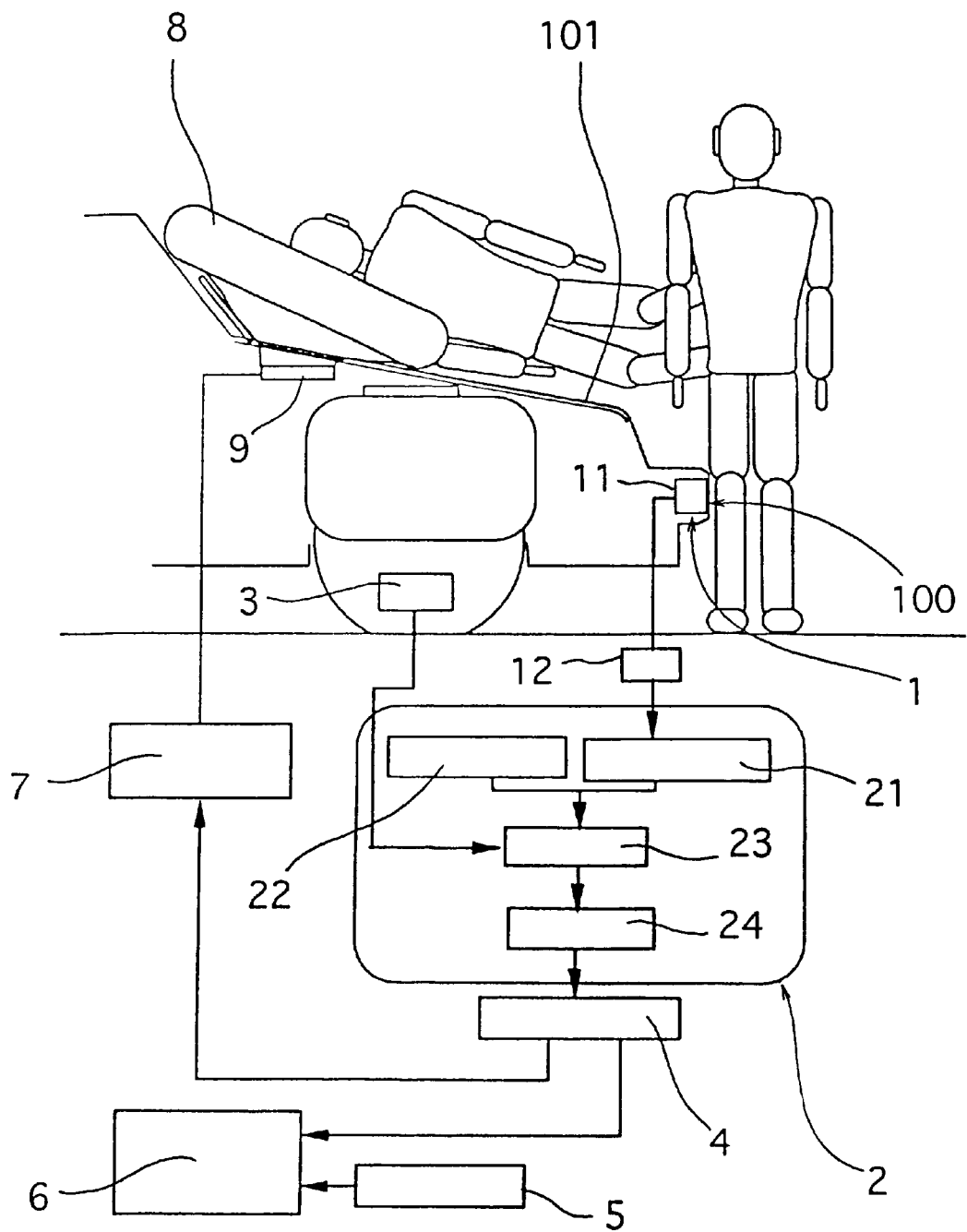
FIG. 1 is a block diagram showing a collision discriminating apparatus for vehicles according to a first aspect and a first embodiment of the present invention.

The collision discriminating apparatus for vehicles according to a first aspect is applied to the vehicle having either occupant protective device or a pedestrian protective device, or both of these devices. The collision discriminating apparatus comprises, in the collision of the vehicle with a pedestrian or other obstacles, a collision detection means 1 for detecting collision, and a collision-state presuming means 2 for presuming information or against what collided from the vehicle speed in addition to the information, as shown in FIG. 1.

The collision detection means 1 is sometimes mounted not only on the front portion of the vehicle, but in the case where an occupant protective device for rear collision is mounted, on the rear portion of the vehicle, and in the case where an occupant protective device for side collision is mounted, on the side of the vehicle. Further, the operation selection means is not necessary in the case where one protective device is provided, or if the protective device has function capable of judging information of the collision discriminating apparatus.

The collision detection means 1 is mounted on the front portion or the rear portion or the side portion of the vehicle to detect the size of those portions deformed (deformed amount) according to the collision load generated by collision. For example, the deformation of a bumper widthwise is not uniform depending on the collision conditions. The collision detection means 1 is to detect the deformation that is not uniform as an average deformation.

The collision detection means 1 is a bumper collision deformation measuring type collision detection sensor from which is output an electric signal obtained by integrating a collision load, that is, a deformation force per unit width generated by collision with the collided body on the vehicle. This measures the deformation of the bumper over a major portion of the width. The detection methods that can be used include measurements of physical amounts such as fluid pressure, electrostatic capacity, displacement, magnetic strength, and electric resistance.

The collision state presuming means 2 quantitatively extracts characteristics of the magnitude and the change by the time of an electric signal from the collision detection means 1 to compare the characteristic value thereof with judgement reference data prepared in advance to judge what collided with the vehicle. The collision state presuming means 2 comprises a first memory means 21 for storing input signals subjected to sampling at fixed time intervals, a second memory means 22 for storing judgement reference data for judging collision bodies at every vehicle speed, and a comparison means 23 for ranking the strength of collision on the basis of data of these memory means.

The judgement reference data are used to consider that in the case where collision is made with a pedestrian, the deformed amount of the bumper is different with the vehicle speed, and the higher the vehicle speed, the more the bumper is deformed. That is, since the output of the collision detection means 1 increases as the deformation increases, the judgement reference data are determined so that output levels at the time of collision with a pedestrian are preexamined at every vehicle speed by a dummy test or the like, and the collision with a pedestrian can be distinguished from the collision with a vehicle referring to the output levels. The collided bodies and the collision state are judged by a judgment means 24 on the basis of comparison results by the comparison means 23 in accordance with the vehicle speed detected by a vehicle speed sensor 3.

An operation selection means 4 is a selection means for deciding, in the case of a plurality of protective devices, which protective device should be operated, and is provided at the rear of the collision state presuming means 2. The protective device protects an occupant and a pedestrian simultaneously, or protects either of them. A pedestrian protective device 8 is an air bag on the bonnet, or the bonnet is raised a fixed amount to absorb shocks of a head, a chest and the like of a pedestrian subjected to collision and protect them. An occupant protective device 6 is an air bag on a steering or a dashboard or on the occupant side.

The collision discriminating apparatus for vehicles according to a first aspect constructed and operated as described above presumes the collision object collided with the vehicle on the basis of the deformed amount of the collided portion detected and the detected vehicle speed at the time of collision with the vehicle. This exhibits the effect of enabling the presumption of the collision object, that is, the distinction between the collision with a pedestrian, the collision with a vehicle, and the collision with other obstacles, and enabling the operation of the protective device corresponding thereto.

Figure 12:
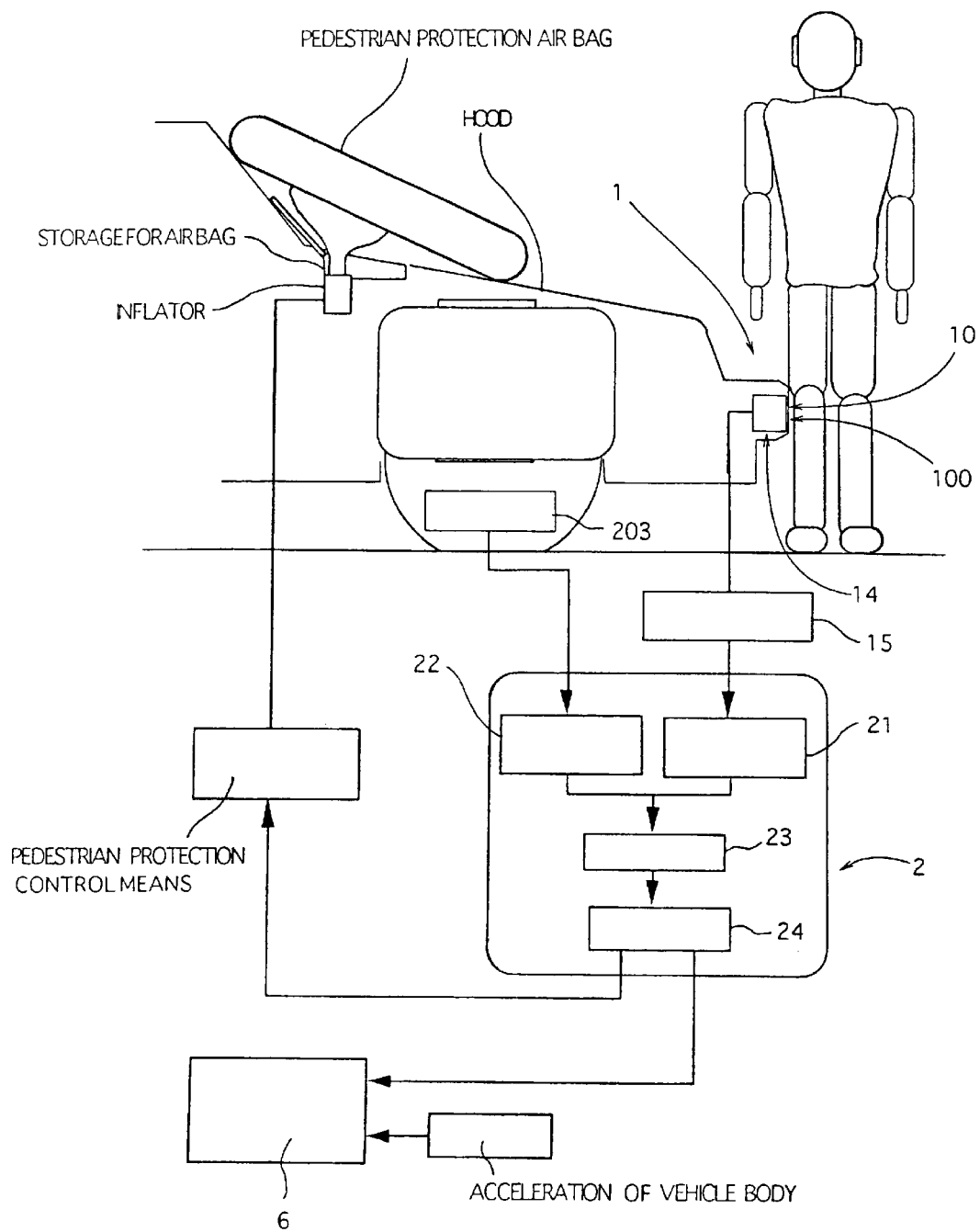
FIG. 12 is a block diagram showing a collision discriminating apparatus for vehicles according to a second aspect and a fifth embodiment of the present invention.
Figure 13:
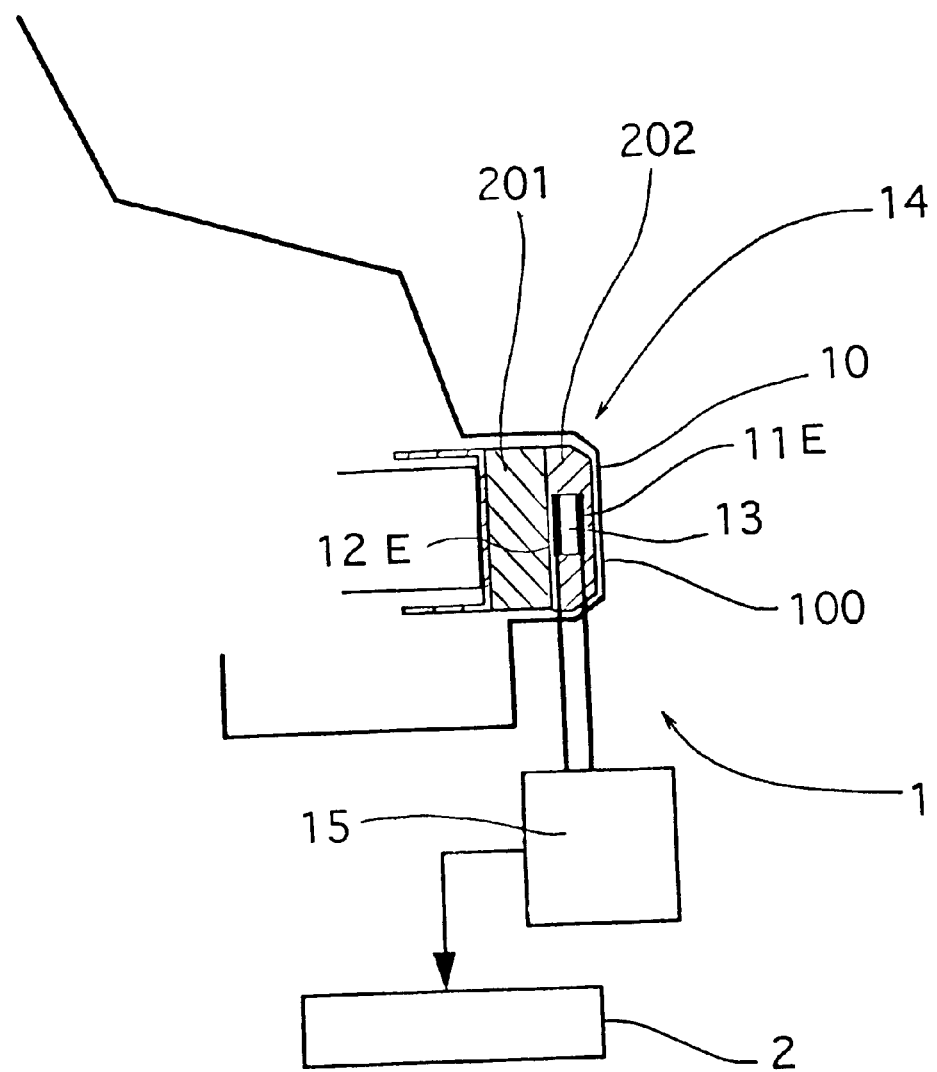
FIG. 13 is a block diagram showing a collision detection means of the collision discriminating apparatus for vehicles according to the fifth embodiment.

A collision discriminating apparatus for vehicles according to a second aspect of the invention, as shown in FIGS. 12 and 13, includes a collision detection means 1 for detecting collision from deformation of the collided surface 10 of the vehicle, and a collision object presuming means 2 for presuming a collision object on the basis of an output signal from the collision detection means 1, wherein the collision detection means 1 comprises a sensor portion 14 constituted by a dielectric 13 comprising opposed electrodes 11E and 12E (see FIG. 13) disposed at fixed intervals on the collided surface and an elastic substance interposed between the opposed electrodes, and an electrostatic capacity type collision detecting circuit for detecting the change in electrostatic capacity caused by the collision to output an electric signal; and the collision object presuming means 2 comprises a judgement means 24 for judging the collision object from the change by the time of the electric signal, that is, from the strength of the collision by comparing the electric signal from said collision detection means 1 with data on a map prepared at every vehicle speed in advance and stored.

The collision detection means 1 comprises, as shown in FIG. 13, one or more electrostatic capacity type collision detection sensor portions 14 inserted into a bumper 100 of the vehicle or mounted on the collided surface 10 of the bumper 100 and constituted by two opposed electrodes 11E and 12E disposed at fixed intervals and a dielectric 13 interposed therebetween, and an integral or separately provided electrostatic capacity detection circuit 15.

The opposed electrodes 11E and 12E are preferably not resistant to expansion and contraction of the dielectric 13. The dielectric 13 is formed of an elastic substance having a moderate elasticity, preferably rubber having a high permittivity such as acrylonitrilebutadiene rubber.

In the electrostatic capacity detection circuit 15, methods for converting the electrostatic capacity value for detection of electrostatic capacity that can be employed include a method for converting into frequency, a method for converting into phase, and the like.

The collision object presuming means 2 compares an electric signal from the collision detection means 1 with data on a map prepared in advance at every vehicle speed to discriminate the strength of collision and judge what collided with the vehicle and comprises a first memory means 21 for storing electrostatic capacity signal voltages subjected to sampling, a second memory means 22 for storing a threshold at every vehicle speed and a reference value for discriminating the strength of collision, a comparison means 23 for comparing an input signal of the first memory means 21 with comparison data of the second memory means 22 to judge the strength of collision, and a judgement means 24 for discriminating a collided body from the strength of collision to judge and decide an operating signal of a protective device 6 to be operated.

The judgement means 24 constituting the collision object presuming means 2 is provided with an operation selection means for judging pedestrian protection for operating an air bag for protecting a pedestrian through a pedestrian protection control means from an output signal thereof, or occupant protection for operating an air bag for protecting an occupant in a compartment.

The collision discriminating apparatus for vehicles according to a second aspect constructed as described above integrates an output of electrostatic capacity from the collision detection means 1 for a fixed time to judge the collision in the case where said value exceeds the threshold. This exhibits the effect capable of preventing an error in the case where noises are included in the output, and preventing erroneous operation of various protective devices.

Figure 23:
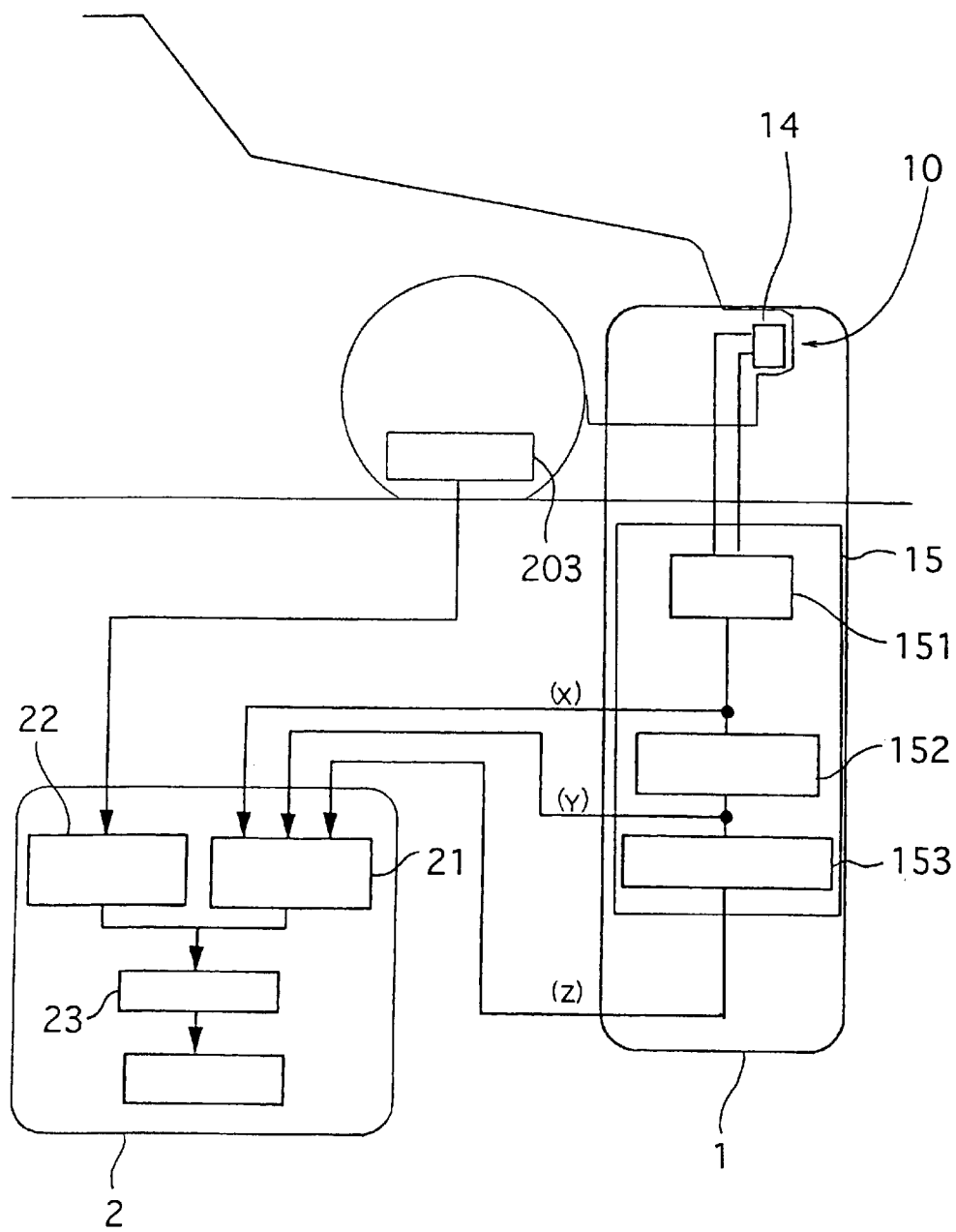
FIG. 23 is a block diagram showing a collision discriminating apparatus for vehicles according to the eighth embodiment.
Figure 25:
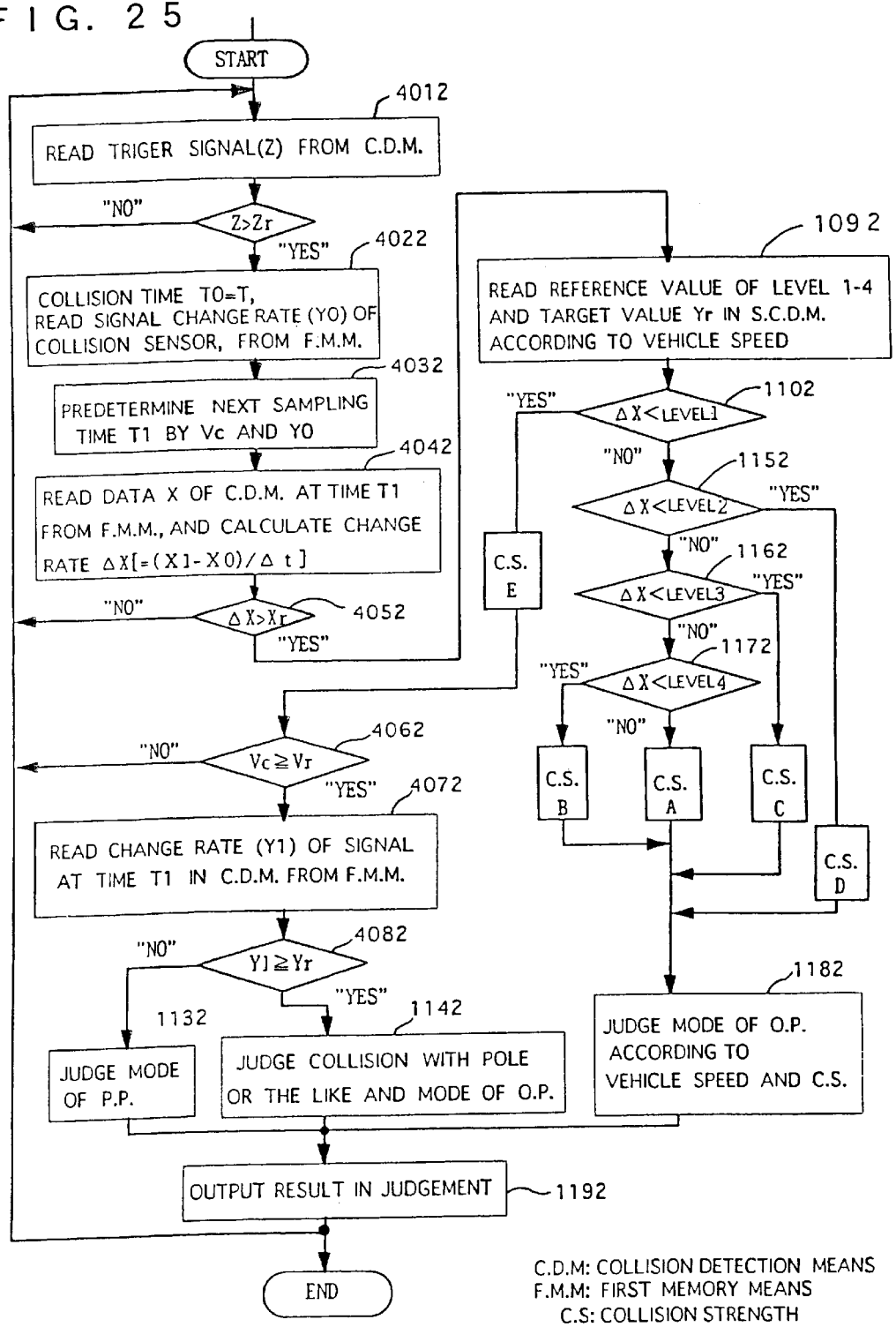
FIG. 25 is chart showing a judgement algorism according to the eighth embodiment.

An analog operation section for obtaining the rate of output change (Y) of electrostatic capacity is added to the collision detection means 1 or a digital operation section for obtaining the rate of output change is added to the collision object presuming means 2 so that the evaluation time width ($\Delta t$) is decided according to the magnitude of the rate of output change. Therefore, the greater the output change, the evaluation time width is shortened and the operating decision to various protective devices are quickened. (FIGS. 23, 25)

Figure 14A:
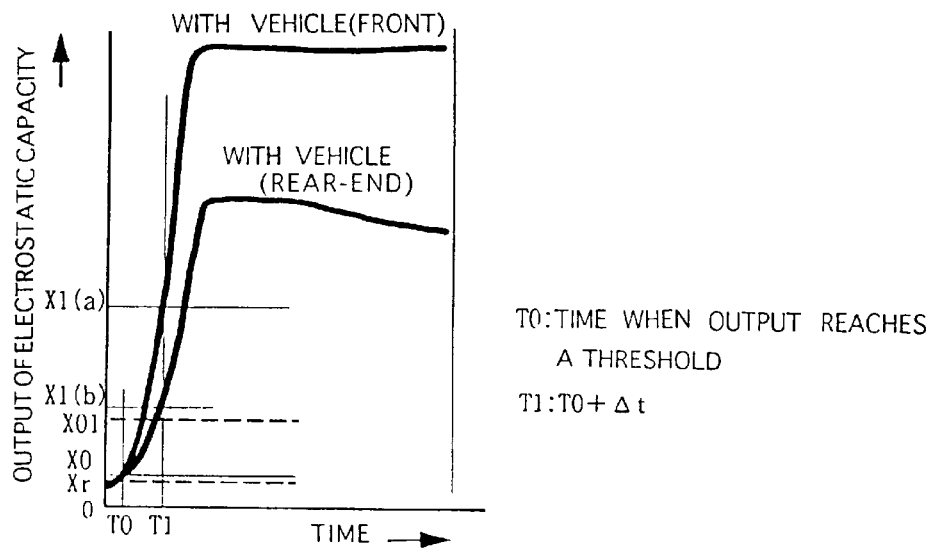
FIGS. 14A and 14B are diagrams showing an output example of the fifth embodiment.
Figure 14B:
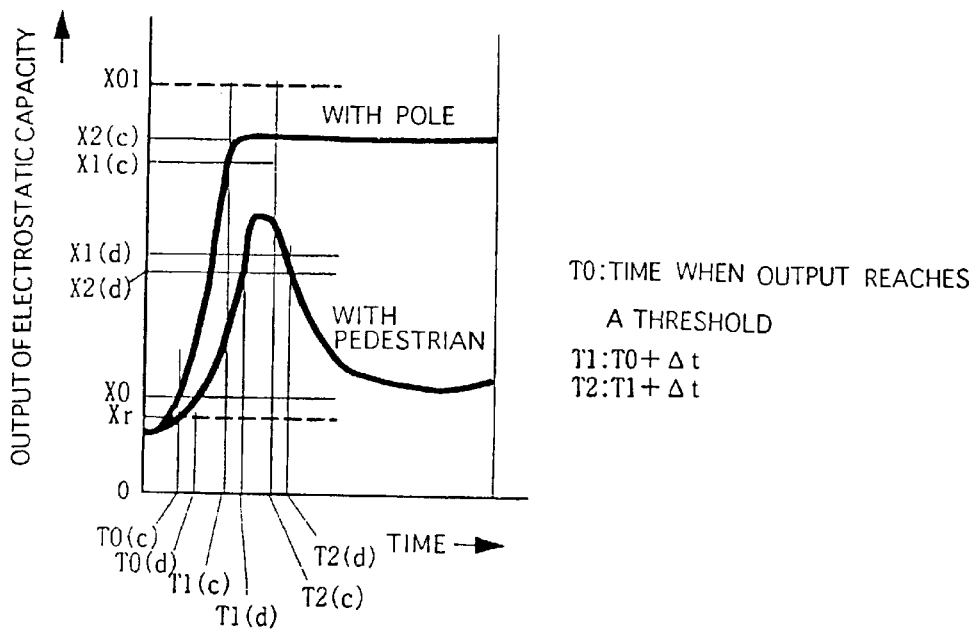

Whether or not the magnitude of the change rate (Y) of electrostatic capacity at the time (T1) after the fixed evaluation time width ($\Delta t$) exceeds the rate of output change of the electrostatic capacity as shown in FIGS. 14A and 14B, is used to judge whether or not a pedestrian collided with the vehicle, thus enhancing the judgement accuracy with respect to the elongated collision body.

The collision discriminating apparatus according to a third aspect of the invention is different from the former in that a second electrostatic capacity detection circuit 6 for detecting a floating capacity prior to collision and a judgement means 26 for discriminating a person from a thing according to whether or not an output value of the floating capacity exceeds the threshold. The difference will be mainly explained in the following.

The collision detection means 1 has an electrostatic capacity detection circuit added thereto for detecting a floating capacity generated between one electrode 11E on the front side of the vehicle of the electrostatic capacity type collision detection sensor section 14 and a pedestrian.

The collision object presuming means 2 is constituted by a judgement means for discriminating a person from a thing according to whether or not an output value of the floating capacity exceeds the threshold before a pedestrian or an obstacle comes into collision with the collision detection sensor section 14 in order to prevent erroneous operation of the protective device for an occupant or a pedestrian.

In the collision discriminating apparatus for vehicles according to a third aspect described as above, the electrostatic capacity detection circuit detects, prior to collision, a floating capacity generated between one electrode of the electrostatic capacity type collision detection sensor section and a pedestrian, and judgement means compares, before a pedestrian or an obstacle comes into collision with the collided surface of the collision detection means, the output value of the floating capacity from the electrostatic capacity detection circuit with the threshold to discriminate a person from an obstacle. This exhibits the effect of enabling the discrimination between a person and an obstacle prior to collision.

The collision discriminating apparatus for vehicles according to a fourth aspect comprises a collision detection means for detecting collision, in the collision between the vehicle and a pedestrian or other obstacles, and a judgement means for presuming a collision object for predicting against what collided with the vehicle from information therefrom.

The collision detection means comprises an deformable tube having a little elongation inserted into a bumper or mounted on the collided surface of the bumper, a fluid sealed into the tube, a pressure type collision detection sensor section constituted by a pressure sensor for detecting a change in pressure of the fluid sealed into the tube at the time of collision with the collision object, and an integral or separately provided amplification circuit.

The judgement means compares an electric signal from the collision detection means with data on a map prepared in advance at every relative speed of the vehicle speed and the collided body to judge what collided with the vehicle.

The judgement means comprises a first memory means for storing a pressure signal voltage and a vehicle speed subjected to sampling a second memory means for storing a threshold at every relative speed between the vehicle speed and the collided body and a reference value for discriminating the strength of collision, a comparison means for comparing an input signal of the first memory means with the second memory means to decide the strength of collision, and a collision object presuming means for judging/deciding an operating signal of a protective device to be operated based on the strength of collision.

The judgement means may also include an operation selection means for judging a protection of a pedestrian or protection of an occupant from a signal of the collision object presuming means.

A pedestrian collision discriminating apparatus according to a fifth aspect comprises a collision detection means for detecting a collision state from a broken state of an electric circuit network in the collision between the vehicle and a pedestrian or other obstacles, and a collision object presuming means for presuming a collision object on the basis of the broken state which is detection information detected by the collision detection means.

The collision detection means comprises a plurality of conductive wires coated with insulator forming an electric circuit network mounted on the vehicle, a voltage applying circuit for applying a voltage to each of the conductive wires coated with insulator, and a voltage detection circuit for detecting the voltage applied to each of conductive wires coated with insulator.

The collision object presuming means comprises a collision object discriminating circuit for discriminating a collision object on the basis of a voltage of each of conductive wires coated with insulator (a broken state of the conductive wire) detected by the voltage detection circuit.

The collision object discriminating circuit comprises a comparison circuit for comparing an addition circuit for adding and outputting a voltage of each of conductive wires coated with an insulator, and an output of the addition circuit with a preset reference voltage to output the compared result.

A plurality of conductive wires coated with insulator of the collision detection means are arranged in the vicinity of an outer peripheral portion of the vehicle, and a voltage is applied to opposite ends of each of conductive wires coated with insulator by a voltage applying circuit. This voltage is detected by the voltage detection circuit and added in the addition circuit.

Normally, the electric circuit network by the conductive wires coated with insulator is in the connected state, and the addition result is a value corresponding to the number of conductive wires coated with insulator. At the time of collision, the electric circuit network is broken due to the shock, and the addition result is small according to a degree of breakage.

That is, a degree of breakage of the electric circuit network is small in the case where a collision object is a pedestrian, and is large in the case of the vehicle. The change in addition result of the voltage at the time of collision is small in the case of a pedestrian and large in the case of the vehicle. By comparing the change in voltage with a prearranged value in the comparison circuit, it is possible to discriminate a pedestrian form the vehicle, and it is possible to operate the pedestrian protective device or the occupant protective device on the basis of the discrimination result.

(First Embodiment)

A collision discriminating apparatus for vehicles in a first embodiment according to a first aspect comprises, as shown in FIG. 1, a collision detection means 1 for detecting collision between the collision object and the vehicle, a collision state presuming means 2 for predicting what collided against the vehicle from the detected collision information and the vehicle speed, and an operation selection means 4 for judging which one of a pedestrian protective device 8 and an occupant protective device 6 is operated from a signal of the collision state presuming means 2, or which one of protective devices is operated, in the vehicle having a plurality of occupant protective devices 6 and pedestrian protective devices 8, to discriminate the collision between the vehicle and a pedestrian or other obstacles.

The collision detection means 1 comprises a detection portion 11 and an amplification portion 12. The detection portion 11 is mounted in a bumper 100 provided on the front portion of the vehicle to detect the magnitude of the collision load at that portion caused by the collision, that is, the deformation amount.

The deformation of the bumper caused by the collision is not uniform depending on the state of collision, for example, such as a head-on collision or an offset collision with a vehicle, collision with elongated fixed obstacles such as a pole, a support pole and the like, and a pedestrian. The collision detection means 2 is means for detecting the deformation that is not uniform as an average deformation.

The collision detection means 1 is a collision detection sensor from which is output an electric signal obtained by integrating a deformation force per unit width generated by the collision in which the collided body exerted on the vehicle. This sensor measures deformation of the bumper over most part of the vehicle width. The detection methods are realized by measurement of various physical amounts such as electrostatic capacity, fluid pressure, magnetic strength, electric resistance, displacement of peripheral length and the like.

More specifically, a detection portion 11 of the collision detection means is embedded into a first shock absorbing member 111 made of shock absorbing material in the bumper 100 as shown in FIG. 2A, and a second shock absorbing member 112 made of shock absorbing material is inserted between the first shock absorbing member 111 and a vehicle frame 103.

The amplification portion 12 is provided integrally with the detection portion 11, or provided within a compartment or a place corresponding thereto similar to the collision state presuming means 2 in order to prevent the breakage at the time of collision, and applies a voltage to the detection portion 11 and amplifies the deformation amount detected.

The collision state presuming means 2 compares the change by the time and the magnitude of an electric signal from the amplification portion 12 of the collision detection means 1 with judgement reference data prepared in advance to judge what collided with the vehicle.

The collision state presuming means 2 comprises a first memory means 21 for storing an input signal subjected to sampling at predetermined time intervals, a second memory means 22 for storing judgement reference data for comparison, a comparison means 23 for ranking the strength of collision, and a judgement means 24 for presuming the collision object and selecting a protective device and its operating mode.

The operation selection means 4 is selection means for deciding, in the case where a plurality of protective devices or operating conditions are present, which protective device or operating condition is employed for operation, the selection means being provided at the rear of the collision state presuming means 2. This means is not necessary in the case where a signal of the collision detection means 1 can be discriminated by the protective device.

The protective device protects an occupant and a pedestrian at the same time or either one of them. The pedestrian protective device 8 is a device which develops an air bag on the bonnet 101 to absorb shocks to a head and a chest of a pedestrian and protect them. The occupant protective device 6 is an air bag arranged on a steering or a dashboard (not shown) or on the occupant side.

The operation of the collision discriminating apparatus for vehicles according to the first embodiment constructed as described above will be described in detail hereinafter.

The deformation of the front portion of the vehicle caused by the collision is detected by the collision detection means. The magnitude of the change in shape varies with the rigidity of the detection portion 11 and circumference of the detection portion, and the detection sensitivity depends on the magnitude of the change in shape.

Figure 3A:
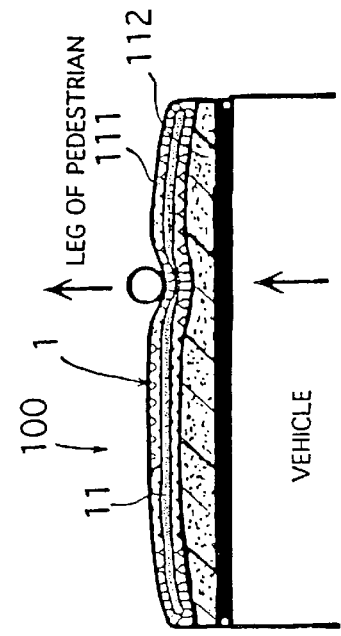
FIGS. 3A and 3B are sectional views showing a collision state of a vehicle and a pedestrian in the collision detection means according to the first aspect and the first embodiment.
Figure 3B:
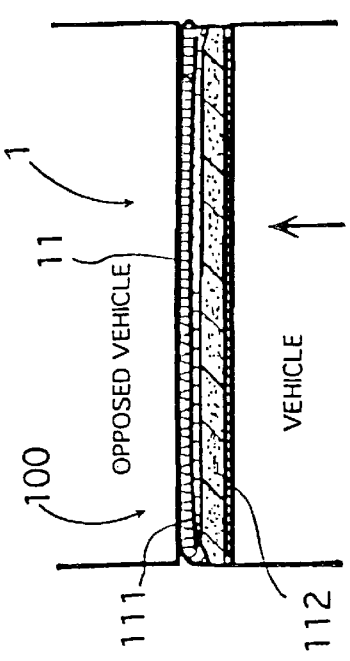
Figure 3C:
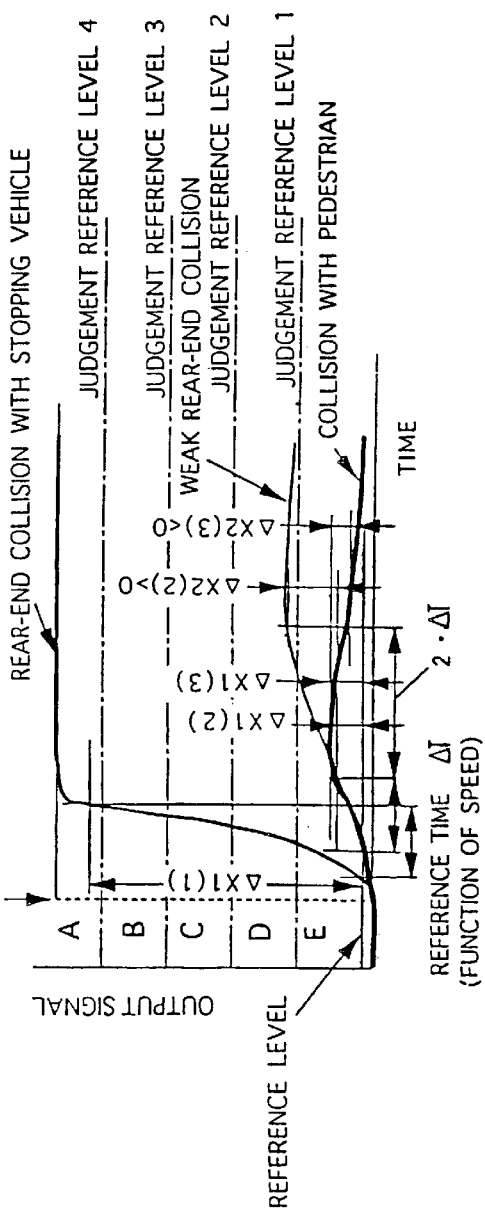
FIG. 3C is a diagram showing output waveforms thereof.

One example of deformation of the detection means 1 caused by the collision between the vehicle and a pedestrian is shown in FIGS. 3A through 3C. The first shock absorbing member 11 in which the detection means 1 is embedded is made of relatively soft foamed urethane which tends to be deformed even by collision of a pedestrian and which softens the shock exerted on legs of a pedestrian. Therefore, even when the legs of a pedestrian collide, some force is exerted on the collision detection means so that the detection means is deformed in a thinning direction at the collided portion to detect the collision.

The second shock absorbing member 112 acts to soften the shock to the vehicle mainly at the time of collision with the vehicle, and encourages the deformation of the detection portion so that it is formed of foamed urethane which is harder than the first shock absorbing member 111.

The output from the collision detection means 1 is as shown in FIG. 3C, and the output waveform is different depending on the body to be collided. This output is introduced into the first memory means 21 of the collision state presuming means 2.

The second memory means 22 stores a reference value table. One or a plurality of the reference value tables are prepared for every vehicle speed.

In the comparison means 23, out of five ranks divided according to a degree of collision, a rank having a suitable collision strength is selected on the basis of the time axis data stored in the first memory means 21 as shown in FIG. 3C. The ranking is carried out in comparison with judgement reference data set at every vehicle speed.

Figure 4:
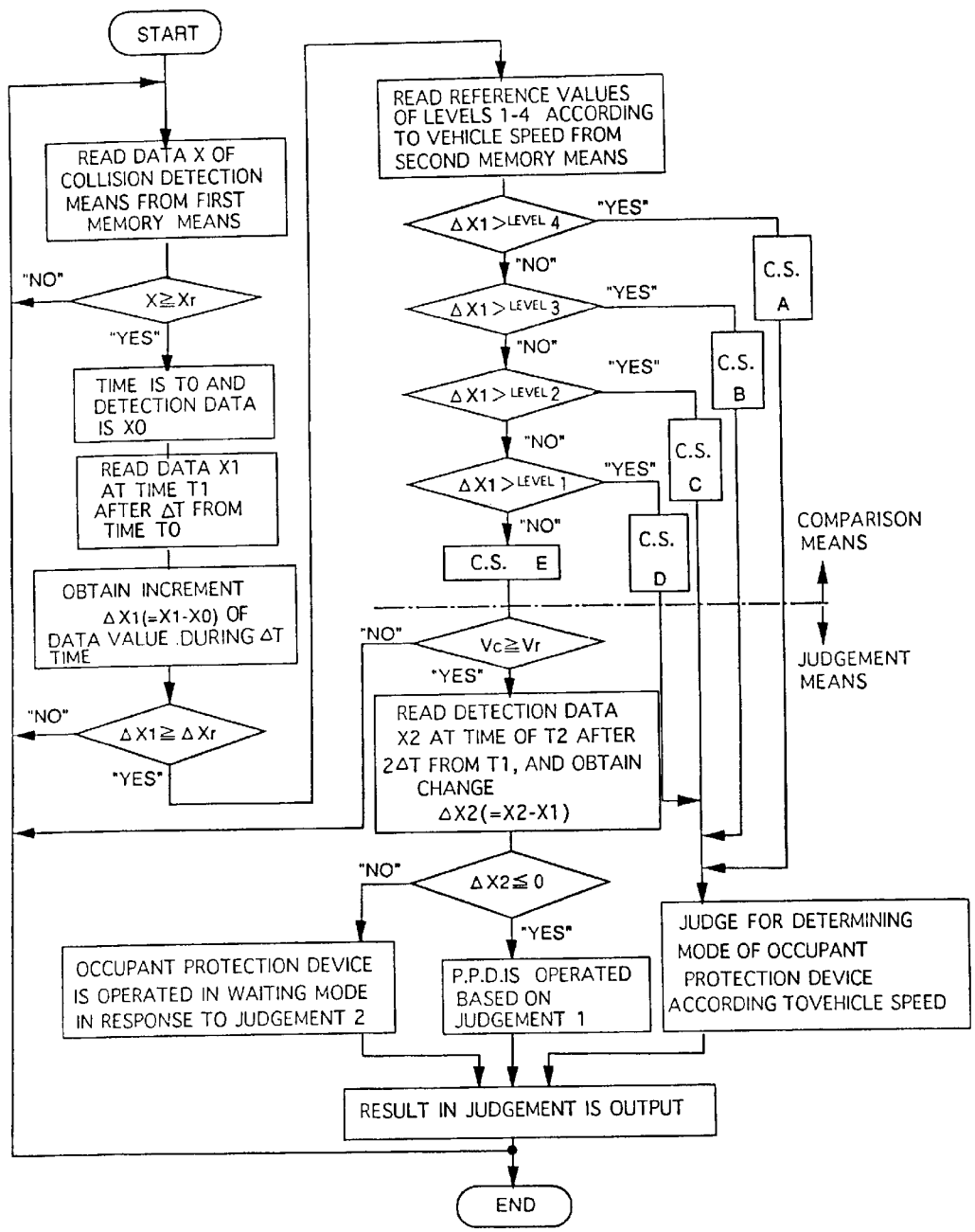
FIG. 4 is a flow view showing an algorism in the comparison means and the judgement means according to the first embodiment of the present invention.

In the first embodiment, as in the algorithm of FIG. 4, an increment ($\Delta XI=X1-X0$) of an output value (X1) at a time (T1) after the reference time $\Delta T$ (see FIG. 3C) from the time T0 at which output X (=X0) of the collision detection means 1 reaches a threshold level (Xr), that is, after a number of samplings, is obtained, and when the increment exceeds another threshold level ($\Delta Xr$), it is compared with four levels of the judgement reference data. The time $\Delta T$ is preferably changed according to the vehicle speed, and is extended at the lower speed. As shown in FIG. 3C, there is a possibility that only with the $\Delta X1$, the same collision strength rank (E) is obtained both in the case of a weak rear-end collision with a vehicle and in the case of a collision with a pedestrian. Therefore, with respect to the collision strength "E", for separating the collision with a pedestrian from the weak rear-end collision, an output value (X2) at a time (T2), that is, after $2 \cdot \Delta T$ from the time (T1), is obtained, and an output change ($\Delta X2=X2-X1$) from the output value (X1) at the time (T1) is judged if it is positive or negative. If it is positive, judgment is made as a weak rear-end collision. Here, an occupant protective device for operation in accordance with the "Judgement 2" is set to a waiting mode into a preparation stage for occupant protection resulting from a secondary collision. If it is negative, judgement is made as a pedestrian of "Judgment 1" to operate the pedestrian protective device 8. This grasps a difference caused by mass of a collision body. "$2 \cdot \Delta T$" is preferably in the range of from $\Delta T$ to $5 \Delta T$. The comparison between the output X of the collision detection means 1 and the threshold Xr is carried out at every sampling time until X reaches Xr, and when X reaches Xr, the time To is replaced by the time T at that time.

In the judgment means 24, as shown in Table 1 (see the end of the Detailed Description of the Preferred Embodiments), at that time, there is also a possibility of a rear-end collision with a vehicle having a high rear bumper such as a truck, and the occupant protective device 6 is set to a waiting state. When an acceleration output reaches a certain value or more, operation of the occupant protective device 6 is made only by a judgment function. It is noted that these judgments are looked at every sampling period, and the collision discrimination is repeated till the vehicle stops and occupants get out of the vehicle so that operation of the protective device is properly made.

For example, one example of the judgement by the judgement means 24 is shown in Table 1. Here, the judgement state is decided with respect to the rank of the collision strength which is an output rank of the collision detection means 1 for every vehicle speed rank. In this example, there are 4 vehicle speed ranks of a, b, c, and d in order of fast vehicle speed, and 5 collision strength ranks of A, B, C, D, and E in order of the larger total amount of the bumper deformation amount caused by the collision. The collision state is judged from these two ranks.

The "Judgement 4" corresponds to the collision with a stopped vehicle or a confronted vehicle, which is a severe collision for which the occupant protective device 6 needs be operated urgently. At this time, the occupant protective device 6 is operated in a urgent operating mode. In this case, the rank of the collision strength is A, and the vehicle speed rank is a to c. This includes the case where a confronted vehicle comes into a head-on collision with a vehicle being stopped.

The "Judgement 3" corresponds to an offset confrontation collision of about ½ or a rear-end collision with a vehicle at a relative speed of 20 to 40 km/h, in which case an occupant protective device 6 such as an air bag is operated in a normal mode. At that time, the rank of the collision strength, and the vehicle speed rank are in any of the following combinations: A and d; B and a to d; C and a to c. The "Judgement 2" corresponds to a rear-end collision at a relative speed of 20 km/h or less, an offset confrontation collision of ¼ or less, or a collision against a fixed object on the earth such as an electricity pole, which is a collision at which an occupant protective device 6 such as an air bag is slowly developed and held for 3–10 seconds or so on the supposition of a secondary collision. At that time, the rank of the collision strength and the vehicle speed rank are in any of the following combinations: C and d; D and a to d; or E and d.

The "Judgement 1" corresponds to the collision with a pedestrian, which is a collision that a pedestrian protective device 6 needs be operated. At that time, the rank of the collision strength is E, and the vehicle speed is a to c. Further, at that time, there is also a possibility of a rear-end collision with a vehicle having a high rear bumper such as a truck, and the occupant protective device 6 is set to a waiting state. When an acceleration output reaches a certain value or more, operation of the occupant protective device 6 is made only by a judgment function. It is noted that these judgments are looked at every sampling period, and the collision discrimination is repeated till the vehicle stops and occupants get out of the vehicle so that operation of the protective device is properly made.

The operation selection means 4 is particularly not necessary when a meaning of an output signal of the collision discriminating apparatus can be judged in each protective device, but when it cannot be discriminated, a proper signal is output to each protective device by the operation selection means 4. For example, in the case where a pedestrian protective device 8 and an occupant protective device 6 are respectively single or plural in number, a protective device that need be operated is selected and a signal is output thereto in order to operate the adequate protective device on the basis of the judgement number representative of the collision body and the collision state decided by the judgement means The effect of the collision discriminating apparatus for vehicles having the aforementioned operation will be explained in detail hereinafter.

The collision discriminating apparatus according to the first embodiment presumes the collision object collided with the vehicle on the basis of the deformation amount of the collided of the vehicle. This exhibits the effect of enabling the presumption of the collision object, that is, the discrimination of the collision with a pedestrian, the collision with the vehicle, and the collision with other obstacles.

Further, the collision discriminating apparatus according to the first embodiment judges what has collided with the vehicle by comparing the change by the time of an electric signal as shown in FIG. 3C from the collision detection means 1 with the judgement reference data on the basis of an algorithm of FIG. 4 prepared in advance. This more accurately discriminates between a pedestrian and the vehicle and others.

That is, an object collided with the bumper 100 is detected by the collision detection means 1 to obtain the rank of the collision strength which differs with the collided body which is a person having a small mass or a weight body such as a vehicle from the characteristics of the output change thereof.

This enables approximate presumption of lateral width and mass of the collided body, and how to operate which protective device can be decided in accordance with a judgment table shown in Table 1. As a result, the protective device for an occupant or a pedestrian can be effectively operated.

Since the collision state can be detected merely by the detection means 1 provided on the bumper 100, the judgement of the collided body can be made quickly, and the operating speed of the protective devices 6 and 8 can be thereafter lowered to reduce the shock force to the occupants caused by the protective devices.

Since the detection sensitivity of the present invention can be made higher than that of the conventional protective device using an acceleration meter, in which a pedestrian protective device is set so that it will not operate till a fixed acceleration level at the time of low speed in order to avoid an erroneous operation of an occupant protective device such as an air bag, but even low shock can be sensed to operate the occupant protective device quickly or keep it in a waiting mode. Accordingly, it is possible to more adequately operate a pedestrian protective or occupant protective device to enable the reduction in shock force to of a pedestrian and an occupant.

Further, in the collision discriminating apparatus according to the first embodiment, also in the vehicle with only an occupant protective device mounted, detection can be made quickly and the operating condition of the protective device can be instructed precisely. Therefore, unnecessarily quick development of an air bag device can be minimized as necessary. This makes the shock force to an occupant by the air bag operation minimum as necessary. The bumper described in the first embodiment includes one in contact at the time of collision in the vicinity of the front portion of the vehicle body.

(Second Embodiment)

Figure 5:
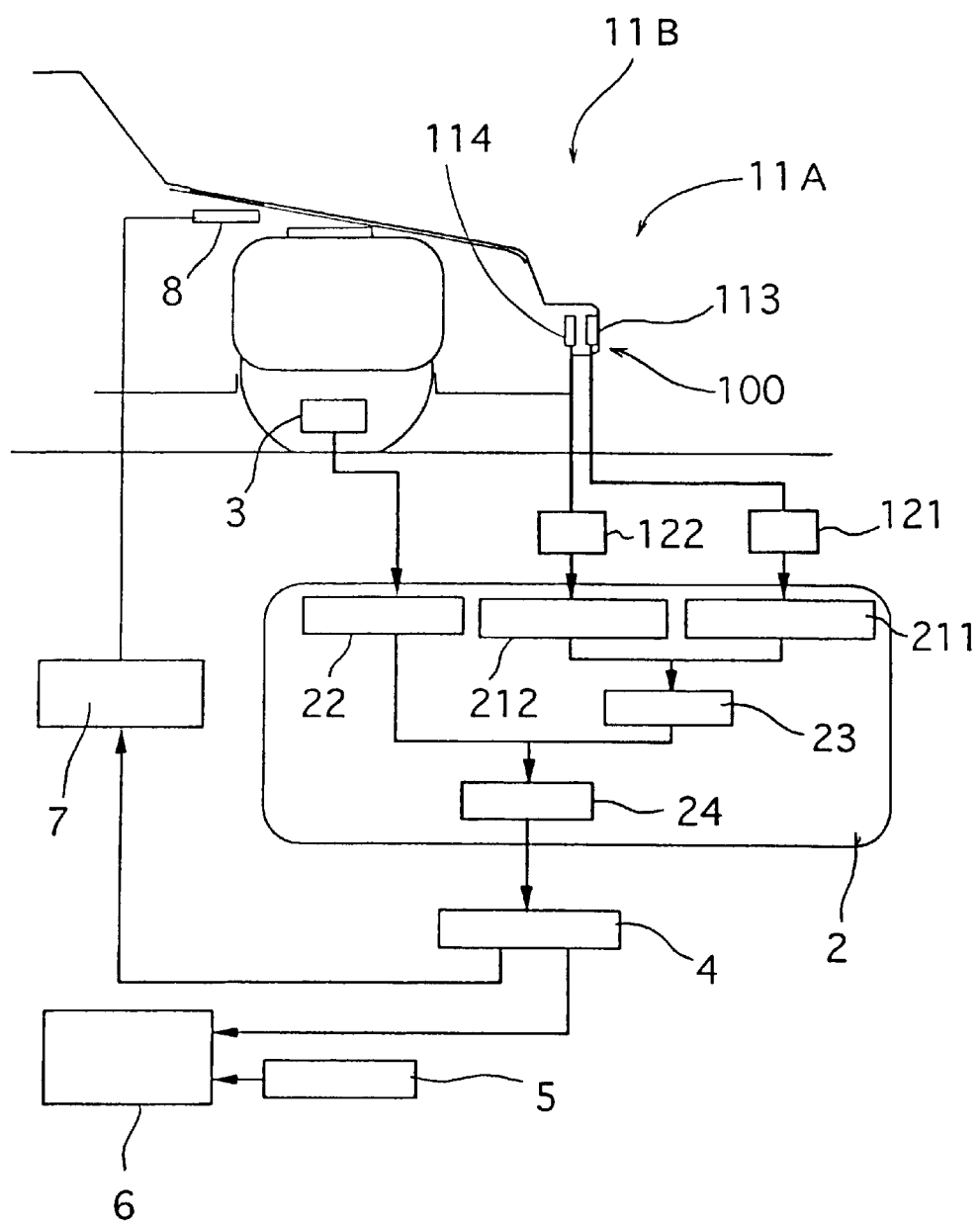
FIG. 5 is a block diagram showing a collision discriminating apparatus for vehicles according to a second embodiment of the present invention.

The collision discriminating apparatus for vehicles according to a second embodiment is different from the first embodiment in that respective two collision detection means and first memory means are provided as shown in FIG. 5. That is, the collision detection means comprises a first collision detection means 11A and a second collision detection means 11B, which are respectively provided with detection portions 113 and 114 and amplification portions 121 and 122.

Figure 6:
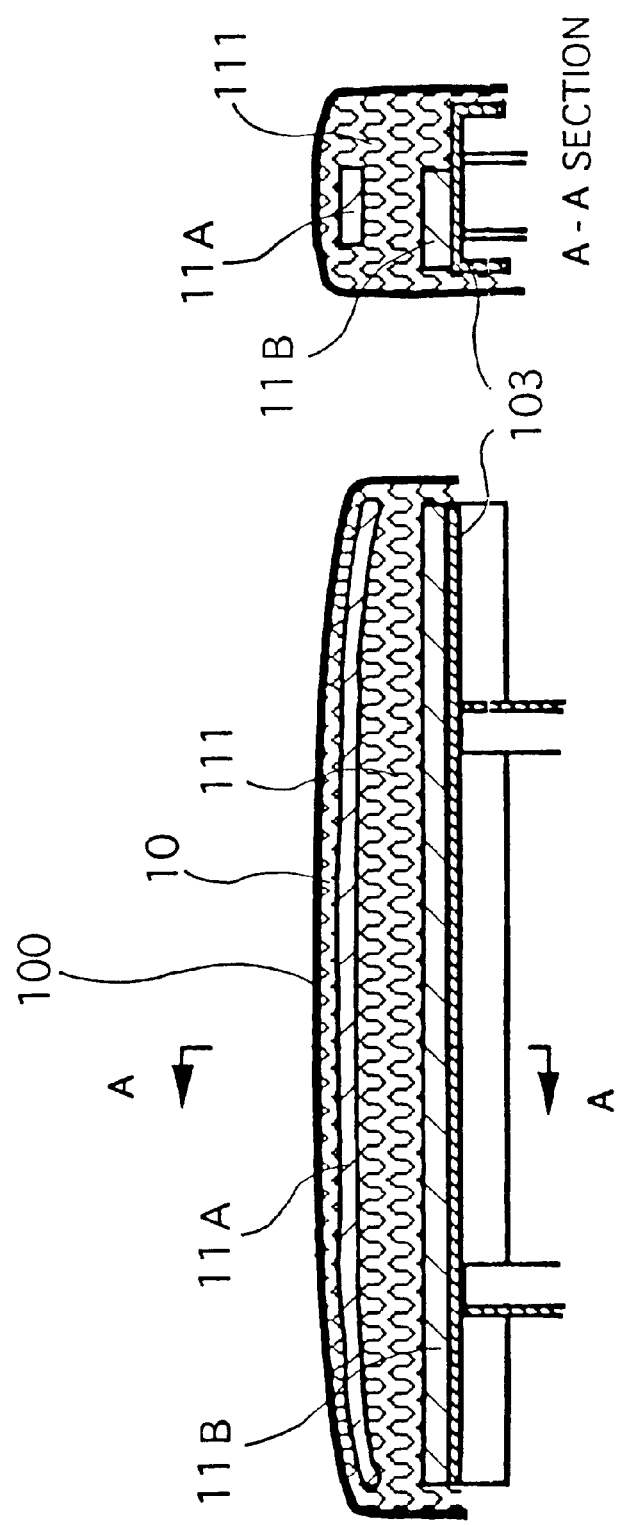
FIGS. 6A and 6B are sectional views in different section showing a collision detection means according to the second embodiment.

In the collision detection means as shown in FIGS. 6A and 6B, the respective detection portions are mounted in a shock absorbing member 111 in a bumper provided on the front of the vehicles, and the first collision detection means 11A and the second detection means 11B are arranged on the front, and in front of a vehicle body frame 103 at the rear of the bumper, respectively.

Figure 7:
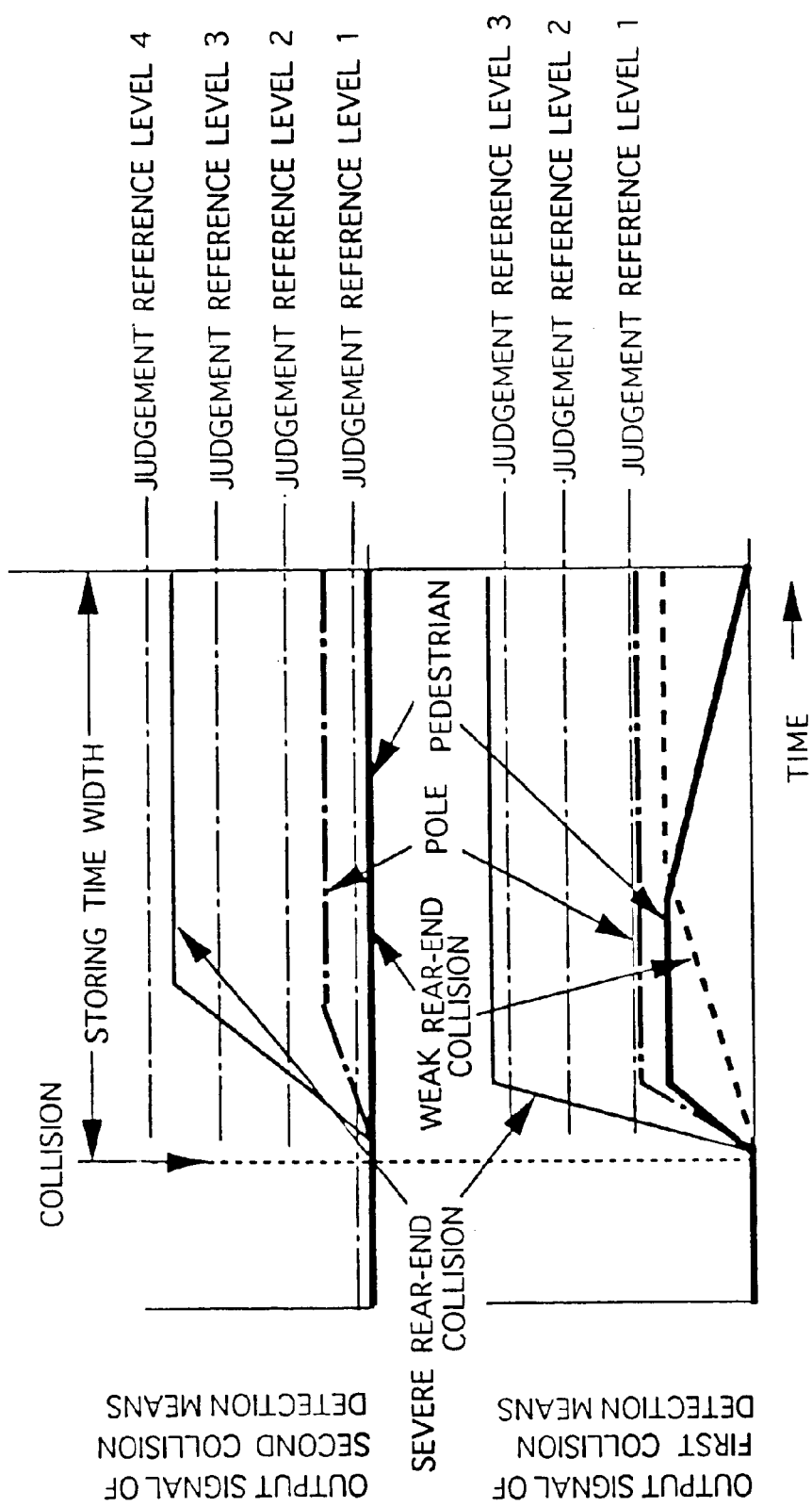
FIG. 7 is a diagram showing output waveforms of the first and second collision detection means according to the second embodiment.
Figure 8:
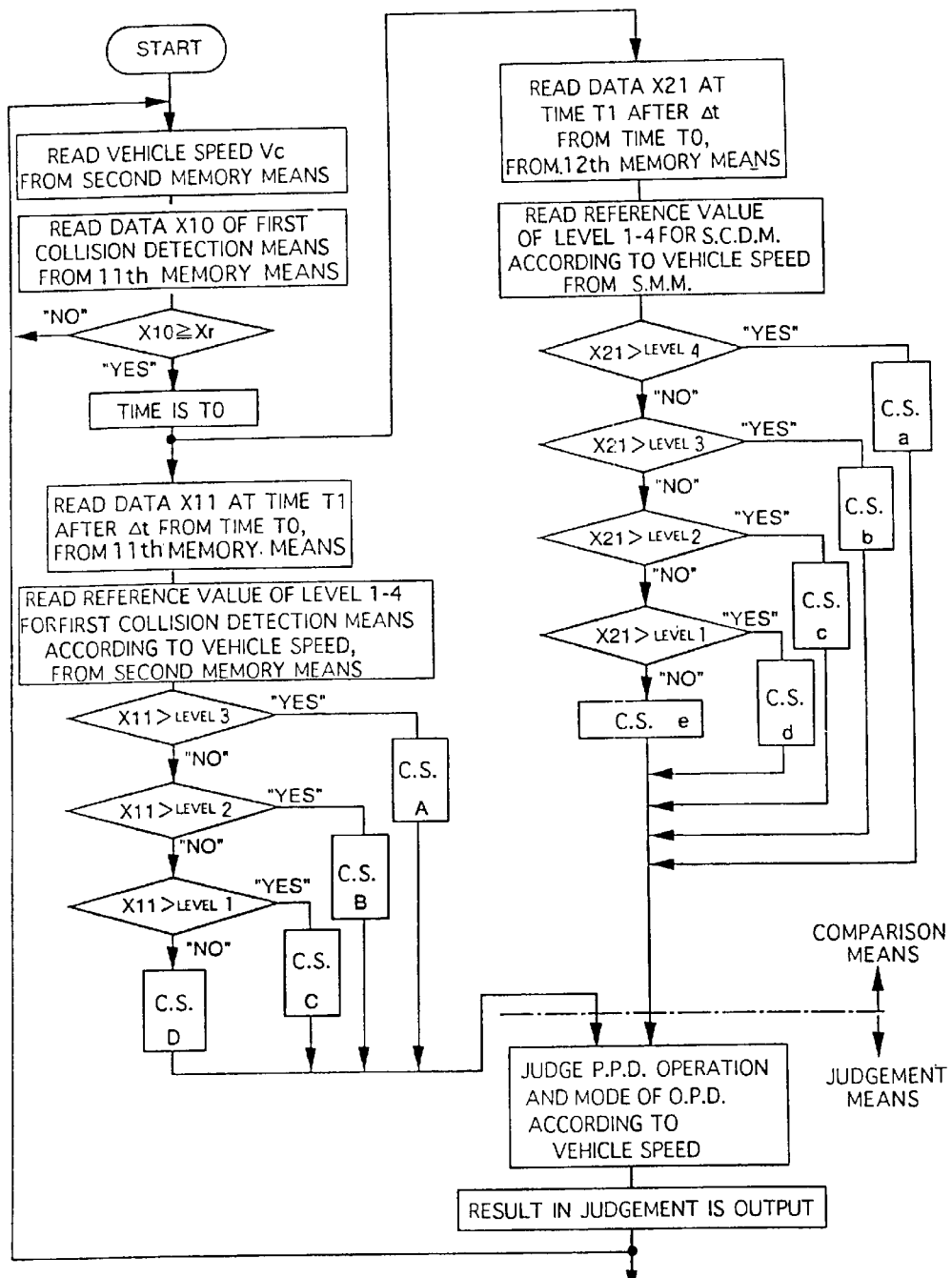
FIG. 8 is a flow view showing an algorism in the comparison means and the judgement means according to the second embodiment of the present invention.

In the collision state presuming means 2 compares the time variations of electric signals as shown in FIG. 7 from the amplification portions 121 and 122 of the first or second collision detection means 11A and 11B with reference data on the basis of a discrimination algorithm of FIG. 8 prepared in advance to judge what collided with the vehicle. There comprises an 11th memory means 211 for storing an output of the first collision detection means 11A as an input signal having a fixed time width, a 12th memory means 212 for storing an output of the second collision detection means 11B as an input signal having a fixed time width, a second memory means 22 for storing comparison data corresponding to the vehicle speed connected to a vehicle speed sensor 3, a comparison means 23, and a judgement means 24.

In the collision discriminating apparatus for vehicles according to the second embodiment constructed as described above, the deformation of the front portion of the vehicle caused by the collision is first detected by the first collision detection means 11A, and in the case of large shock force, it is also detected by the second collision detection means 11B. The change in shape and the magnitude of output of the detection portion differ with the detection portions and the rigidity of the shock absorbing members around the detection portions 113 and 114.

The first collision detection means 11A is embedded in the vicinity of the front portion of the bumper 100 and is high in sensitivity capable of detecting the collision of a pedestrian. The second collision detection means 11B is a member having a high rigidity capable of detecting only the collision of a weight body such as the vehicle and whose detection sensitivity is set to be low. Therefore, in the case where a pedestrian collides, such is not detected or a very small detection results. In the second collision detection means 11B, preferably, the rigidity of the shock absorbing member 11 and the collision detection means are decided so as not to detect a collided body to a degree of a pedestrian.

Outputs from the first and second collision detection means 11A and 11B are as shown in FIG. 7 and are set so that output waveforms to both the means are different depending on collided bodies.

For example, suppose that a support pole and a pedestrian are the same in diameter, both are featured outputs. In the first collision detection means 11A, both are about the same outputs, but in the second collision detection means 11B, in the case of a pedestrian, since feet are sprung by the bumper of the vehicle, no deformation of the bumper occurs till the second collision detection means 11B is deformed.

On the other hand, since the support pole is secured to the ground of the road or the like, it is deformed locally to the portion of the second collision detection means 11B. Therefore, in the fixed bodies such as a support pole, outputs of the first and second collision detection means are relatively small and output to both. These outputs are introduced into the 11th and 12th memory means 211 and 212 of the collision state presuming means 2. In these memory means, new output data are always stored for a fixed period of time, and output changes during that period are stored.

The second memory means 22 stores judgment reference data provided every range of vehicle speed and a reference value table such as a discrimination map for discriminating the operating conditions of the protective devices. The discrimination reference data are stored for ranking the strength of collision with respect to thedetection data of the 11th and 12th memory means 211 and 212. One or a plurality of discrimination maps every vehicle speed rank are prepared.

In the comparison means 23, the judgement reference data in the second memory means 22 are used as shown in FIG. 7, those from the 11th memory means 211 and those from the 12th memory means 212 are divided, in rank of the strength of collision, into 4 ranks and 5 ranks, respectively, according to a degree of collision, on the basis of the time axis outputs stored in the 11th and 12th memory means 211 and 212, and on the basis of the algorithm shown in FIG. 8.

The ranking is carried out in comparison with a table for judgement reference values set at every vehicle speed. In the second embodiment, the ranking is carried out by obtaining the maximum output value within a fixed time from the time at which the output of the first collision detection means 11A reaches a fixed level (threshold) and comparing with 3 to 4 levels of the judgement reference level. However, there is presumed the case of a weak rear-end collision in which the maximum value of the output of the first collision detection means 11A made the same and no output to the second collision detection means 11B is present. In order to separate it from the collision with a pedestrian, judgement is further made depending on the presence or absence of the lowering of output after arrival of maximum value within a fixed time similar to the first embodiment. The higher the vehicle speed, the higher the threshold.

There is another judgement method in which in the case where the time to the maximum valve after the output exceeds the threshold is shorter than a fixed time, judgement is made as a pedestrian, and in the case where it is longer, judgement is made as a weak rear-end collision. That is, the weak rear-end collision is slow in relative speed, and is also slow in the time at which the output is maximum. Such a judgement as described may be the same as Embodiment 1.

In the judgement means 24, the judgement number is selected by collating the rank of the first collision strength and the rank of the second collision strength in the collision state obtained by the comparison means 23 with the discrimination map as in Table 2 (see the end of the Detailed Description of the Preferred Embodiments) set at every vehicle speed rank and stored in the second memory means 22.

For example, in the judgement means 24, the present vehicle speed is divided into vehicle speed ranks, and the discrimination map at every vehicle speed rank is opened and collated to obtain the judgement state with respect to the ranks of the first and second collision strength which are output ranks of the first and second collision detection means 11A and 11B. This Table has four ranks of the first shock strength of A, B, C, and D in order of large total amount of the deformation amount of the surface portion of the bumper caused by the collision and five ranks of the second shock strength of a, b, c, d, and e in order of large total amount of the deformation amount of the deep portion of the bumper. The collision state is discriminated in five stages from these two ranks.

"Judgement 4" corresponds to an offset collision or a rear-end collision, in which an occupant protective device 6 is in a normal operation. When the rank of the first collision strength is A, and the ranks of the second shock strength are c and d, the rank of the first collision strength is B, and the ranks of the second shock strength are b to d.

"Judgement 2" corresponds to light-weight obstacles such as a bicycle, a light vehicle, a wheel chair or the like, in which an occupant protective device 6 and a pedestrian protective device 8 are in a waiting operation. The rank of the first collision strength is C, and the rank of the second shock strength is e.

"Judgement 1" corresponds to the collision with a pedestrian, in which a pedestrian protective device is operated. The rank of the first collision strength is D, and the rank of the second shock strength is e.

The collision discriminating apparatus for vehicles according to the second embodiment exhibiting the above-described operation compares with the change in the time from the first and second collision detection means with the judgement reference data prepared in advance to judge what collided with the vehicle. This exhibits the effect of more accurately discriminating the between a pedestrian and other object colliding with the vehicle.

That is, the obstacles collided with the bumper are detected by the first and second collision detection means 11A and 11B, and the size and mass of the collided bodies in which the collided collision object is a person, a fixed support pole, an electricity pole or weight body such as a vehicle are presumed, in accordance with the judgement table of Table 2, from the characteristics of the output change.

In the second embodiment, the discrimination accuracy of the collision with a pedestrian is higher than that of the first embodiment by the provision of two collision detection means 11A and 11B which are different in detection sensitivity. Thereby, the protective devices for a pedestrian and an occupant can be operated more effectively.

Particularly, the second embodiment is characterized in that judgement of a pedestrian or collided bodies which are light in weight per unit width such as a wide and relatively light-weight bicycle can be made with accuracy.

(Third Embodiment)

Figure 9:
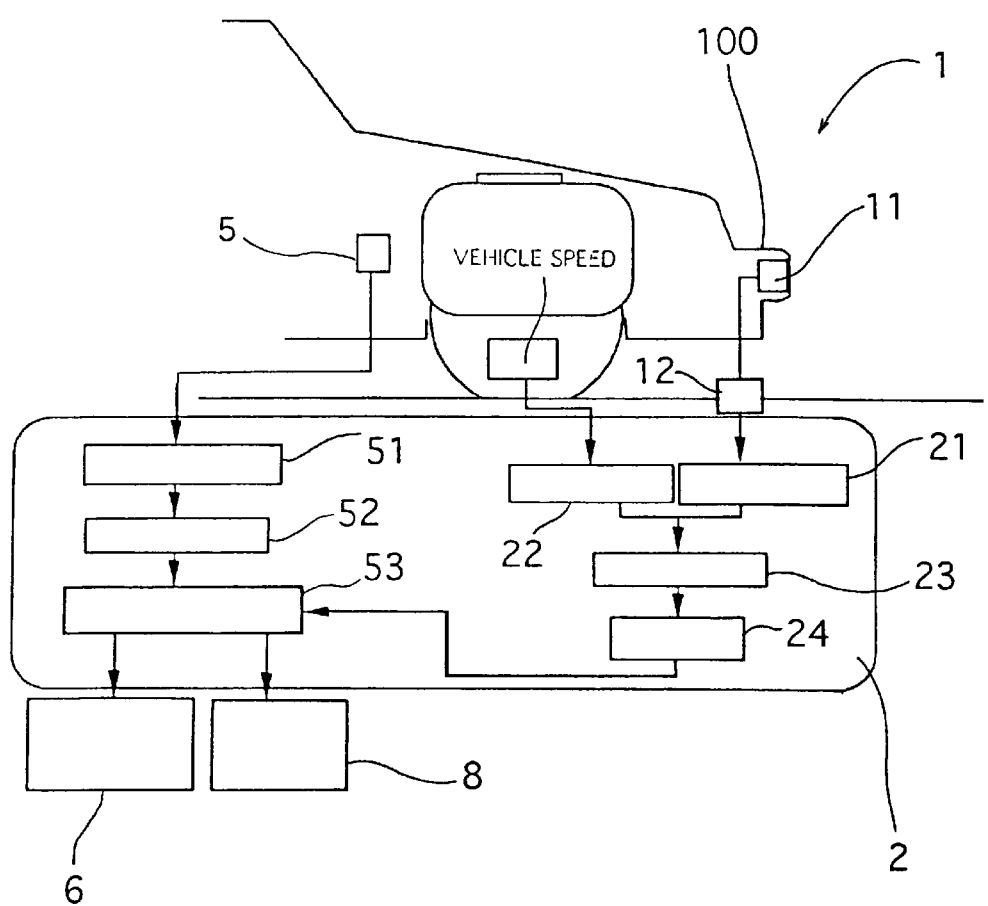
FIG. 9 is a block diagram showing a collision discriminating apparatus for vehicles according to a third embodiment of the present invention.

The collision discriminating apparatus for vehicles according to the third embodiment is different from the first embodiment in that as shown in FIG. 9, after the collision state presumption by the collision detection means 1, the judgement results are corrected by the vehicle acceleration sensor 5.

This is an embodiment in which the bumper 100 do the front of the vehicle does not collide with an opposing vehicle, or partly collides. This occurs in the case where a collision object produces a rear-end collision against the vehicle.

The collision discriminating apparatus for vehicles according to the third embodiment comprises, as shown in FIG. 9, a collision detection means 1, a collision state presuming means 2 having a judgement correction function, and a vehicle body acceleration sensor 5.

The collision state presuming means 2 compares a change in time of an electrical signal from the amplification portion 12 of the collision detection means 1 with reference data prepared in advance to judge what collided with the vehicle.

The collision state presuming means 2 comprises a first memory means 21 for storing outputs of the collision detection means 1, a second memory means 22 for storing judgement reference data corresponding to the vehicle speed and a discrimination map, a comparison means 23 for determining a rank of collision strength from an output signal of the first memory means 21, a judgement means 24 for judging a rank of collision strength determined by the comparison means 23 and an operating mode of a protective device from the discrimination map, an acceleration memory means 51 for storing, as a digital signal, an output of the acceleration sensor 5 through a high pass filter and a low pass filter (not shown), an acceleration comparison means 52 for determining a deceleration rank of the vehicle from an output signal of the acceleration memory means 51, and a judgement correction means 53 for correcting the judgement result by the acceleration.

In the collision discriminating apparatus for vehicles according to the third embodiment constructed as described above, deformation of the front portion of the vehicle is detected by the collision detection means 1, and acceleration of the vehicle body is detected by the acceleration sensor 5.

An output from the collision detection means 1 and an output from the vehicle body acceleration sensor 5 are introduced into the first memory means 21 of the collision state presuming means 2 and the third acceleration memory means 51, respectively. In these memory means, they are stored for the fixed time and stored as the output change during that period.

The second memory means 22 stores judgement reference data and a reference value table comprising a discrimination map. One or a plurality of reference value tables at every vehicle speed are prepared.

In the first comparison means 23, the collision strength is divided into the same 5 ranks as Table 1 of the first embodiment according to a degree of collision on the basis of the time axis output of the bumper deformation stored in the first memory means 21.

In the judgement means 24, the kind or the operating conditions of the protective devices are judged, as in the first embodiment, from the ranks of the collision strength determined by the first comparison means 21.

In the acceleration memory means 51, outputs from the vehicle body acceleration sensor 5 are introduced through a high pass filter and a low pass filter. In the memory means 51, analog signals through a low pass filter of about 2 kHz and a high pass filter of 10 Hz are stored for two times of sampling, and data in excess of a threshold and next data are subjected to ranking.

In the acceleration comparison means 52, the rank is divided into four vehicle body deceleration ranks according to a degree of collision on the basis of the time axis output of acceleration stored in the acceleration memory means 51.

In the judgement correction means 53, the judgement number obtained by the judgement means as in Table 3 (see the end of the Detailed Description of the Preferred Embodiments) is corrected to an adequate one according to the vehicle body deceleration rank. However, it is output to the protective device 6 in the judgement mode of the judgement means till the acceleration reaches the threshold.

In the collision discriminating apparatus for vehicles according to the third embodiment exhibiting the above-described operation, the judgement of the obstacle collided with the vehicle is carried out by the collision detection means 1 and the vehicle body acceleration sensor 5, whereby even in the case where the bumpers are not collided among themselves, for example, in the case where a private car bumps into the rear of a truck, the protective devices can be operated positively. Thereby, the protective devices 8 and 6 for a pedestrian and an occupant an be operated more effectively to prevent unnecessary operation.

For example, as shown in Table 3, when the results judged by the judgement means 24 of the collision state presuming means 2 is 4 to 0, the judging conditions are corrected according to the magnitude of the vehicle body deceleration caused by the collision.

For example, in the case where the collision could not be detected by the bumper portion due to a deviation of the collision position, as the judgement is "0", when the deceleration rank is "c", the mode is changed into the slow operating mode of the occupant protective device 6 of "2", or when the deceleration rank is extremely large "a", the mode is changed into the urgent operating mode of the occupant protective device 6 of "4".

Further, when the pedestrian protective device 6 is in the operating mode as the judgement is "1", in the case where the vehicle body deceleration has increased to some extent after the pedestrian protective device 6 has been operated, the occupant protective device 6 is put into the operating mode according to the vehicle speed deceleration. However, in the case where the judgement of the judgement means 24 is large like "4", the mode is put to the urgent operating mode irrespective of the result of the acceleration sensor 5, or in the case where the vehicle body deceleration is extremely large "a", the mode is put to the "4" of the urgent operating mode irrespective of the judgement of the judgement means 24. This case is an instance which occurs in a case of collision with a truck after having collided with a pedestrian.

(Fourth Embodiment)

Figure 10:
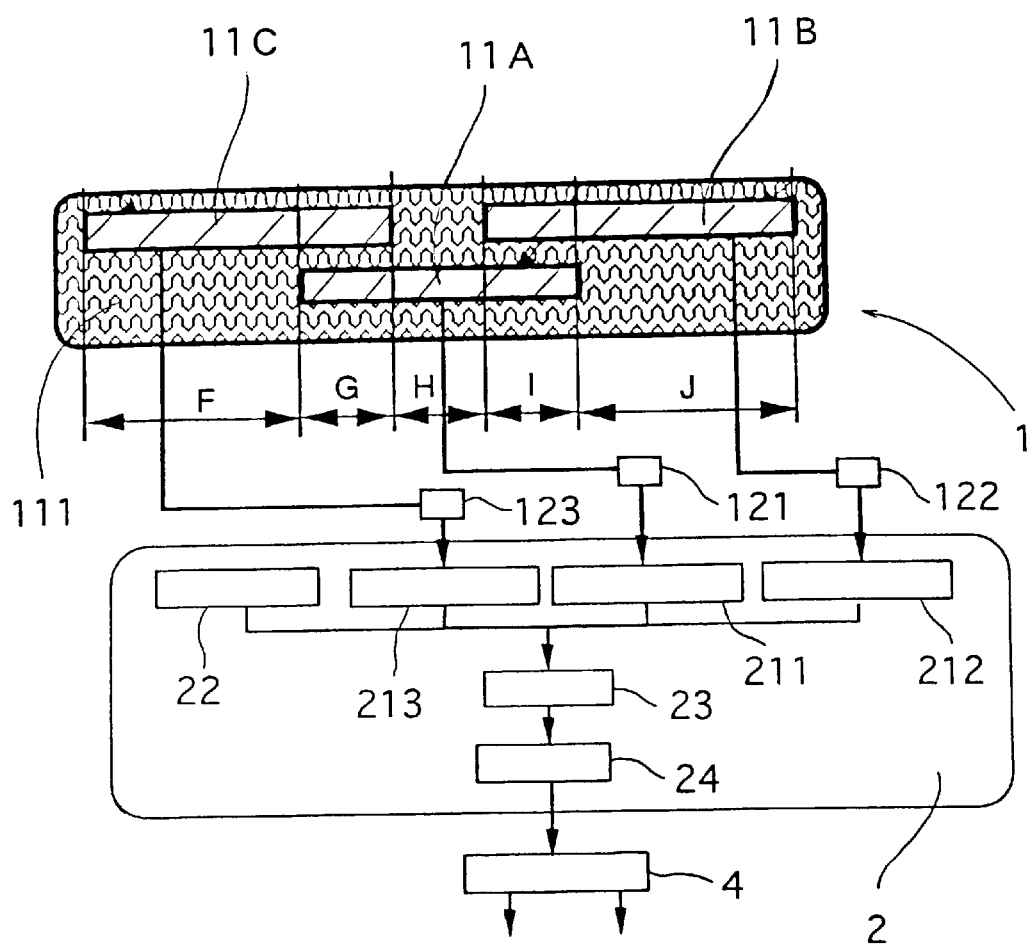
FIG. 10 is a block diagram showing a collision discriminating apparatus for vehicles according to a fourth embodiment of the present invention.

The collision discriminating apparatus for vehicles according to the fourth embodiment is different from the first embodiment in that as shown in FIGS. 10, 11A and 11B, the collision detection means 1 and the first memory means are respectively constituted by 3 in number.

The collision detection means comprises a first collision detection means 11A, a second collision detection means 11B, and a third collision detection means 11C, each of which comprises a detection portion and an amplification portion. The object of arranging a plurality of collision detection means as described is to specify a collision position and detect the size widthwise of a collided body, whereby adequate operation of a plurality of protective devices becomes further enabled.

In the collision detection means, the respective detection portions are mounted in a shock absorbing member 111 in a bumper provided in the front of the vehicle, as shown in FIG. 10, and the first collision detection means 11A, the second collision detection means 11B, and the third collision detection means 11C are arranged on the lower side in the central portion, on the upper side on the right-hand, and on the upper side on the left-hand, respectively.

The first collision detection means 11A is superposed to the second or the third collision detection means 11B, 11C in a l region or a G region as shown in FIGS. 10 and 11A–B. The spacing between the second and third collision detection means 11B and 11C is over the diameter of an electricity pole, and they are arranged so as to be able to judge the kind of support poles such as an electricity pole and the collision position.

Figure 11:
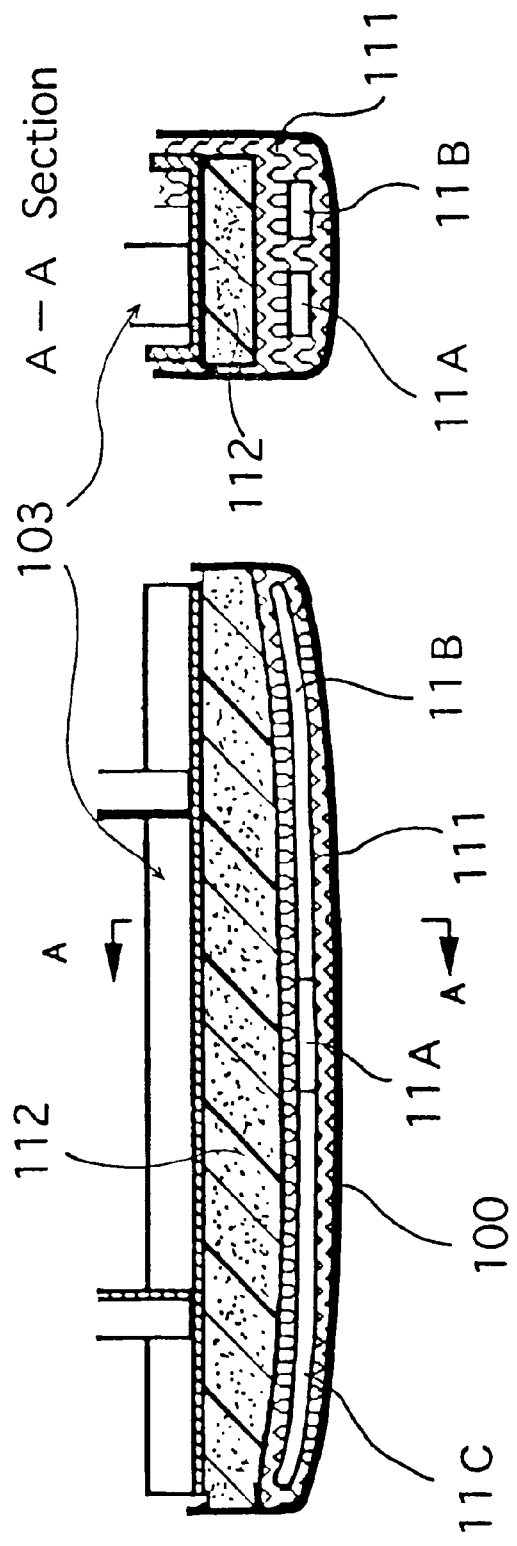
FIGS. 11A and 11B are sectional views in different section showing a plurality of collision detection means according to the fourth embodiment.

The collision state presuming means 2 compares a change in time of electric signals from amplification portions 121, 122, and 123 of the first or the second or the third collision detection means with reference data prepared in advance to judge what collided with the vehicle, as shown in FIGS. 10 and 11.

The collision state presuming means 2 comprises a 11th memory means 211 for storing outputs of the first collision detection means 11A as input signals of fixed time width, a 12th memory means 212 for storing outputs of the second collision detection means 11B as input signals of fixed time width, a 13th memory means 213 for storing outputs of the third collision detection means 11C, a second memory means 22 for storing judgement reference data and a discrimination map, a comparison means 23 and a judgement means 24. If the protective device has a sufficient judgement function, the operation selection means shown is not necessary.

In the collision discriminating means for vehicles according to the fourth embodiment constructed as described above, deformation of the front portion of the vehicle caused by collision is detected by at least one of the first, second and third collision detection means 11A, 11B and 11C. That is, the deformation is detected by the first or the second or the third or the first and the second or the first and the third or the first, the second and the third collision detection means.

The magnitude of the shape change differs with the detection portions of the collision detection means and the shock absorbing member 111 around the detection portions, similar to the previous embodiments. The first collision detection means 11A and the second or the third collision detection means 11B or 11C are arranged in a suitable overlapping state. The length of the overlapping and the spacing between the second and the third collision detection means are in excess of the diameter of an electricity pole.

The outputs from the first, second and third collision detection means 11A, 11B and 11C are similar to FIG. 3C of the embodiment 1 and different in output waveforms depending on the bodies to be collided, the first being different from the second or the third. These outputs are introduced into the 11th, 12th and 13th memory means 211, 212 and 213 of the collision state presuming means 2. They are stored for the fixed time in these memory means. The second memory means 22 is similar to those of the previous embodiments.

In the comparison means 23, the ranks of the 11th, 12th and 13th memory means are divided into the first, second and third ranks of collision strength of each 4 ranks according to a degree of collision on the basis of the time axis outputs stored in the 11th, 12th, and 13th memory means 211, 212 and 213 as shown in FIG. 10. Ranking is carried out by comparing with the judgement reference data set at every vehicle speed.

In the judgement means 24, the judgement number which is coincided by collating the rank of the first collision strength, the rank of the second collision strength, and the rank of the third collision strength in the collision state obtained by the comparison means 23 with the discrimination map set at every vehicle speed rank and stored in the second memory means 22 is selected out of 6 kinds as shown in Table 4 (see the end of the Detailed Description of the Preferred Embodiments). The operating conditions of the protective devices are decided by the judgement number.

The presuming method for a collision position will now be mentioned. In the case where detection is made merely by the first collision detection means 11A as shown in Table 4, a central H region shown in FIG. 10 is indicated, in the case where detection is made by both the first and second collision detection means, an I region is indicated, in the case where detection is made by both the first and third collision detection means, a G region is indicated, in the case where detection is made merely by the second collision detection means, a right-hand J region is indicated, and in the case where detection is made merely by the third collision detection means, a left-hand F region is indicated.

A pedestrian or an electricity pole is not in a plurality of regions, but in the collision with the vehicle, outputs are detected in a plurality of regions. The size and mass of the collided body can be presumed from the relation with the collision strength ranks. An example shown in Table 4 is the detection over a plurality of regions and the same collision strength rank, which is a case of a method for selecting the collision strength of a part which receives the severest collision.

For example, "Judgement 6" corresponds to the collision with less offset with a stopping vehicle or an opposing vehicle, in which case, the ranks of the first to third collision strength are A, the collision regions are F to J, F to I, and G to J, or the ranks of the first to third collision strength are B, the collision regions are F to G, and I to J. In this case, a signal is output to the occupant protective device so as to operate the said device in the urgent operating mode.

"Judgement 5" corresponds to an offset collision of about ½ or a rear-end collision, in which case, the ranks of the first to third collision strength are B, the collision regions are F to J, F to H, and H to J, or the ranks of the first to third collision strength are C, the collision regions are F to G, and I to J. In this case, a signal is output to the occupant protective device so as to operate the said device in the normal operating mode.

"Judgement 4" corresponds to a relatively weak collision, in which case, the ranks of the first to third collision strength are C, the collision regions are F to J, F to H, and H to J. In this case, a signal is output to the occupant protective device so as to operate the said device in the slow operating mode.

"Judgement 3" corresponds to a collision with a small-diameter fixed body such as an electricity pole, in which case, the ranks of the first to third collision strength are C, the collision regions are F, G, H, I and J. In this case, signals are output to an occupant protective device for a head-on collision and an occupant protective device for a flank collision so as to operate the respective device in a slow operating mode and a waiting operating mode, respectively.

"Judgement 2" corresponds to a collision with a light vehicle such as a bicycle, in which case, the ranks of the first to third collision strength are D, the collision regions are F to G, G to H, H to I, and I to J. In this case, a signal is output to the pedestrian protective device so as to operate the said device in the waiting operating mode. At this time, a device for preventing falling from the vehicle is operated by a signal of the coalition detection sensor on the bonnet.

"Judgement 1" corresponds to a collision with a pedestrian, in which case, the ranks of the first to third collision strength are D, the collision regions are either F, G, H, I, and J. In this case, a signal is output to the pedestrian protective device so as to operate the said device.

In the collision discriminating apparatus for vehicles according to the fourth embodiment exhibiting the above-described operation, the obstacles collided with the bumper are detected by the first, second, and third collision detection means 11A, 11B, and 11C, and the size and mass of the collided bodies such as a person or the weight body such as the vehicle and the collision position are presumed from the characteristics of the change in detection signal thereof in accordance with the judgement table shown in Table 4.

In the fourth embodiment, the collision position can be specified by three collision detection means whose detection sensitivity is substantially the same, and therefore the precision of the discrimination of the collision between the vehicle and a pedestrian is higher than that of the first embodiment. Also, the presumed precision for offset amount of collided vehicles is higher.

Thereby, the protective devices for a pedestrian and an occupant can be operated more effectively, and only the protective device as necessary at a minimum can be operated. An overlap is not necessary for each collision detection means, but the resolution of the detection position is enhanced from about ⅓ to ⅕ of the vehicle width by applying the overlap.

(Fifth Embodiment)

The collision discriminating apparatus for vehicles according to a fifth embodiment is an embodiment in which the second aspect is further specified, in which as shown in FIGS. 12 to 17, a shock absorbing member 201 for a vehicle formed of a hard urethane foam is disposed on a base portion of the vehicle in a bumper 100, and a shock absorbing member 202 for a pedestrian formed of a soft urethane foam is disposed on the front surface of the shock absorbing member for a vehicle, the shock absorbing member 202 for a pedestrian being formed in the front thereof with a collision surface 10.

Figure 16:
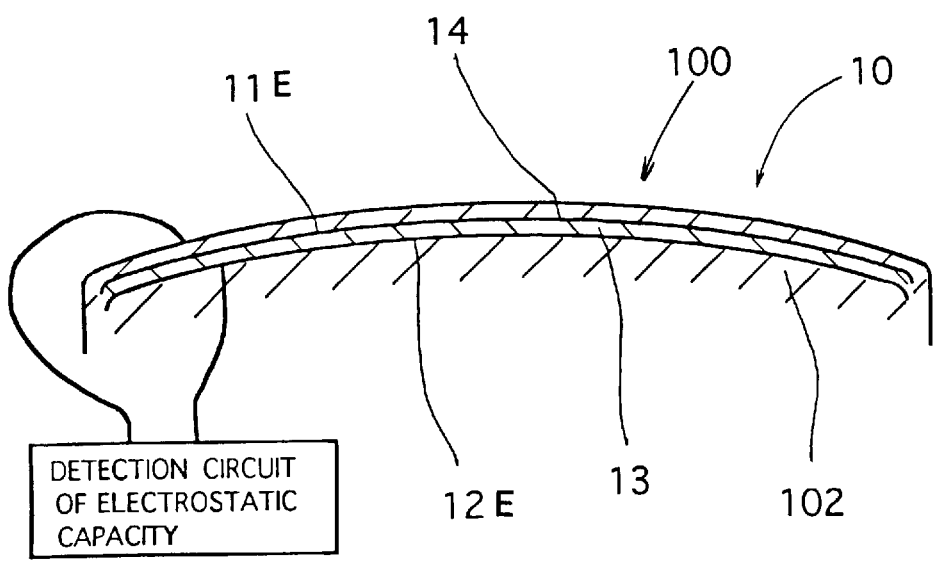
FIG. 16 is a sectional view showing an arrangement in a bumper of the collision detection portion according to the fifth embodiment.
Figure 17:
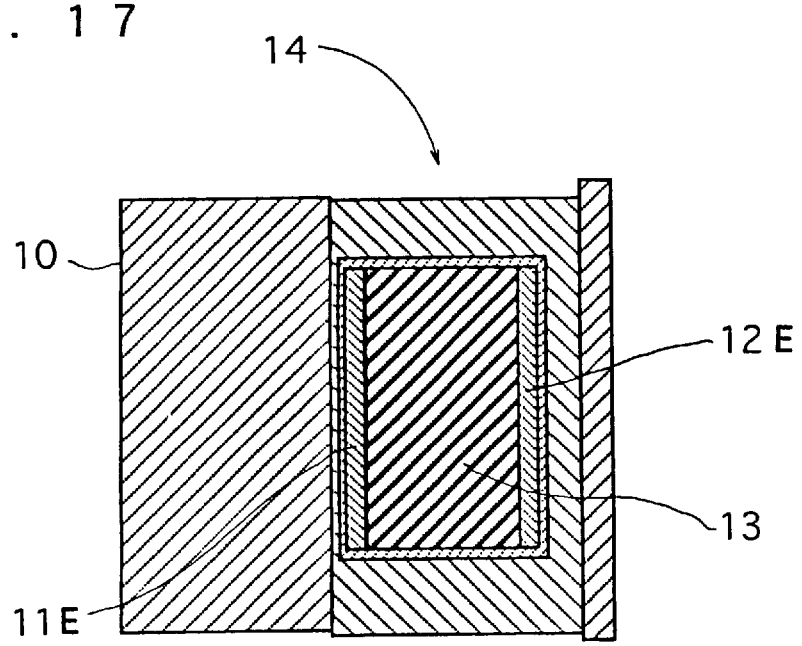
FIG. 17 is a cross sectional view showing an arrangement in a bumper of the collision detection portion according to the fifth embodiment.

As shown in FIG. 16, the electrostatic capacity type collision detection sensor 14 is mounted on the collision surface 10, two opposed electrodes 11E and 12E are disposed at fixed intervals over the substantially entirety widthwise of the vehicle of the shock absorbing member 102 for a pedestrian, and the dielectric 13 is interposed between the two opposed electrodes 11E and 12E.

Electrode materials constituting the opposed electrodes 11Ee and 12E are better when the have a good longitudinal expansion property. Metal mesh-like electrodes, metal electrodes with slits disposed at fixed pitch, or electrodes such as elastic members having a high conductivity may be used.

The dielectric 13 is preferably an elastic substance having a high dielectric constant, that is, rubber, whose dielectric constant is most preferably in the range of from 2 to 59. The compressive rigidity of the dielectric 13 is preferably 2 to 200 kPa/mm. When only the sensor is located in front of the bumper 100, the compressive rigidity is preferably 100 to 5000 kPa/mm.

Figure 15:
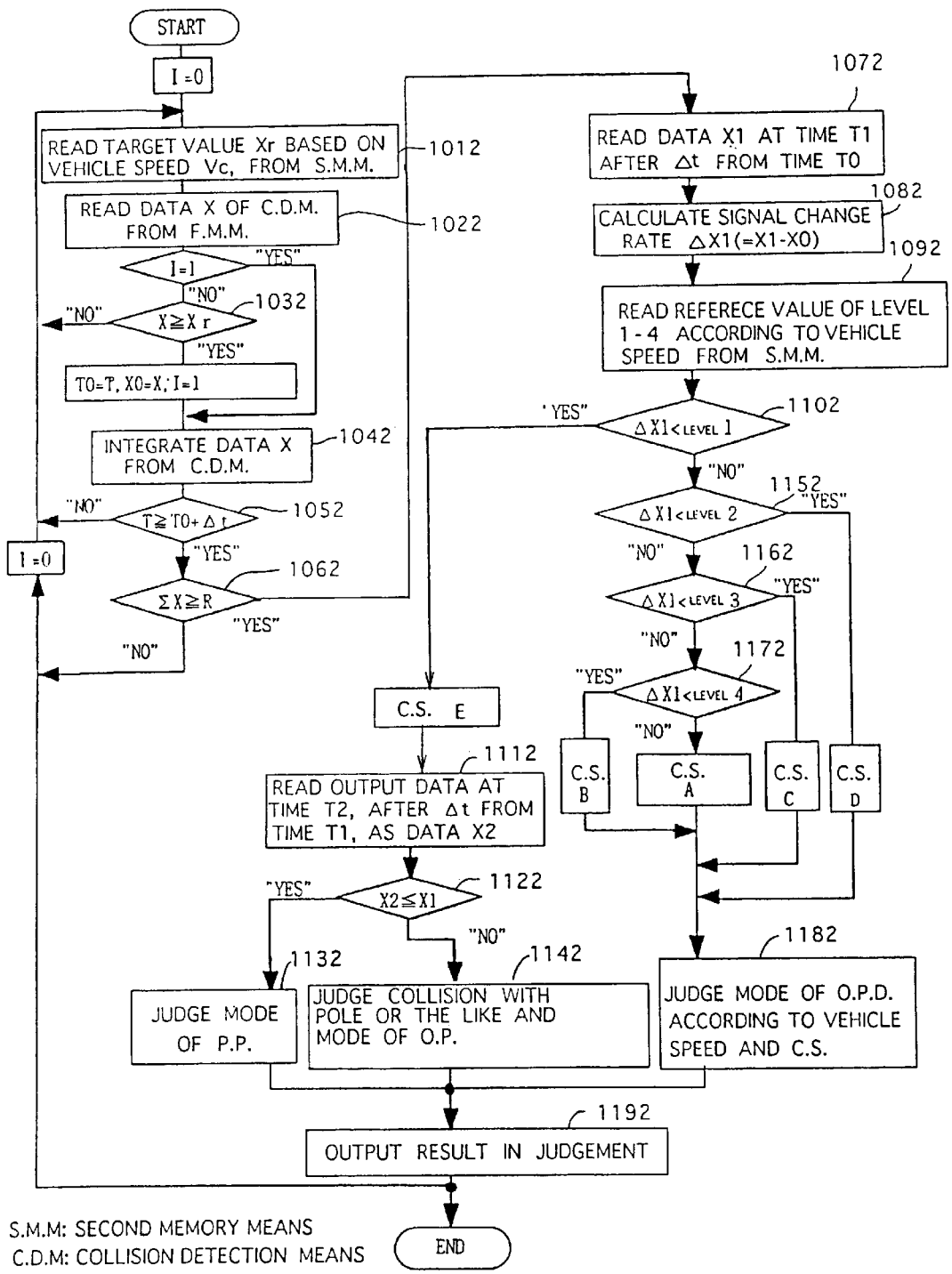
FIG. 15 is chart showing a judgement algorism according to the fifth embodiment.

The collision discrimination algorithm of the collision 5 discriminating apparatus for vehicles according to a fifth embodiment will be explained with reference to FIGS. 14 and 15. As shown in FIG. 15, in Step 1012, a target value Xr based on a vehicle speed Vc detected by the vehicle speed sensor 203 is read from the second memory means 22.

In Step 1022, electrostatic capacity data X from the collision detection means 1 is read from the first memory means 21. In Step 1032, judgement is made if the data X exceeds a reference value Xr. If it exceeds, T0=T, X0=X, and I=1 are set, and in Step 1042, the data X from the collision detection means 1 are integrated.

In Step 1052, judgement is made if the time T exceeds T0+Δt. If it exceeds, in Step 1062, judgement is made if integrated data ΣX exceeds a reference value R.

If it exceeds, in Step 1072, detection data of time T1 after Δt from time T0 are read as X1, and in Step 1082, a signal change rate ΔX1 (=X1−X0) is calculated.

In Step 1092, a reference value at levels 1 to 4 according to the vehicle speed is read from the second memory means, and in Step 1102, if the signal change rate ΔXI is less than a level 1, as the collision strength E, in Step 1112, output data at time T2 after Δt from time T1 are read as X2.

In Step 1122, in the case where the read output data X2 is smaller than or equal to X1 in the detection data at time T1, a pedestrian protective mode is judged in Step 1132.

In the case where the read output data X2 is larger than X1 in the detection data at time T1. In Step 1142, judgement is made to be a collision with a pole or the like, and an occupant protective mode is judged.

If the signal change rate ΔX1 is above a level 1 but less than a level 2, as the collision strength D, in Step 1182, judgement is made to be an occupant protective mode according to the vehicle speed and the shock strength.

If the signal change rate ΔX1 is above a level 2 but less than a level 3, as the collision strength C, in Step 1182, judgement is made to be an occupant protective mode according to the vehicle speed and the shock strength.

If the signal change rate ΔX1 is above a level 3 but less than a level 4 as the collision strength B, in Step 1182, judgement is made to be an occupant protective mode according to the vehicle speed and the shock strength.

If the signal change rate ΔX1 is above a level 4, as the collision strength A, in Step 1182, judgement is made to be an occupant protective mode according to the vehicle speed and the shock strength. Next, in Step 1192, the judgement results are output.

In the collision discriminating apparatus for vehicles according to the fifth embodiment, since the algorithm for integrating output signals for the time (Δt) is added to the process after the output signal from the collision detection means 1 exceeds the threshold, this copes with outputs having high frequency components as compared with noises or actual signal change, thus exhibiting the effect in which the erroneous judgement caused by noises is prevented by the integration.

Further, in the collision discriminating apparatus for vehicles according to the fifth embodiment, there exhibits the effect in which when the integrated value ΣX is equal or exceeds the reference value R, the mode is shifted to the judgement for first operating the protective device, and in case of others, the mode is returned to the initial monitoring mode.

(Sixth Embodiment)

Figures 18A, 18B:
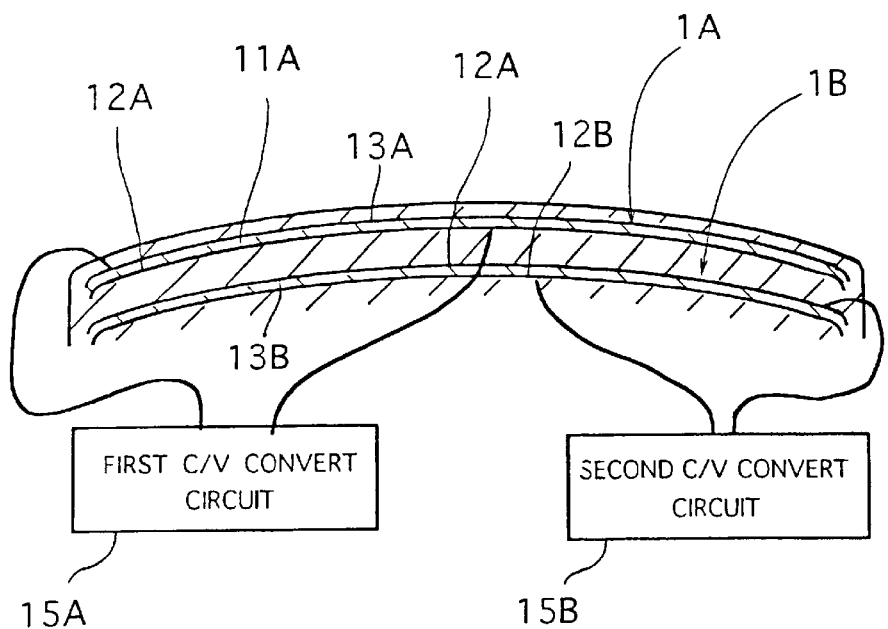
FIG. 18A is a sectional view showing an arrangement in a bumper of a collision detection portion in a collision discriminating apparatus for vehicles according to a sixth embodiment.
FIG. 18B is a matrix view showing a relationship between outputs of the first and second collision detection means, a collision position and a collision object.
Figure 19:
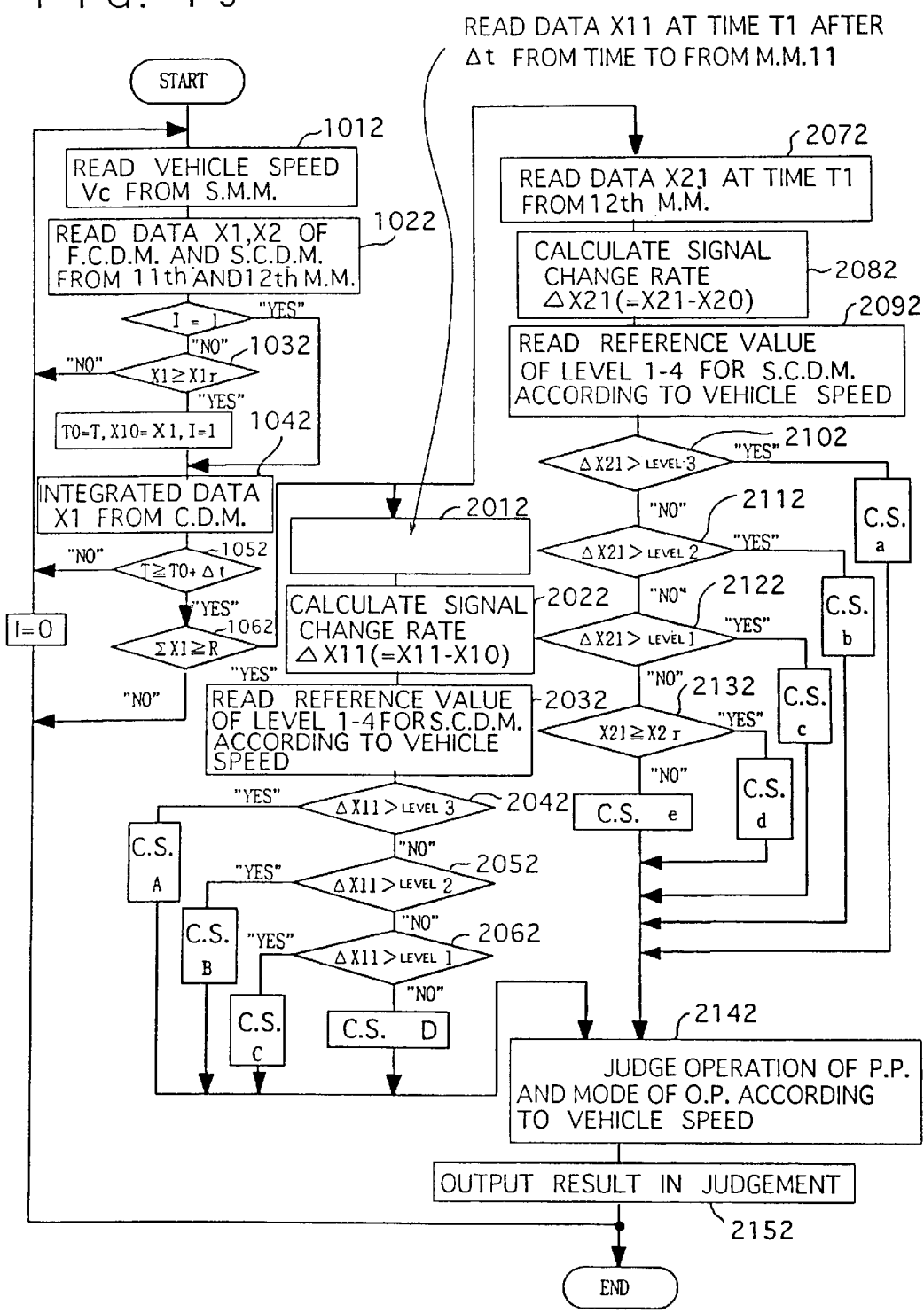
FIG. 19 is chart showing an judgement algorism according to the sixth embodiment.

The collision discriminating apparatus for vehicles according to a sixth embodiment is an embodiment belonging to the second aspect, which is different in that as shown in FIGS. 18A–B and 19, the first and second collision detection means 1A and 1B are juxtaposed on the base portion and the front portion on the vehicle side in the bumper 100. The difference will be mainly explained below.

The first collision detection means 1A is constituted so that two opposed electrodes 11A and 12B are disposed at fixed intervals over the entirety widthwise of the vehicle on the front portion in the bumper 100, the dielectric 13A is interposed between the two opposed electrodes 11A and 12A, and a small amount of deformation of the bumper to a degree of collision of a pedestrian is sensed.

The second collision detection means 1B is constituted so that two opposed electrodes 11B and 12B are disposed at fixed intervals over the entirety widthwise of the vehicle on the base portion in the bumper 100, the dielectric 13B is interposed between the two opposed electrodes 11B and 12B, and a large amount of deformation of the bumper as in a collision with the weight body such as the vehicle and the fixed body is sensed.

The electrostatic capacity detection circuits 15A and 15B are connected to the first and second collision detection means 1A and 1B, respectively, and the electrostatic capacity value is converted into a voltage for detection of electrostatic capacity, which is output to the first and second collision object presuming means for performing the judgement as shown in FIG. 18B.

In the collision discrimination algorithm of the collision discriminating apparatus for vehicles according to the sixth embodiment, as shown in FIG. 19, Steps 1012 to 1062 are similar to the fifth embodiment. In Steps 2012 to 2062. and Steps 2072 to 2132, the collision strength is judged similar to the fifth embodiment on the basis of data from the 11th memory means and the 12th memory means. In Step 2142, the judgement of the operating modes for the pedestrian protection and the occupant protection are carried out, and Step 2152, the judgement results are output.

Figure 20A:
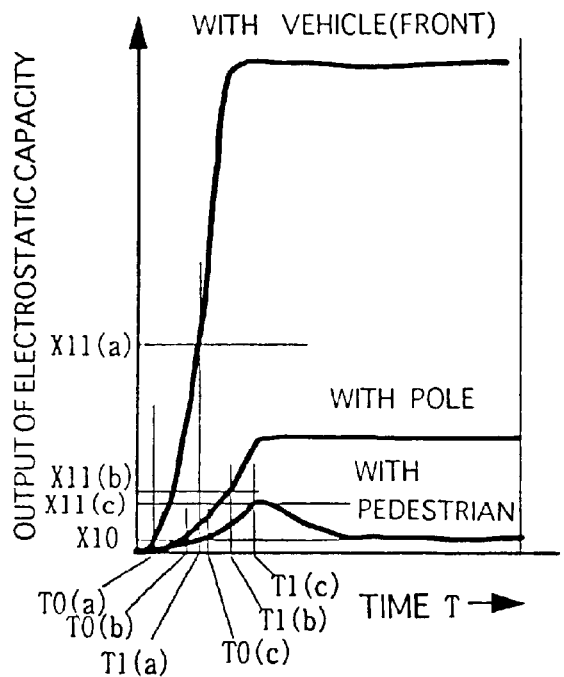
FIGS. 20A and 20B are diagrams showing an output example of the sixth embodiment.
Figure 20B:
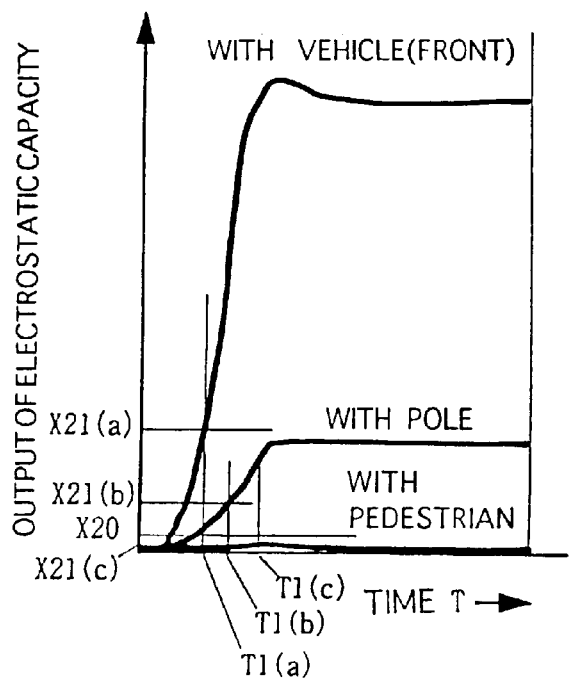

The collision discriminating apparatus for vehicles according to the sixth embodiment exhibits the effect that the collision with a pedestrian and the collision with the weight body such as a vehicle and the fixed body (such as a support pole, a pole and others) can be definitely discriminated, as shown in FIGS. 20A and 20B, by the outputs from the first and second collision detection means 1A and 1B.

In the collision discriminating apparatus for vehicles according to the sixth embodiment, since the algorithm for integrating output signals for the time (Δt) is added to the process after the output signal from the collision detection means 1A and 1B exceeds the threshold, this copes with outputs having high frequency components as compared with noises or actual signal change, thus exhibiting the effect in which the erroneous judgement caused by noises is prevented by the integration, as in the fifth embodiment.

Further, in the collision discriminating apparatus for vehicles according to the sixth embodiment, there exhibits the effect in which when the integrated value ΣX is equal or exceeds the reference value R, the mode is shifted to the judgement for first operating the protective device, and in case of others, the mode is returned to the initial monitoring mode.

(Seventh Embodiment)

The collision discriminating apparatus for vehicles according to a seventh embodiment is an embodiment belonging to the second aspect, which is different in that as shown in FIGS. 21A–B and 22, the first and second collision detection means 1A and 1B are juxtaposed so that central portions are superposed on upper and lower portions in the bumper 100, and the region are separated into three regions A to C to enable detection of collison The difference will be mainly explained below.

The electrostatic capacity detection circuits 15A and 15B are connected to the first and second collision detection means 1A and 1B, respectively, and the electrostatic capacity value is converted into a voltage for detection of electrostatic capacity, which is output to the collision object presuming means 2 for performing the judgement as shown in FIG. 22.

The collision object presuming means 2 is set so as to discriminate the collision strength based on the output from the first and second detection means, collision objects of a pedestrian, a pole, and a vehicle according to the collision regions (A, B, C), the kind of collisions (front, offset, rear-end collision) and the collision position as shown in FIG. 22. The method for determining ranks of the collision strength from the sensor output is similar to that of the fifth and sixth embodiments, which explanation is therefore omitted.

In the collision discriminating apparatus according to the seventh embodiment, since two collision detection sensors are arranged so that they are overlapped at upper and lower portions in the center, there exhibits the effect capable of discriminating the kinds of collisions and the collision position at three locations widthwise as shown in FIG. 22.

(Eighth Embodiment)

Figure 24:
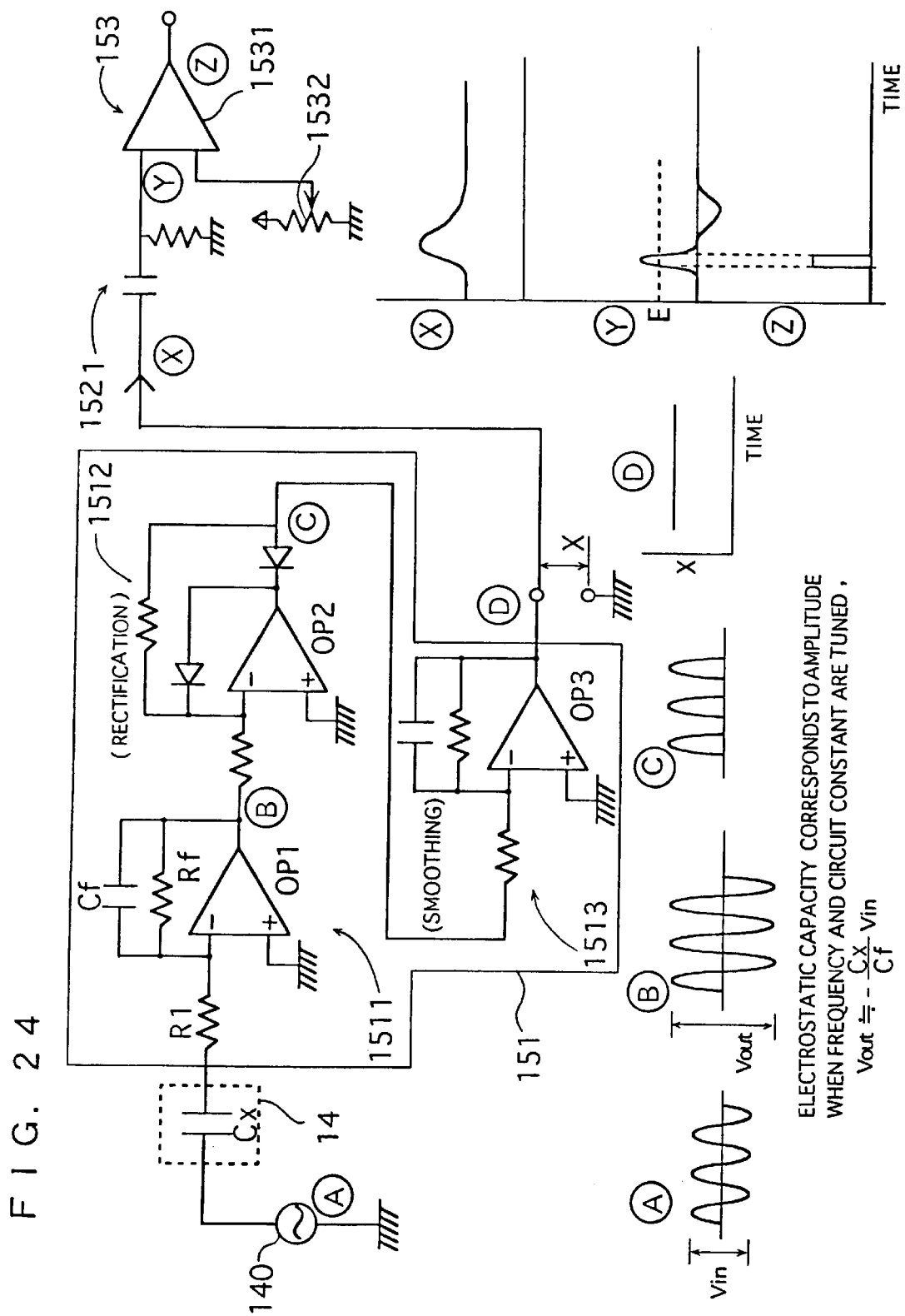
FIG. 24 is a circuit view showing a circuit constituting an electrostatic capacity detection circuit according to the eighth embodiment and a time chart showing signal waveforms.

The collision discriminating apparatus for vehicles according to an eighth embodiment is an embodiment belonging to the second aspect, in which as shown in FIGS. 23 to 25, an electrostatic capacity detection circuit 15 constituting the collision detection means 1 is constituted by an electrostatic capacity detection portion 151, an electrostatic capacity change rate operation means circuit 152, and a threshold-over decision circuit 153.

The electrostatic capacity detection portion 151 comprises, as shown in FIG. 24, an inverted amplification circuit 1511 of an OP amplifier for amplifying an electrostatic capacity output from the electrostatic capacity detection sensor 14 to output an amplified output B, a rectifier circuit 1512 of an OP amplifier for half-wave rectifying the amplified electrostatic capacity output to output a half-wave rectified electrostatic capacity output C, and a smoothing circuit 1513 of an OP amplifier for smoothing the half-wave rectified electrostatic capacity output D.

The electrostatic capacity change rate operation means circuit 152 is constituted by a differentiating circuit 1521 comprising a CR circuit for differentiating a DC output X including a variation portion resulting from the collision output from the smoothing circuit 1513 to output the differentiated output Y, and the threshold-over decision circuit 153 is constituted by a comparison circuit comprising an operation amplifier 1531 for comparing a threshold set by a variable resistor 1532 with the differentiated DC output X to output a pulse-like trigger output Z.

A sine wave signal A from an oscillator 140 is amplified in amplitude to about $-(Cx/Cf)$ by the inverted amplifier circuit 1511 of OP amplifier, and an amplified signal B is output. A half-wave rectified output C is output by the half-wave rectifier circuit 1512 of OP amplifier, and output as a DC signal D proportional to the amplitude value by the smoothing circuit 1513 of OP amplifier of the final group.

However, a frequency f of the sine wave signal of the oscillator 140 and a circuit constant of the inverted amplifier circuit 1511 of OP amplifier (OP1) are necessary to fulfill the conditions shown in the number 1 and the number 2 below.

$$\frac{1}{2\pi C_f R_f} << f << \frac{1}{2\pi C_x R_1} \quad (1)$$

$$f^2 \leq \frac{1}{2\pi C_f R_f} \frac{1}{2\pi C_x R_1} \quad (2)$$

$f$: frequency (Hz) of a sine wave signal $Cf$, $Cx$: sensor portion, electrostatic capacity (F) of capacitor $Rf$, $R1$: electric resistance (Ω)

The output X which is the DC signal D of the electrostatic capacity detection circuit is differentiated by the differentiating circuit 1521 comprising a capacitor and a resistor branched at a downstream end of the capacitor to obtain the output change rate Y, as shown in FIG. 24. Further, it is compared with a threshold E by the comparison circuit 1531 by the OP amplifier, and at the time exceeding the threshold, a trigger signal output Z is output. The threshold E is set by a variable resistor 1532 provided between a constant voltage terminal and an earth.

The collision discriminating apparatus for vehicles according to the eighth embodiment measures for the case where a sampling period is rough in comparison with the phenomenon of collision, and processes as much as possible in an analog circuit for converting an electrostatic capacity into a voltage. Here, the collision is always monitored by the analog circuit, and when an analog output from the collision detection means 1 reaches a certain level, a trigger signal is generated.

The collision discrimination algorithm according to the digital process in the collision object presuming means 2 is started by the trigger signal. The analog circuit is allowed to have a function for differentiating a sensor output, and a differentiated signal Y together with an electrostatic capacity output signal and a trigger signal are input into the collision object presuming means 2 for the digital process.

The discrimination algorithm according to the eighth embodiment will be explained below. The aforementioned embodiment is characterized by a portion which starts the operation processing with collision discrimination ECU by a trigger signal (Z) from an analog circuit constituting the external collision detection means 1 and a portion for reading the output change rate in addition to the output of the collision sensor.

In the present algorithm (see FIG. 25) in Step 4022, next data are read by the output change rate Y0 of time T0 at which a trigger signal issues exceeding a threshold, and in Step 4032, the data read time T1 can be corrected within the time (T1=T0+Δt) determined by the vehicle speed. For example, there is a great difference in the sensor output change between the collision with a pedestrian and the rear-end collision with a stopping vehicle. Determining this merely by the vehicle speed simply, the quick phenomenon cannot be grasped. Or the slow phenomenon cannot be detected with accuracy by the resolution or the like. Therefore, in Step 4042, a desirable Δt is determined from the output change rate ΔX per unit time when exceeding the threshold, whereby the precision of discrimination and the discrimination speed are enhanced though collided.

In Step 4052, judgement is made if the pressure increment rate ΔX exceeds the minimum reference value Xr for operating some protective device. If not exceeding, the mode is returned to the monitoring mode again.

Further, the characterizing portion is that when whether a pedestrian or a small-diameter fixed support pole is judged after judgement of the collision strength E, in Steps 4072 and 4082, the output change rate Y1 at the time R1 is read to discriminate both the bodies by whether or not the output change rate Y1 is larger than the target value Yr. As shown in FIG. 25, since the judgement can be made at the stage of T1 without delaying the judgement of a pedestrian by T2, the operation of the protective device can be quickened.

Figure 26:
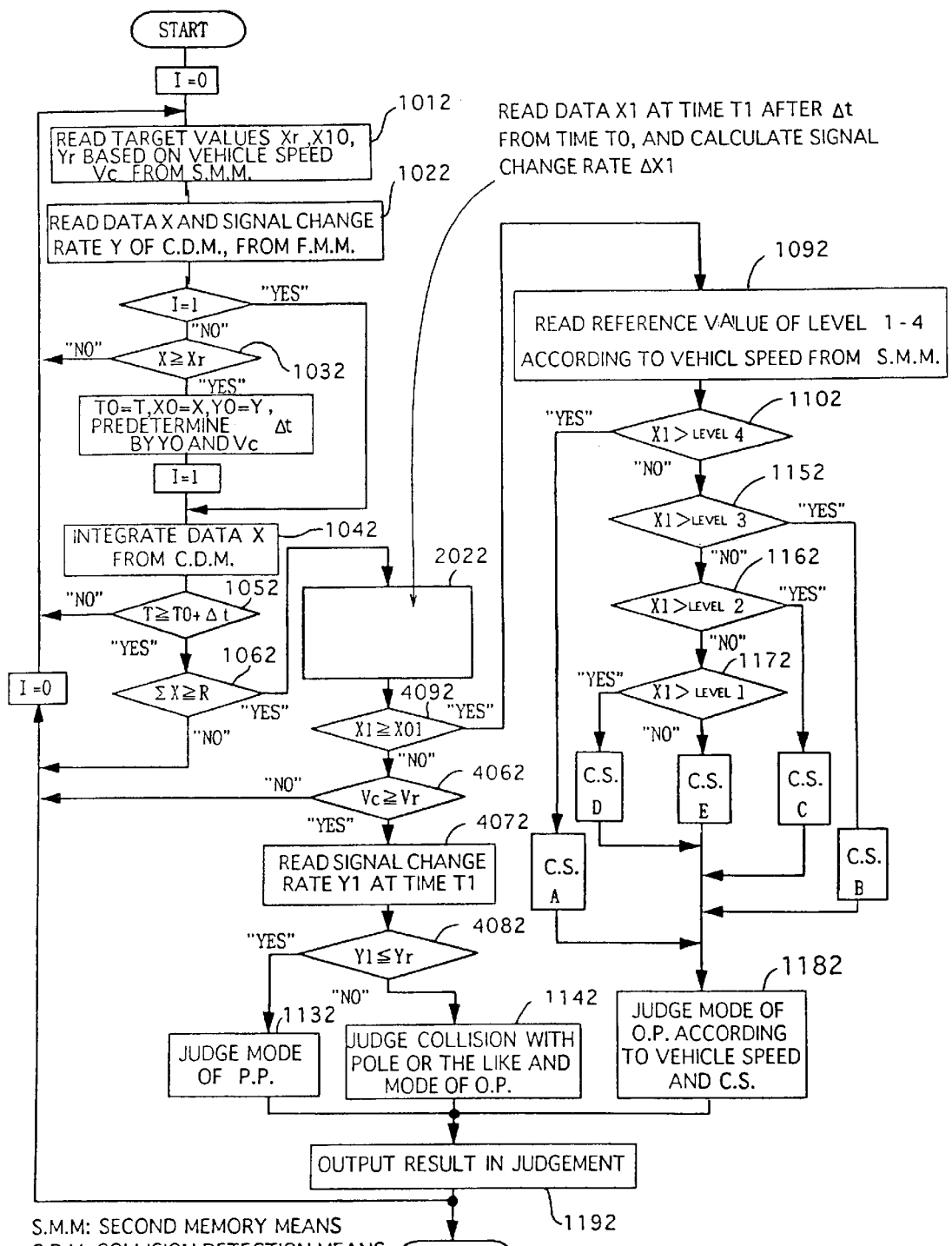
FIG. 26 is chart showing a judgement algorism according to a modification of the eighth embodiment.

The discrimination algorithm in a modified example of the eighth embodiment is mainly different in that Steps 4012 to 4052 of the discrimination algorithm of the eighth embodiment are changed into Steps 1012 to 2022 of the sixth embodiment, as shown in FIG. 26. The erroneous judgement preventive algorithm due to the noise described in the fifth embodiment shown in FIG. 15 is added to the eighth embodiment shown in FIG. 25.

(Ninth Embodiment)

Figure 27:
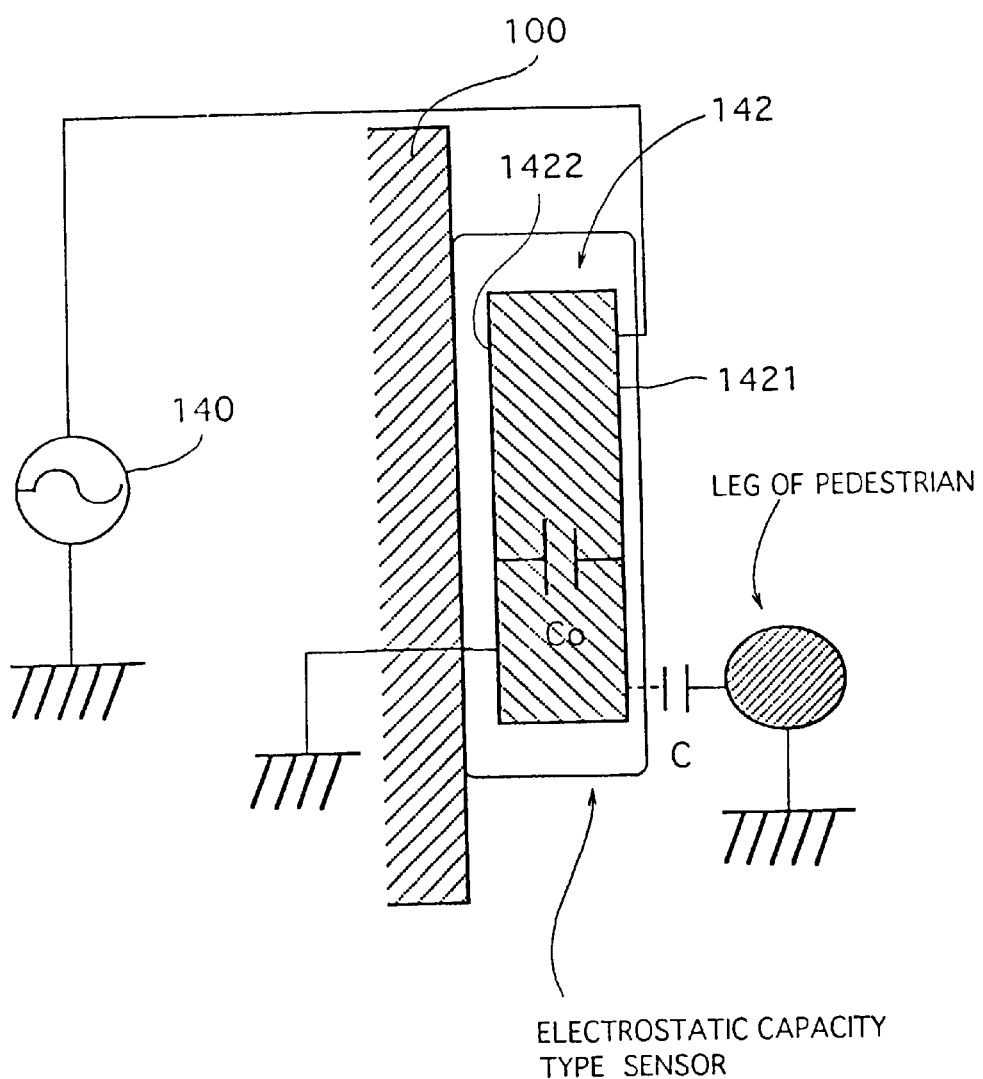
FIG. 27 is an explanatory view showing a collision discriminating apparatus for vehicles according to a third aspect and a ninth embodiment.
Figure 28:
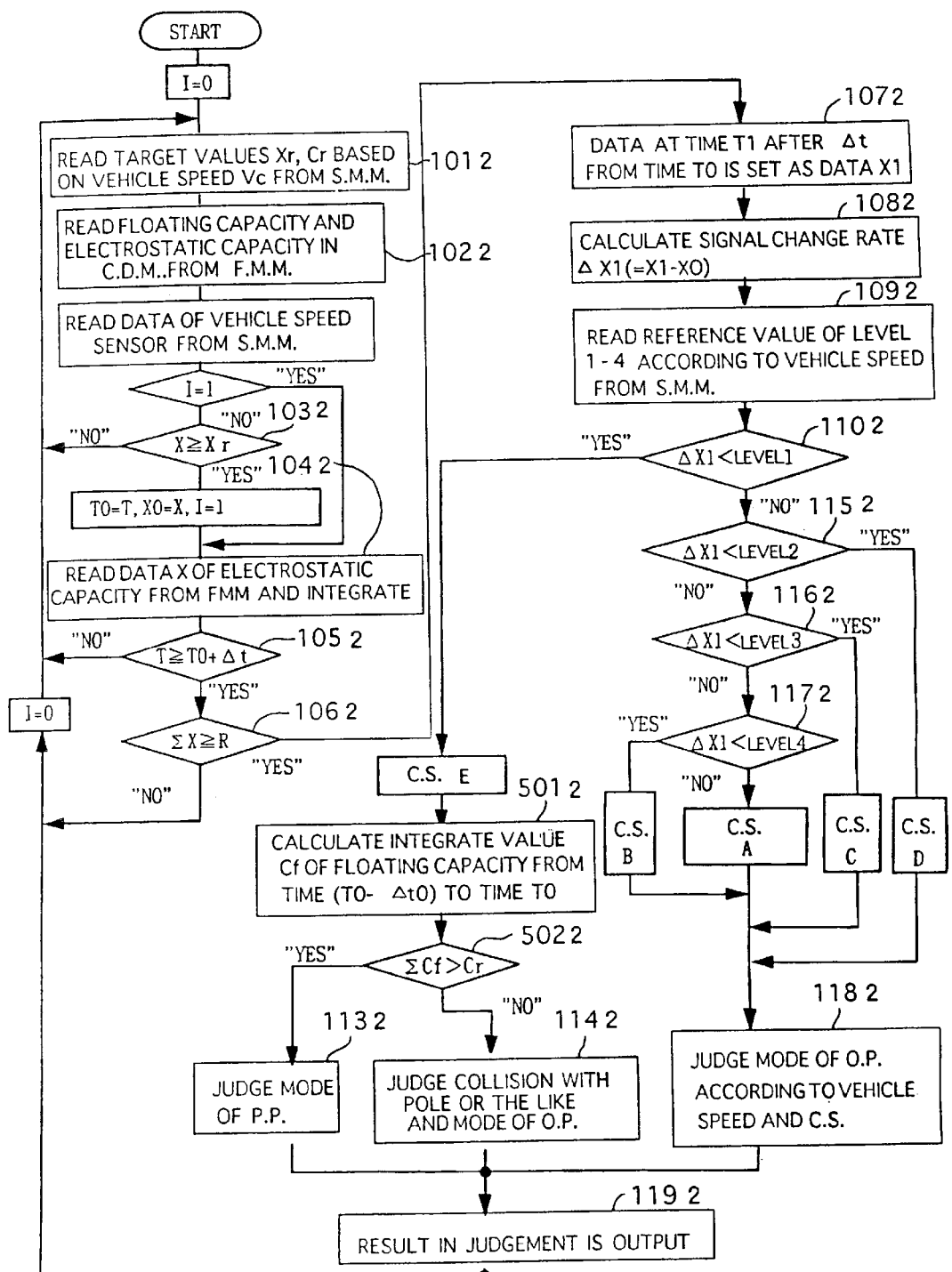
FIG. 28 is chart showing a judgement algorism according to the ninth embodiment.

The collision discriminating apparatus for vehicles according to a ninth embodiment is an embodiment belonging to the third aspect, in which a floating capacity change prior to collision with the human body of a pedestrian or the like is detected by a second electrostatic capacity type collision detection sensor 142 as shown in FIGS. 27 and 28.

The precision of discrimination between a pedestrian and a soft center pole or a pylon is enhanced. The second electrostatic capacity type sensor 142 is mounted on the surface of the bumper 100 in order to detect the floating capacity change or disposed at a position very close to the bumper surface, and detects, prior to collision, a change of a floating capacity C generated between one electrode 1421 on the pedestrian side out of a pair of electrodes 1421 and 1422 disposed oppositely at fixed intervals and the pedestrian.

The algorithm of the collision discriminating apparatus for vehicles according to the ninth embodiment is that the algorithm in which as shown in FIG. 28, a change of a floating capacity prior to collision with the human body of a pedestrian or the like is read by the second electrostatic capacity type collision detection sensor, in Step 5012 outputs resulting from the floating capacity within the time immediately before collision are integrated, and in Step 5022 if the total amount (ΣCf) exceeds the target value (Cr), judgement is made to be a pedestrian, is added to the algorithm of the fifth embodiment. In the ninth embodiment, the floating capacity is integrated for a predetermined time, but the maximum valve within the predetermined time may be used. Other steps are the same as FIG. 15.

In the collision discriminating apparatus for vehicles according to the ninth embodiment, the second electrostatic capacity detection sensor detects, prior to collision, a floating capacity generated between one electrode of the electrostatic capacity type collision detection sensor portion and a pedestrian, and the discrimination means compares, before a pedestrian or an obstacle comes in collision with the collision surface of the collision detection means, the output value of the floating capacity from the electrostatic capacity detection circuit with the threshold to thereby discriminate a person from the obstacle. This exhibits the effect to render the collision object possible to discriminate the person from the obstacle prior to collision.

(Tenth Embodiment)

The collision discriminating apparatus for vehicles in a tenth embodiment according to a fourth aspect comprises, as shown in FIGS. 29 to 32, a pressure sensor 3F in which a collision detection means 1 as a detection portion is mounted on the bumper 100 of a vehicle 100V, which is formed with a collision sensitive tube 2F as a chamber filled with a incompressive fluid and deformable according to collision with a collision object and which detects pressure in the collision sensitive tube 2F at the time of collision with the collision object; and a judgement means 2 provided with a collision object presuming means 40 for presuming the collision object by a rising pattern of pressure waveform due to the collision of the collision object on the basis of a pressure variation in the collision sensitive tube 2F according to the collision with the collision object detected by the pressure sensor 3F.

Figure 29:
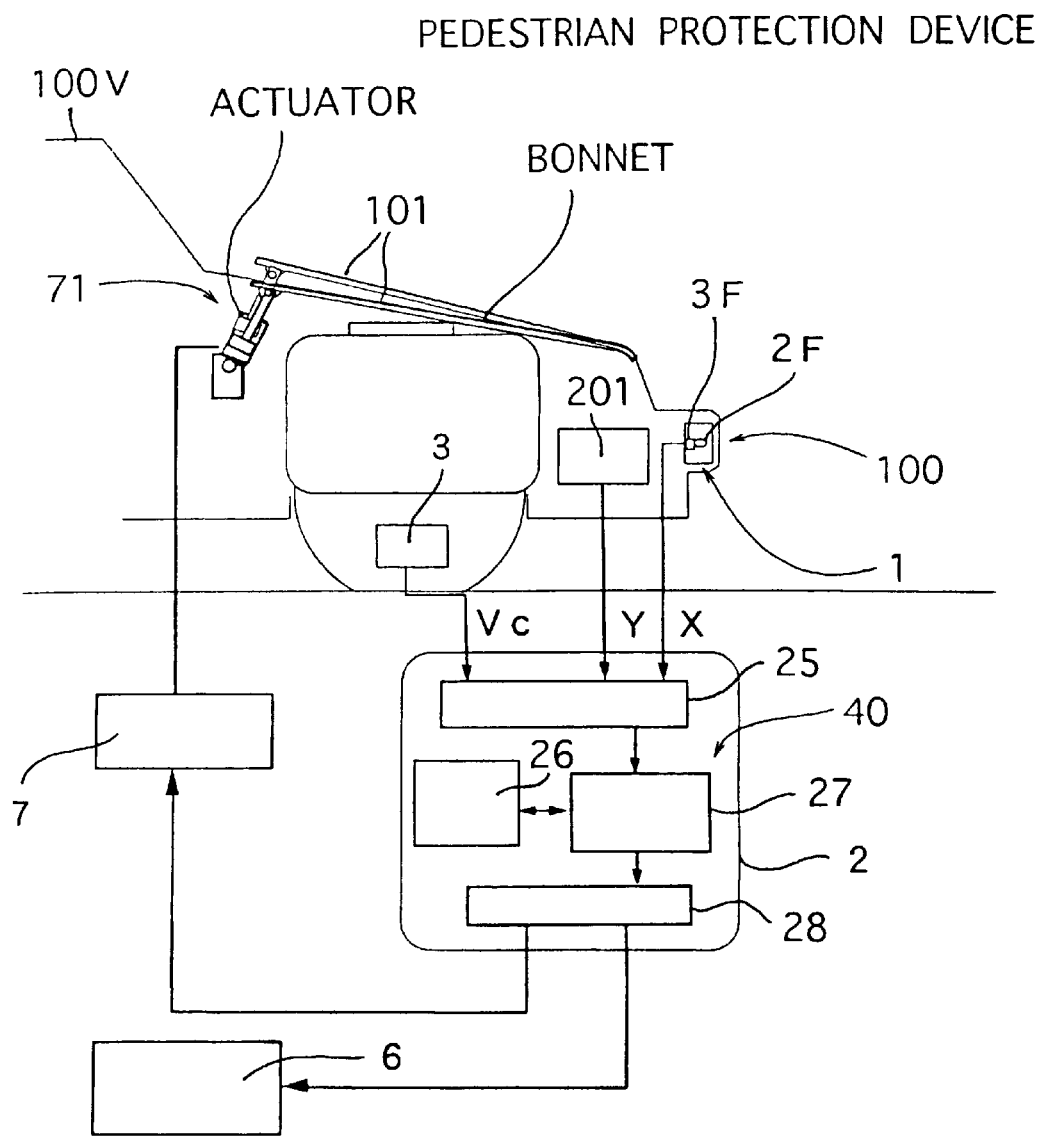
FIG. 29 is a block diagram showing a collision discriminating apparatus for vehicles according to a tenth embodiment.

The collision discriminating apparatus for vehicles according to the tenth embodiment is provided with protective devices for a pedestrian and an occupant as shown in FIG. 29. The vehicle body acceleration is used for discrimination of collision, and the occupant protective device is operated in a plurality of modes.

Figure 30:
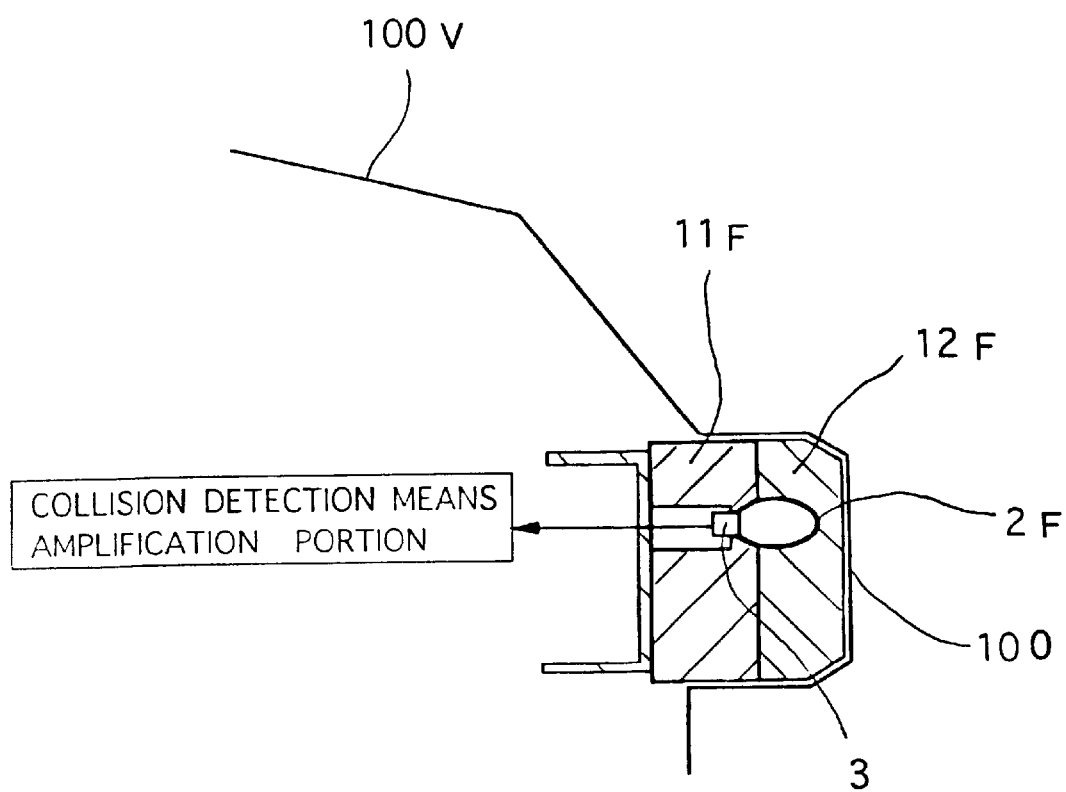
FIG. 30 is a sectional view in section taken on line A—A of FIG. 32 showing a collision detection means according to the tenth embodiment.
Figure 31:
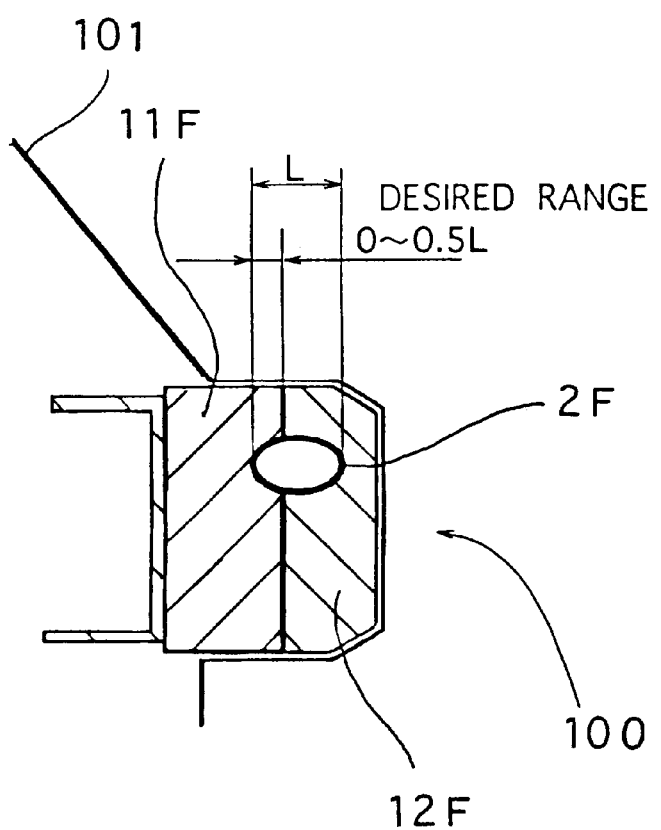
FIG. 31 is a sectional view in section taken on line B—B of FIG. 32 showing a collision detection means according to the tenth embodiment.
Figure 32:
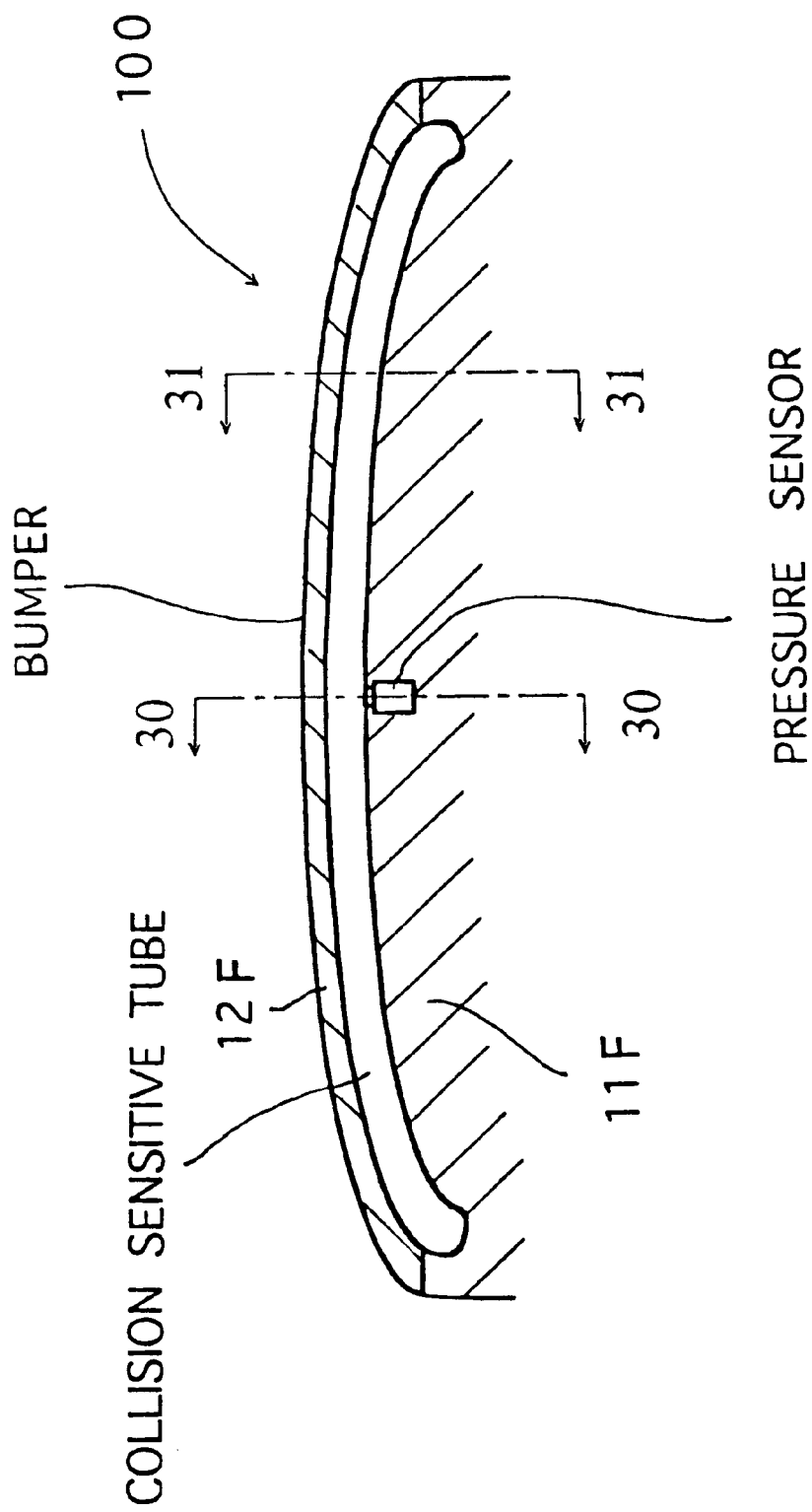
FIG. 32 is a sectional view showing the collision detection means extending over the entire bumper according to the tenth embodiment.

The collision detection means according to the tenth embodiment comprises a construction and a sensor arrangement as shown in FIGS. 30 to 32. The collision sensitive tube 2F has an elliptic or a circular cross-section as shown in FIGS. 30 and 31, and is embedded in the bumper 100 so as to extend over one width direction as shown in FIG. 32. The pressure sensor 3F is disposed in the central portion of the collision sensitive tube 2F, and a change in internal pressure in the collision sensitive tube 2F is detected by the pressure sensor 3F.

As shown in FIGS. 30 to 32, the collision sensitive tube 2F is inserted and arranged between a hard shock absorbing member 11F for relieving the shock of the vehicle collision inserted in the bumper 10 and a soft shock absorbing member 12F for relieving the shock of legs of a pedestrian. In the collision sensitive tube 2F, the surface of the tube which is high in airtightness and soft is coated with a fibrous reinforcing member (blade) so as to minimize tangential and axial extensions with respect to the change in internal pressure. The radial and axial extensions lower the sensitivity of the collision sensitive tube and should be minimized under the conditions that not impair deformation of the tube in a proceeding direction of the vehicle.

The collision sensitive tube 2F employs the constitution of the detection portion of the collision detection means 1 as described above whereby to precisely sense even collision in the weak and narrow range such that a pedestrian collides.

The judgement means 2 comprises, as shown in FIG. 29, the pressure sensor 3F for detecting the change in pressure in the collision sensitive tube 2F of the collision detection means 1, an acceleration sensor 201 for detecting acceleration of the vehicle body, a sampling means 25 connected to the vehicle speed sensor 3 for detecting the speed of the vehicle to perform sampling of detection signals every sampling time, a memory means 26 for storing various reference values, a threshold and other data, an operation processing means 27 provided with a function as a collision object presuming means 40 for comparing sampling signals from the sampling means with the stored various reference values, a threshold, etc. at the memory means 26 to presume the collision object and the collision strength, and a protective device selection means 28 for selecting a protective device to be operated on the basis of the collision object presumed.

The control means 7 for the pedestrian protection is connected to the protective device selection means 28 as shown in FIG. 29, and when the collision object is presumed to be a pedestrian, outputs a control signal to an actuator 71 for swinging the bonnet 101 in a clockwise direction.

A dual mode occupant protective device 6 is connected to the protective device selection means 28 as shown in FIG. 29, and if the collision object is presumed to be an obstacle or a vehicle, outputs a control signal to actuate a gas bag (not shown).

Figure 33:
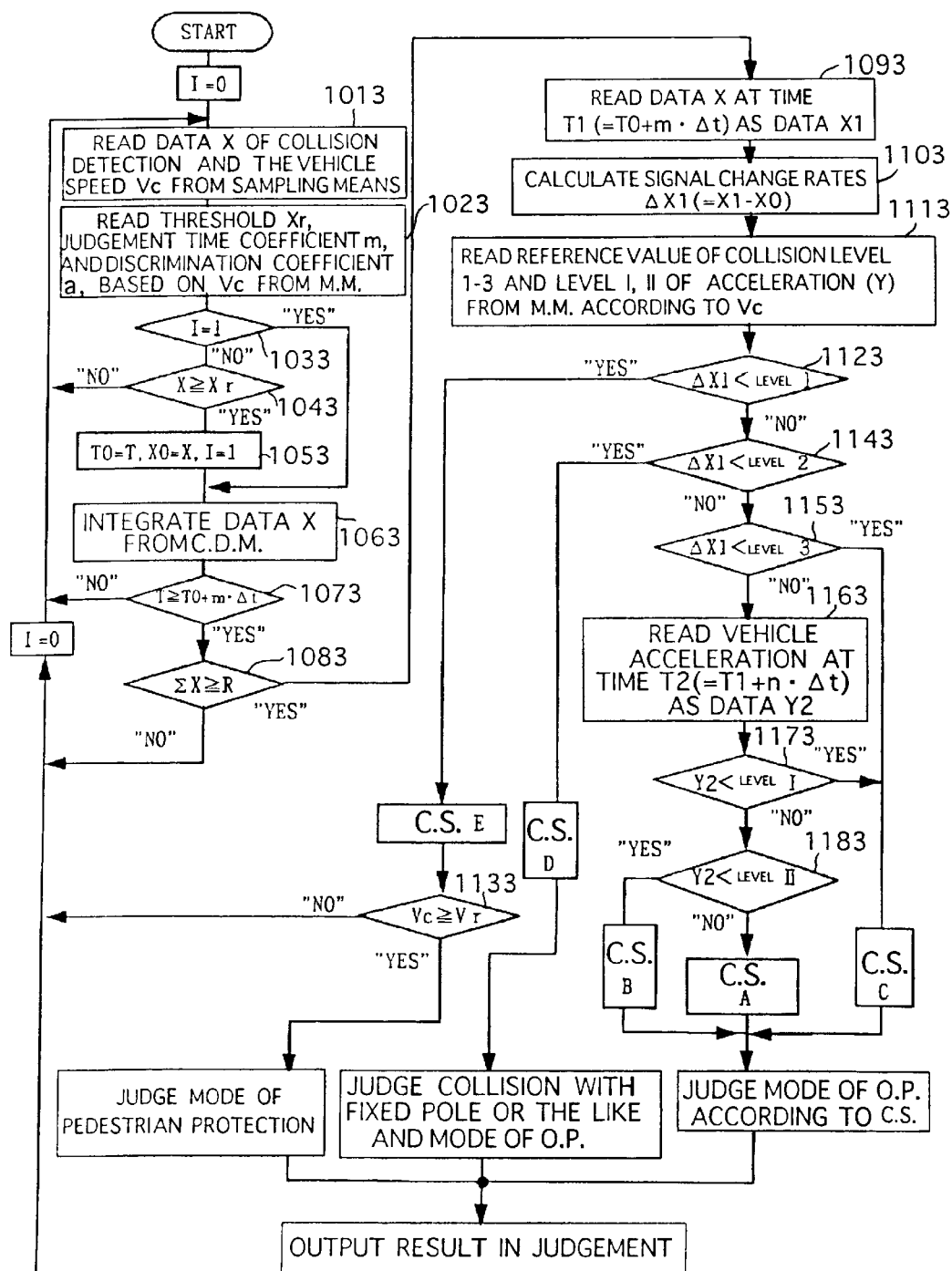
FIG. 33 is chart showing a judgement algorism according to the tenth embodiment.

The collision discrimination algorithm of the collision discriminating apparatus for vehicles according to the tenth embodiment constructed as described above will be explained with reference to FIG. 33.

In Step 1013, a collision detection output X from the sampling means 25 and a vehicle speed Vc detected by the vehicle speed sensor 3 are read, and in Step 1023, a threshold Xr, a judgement time coefficient m, and a discrimination coefficient a on the basis of the vehicle speed Vc read from the memory means 26 are read.

In Step 1033, judgement is made if I is 1. If not 1, in Step 1043, judgement is made if the collision detection output X from the sampling means 25 is larger than the threshold Xr, and if larger, in Step 1053, T0=T, X0=X, and I=1 are indicated.

If the judgement in Step 1033 is 1, in Step 1063 data X from the collision detection means 1 are integrated. In Step 1073, judgement is made if the time exceeds T0+m·Δt, and if exceeds, in Step 1083, judgement is made if the integrated data ΣX exceeds the reference value R.

If exceeds, in Step 1093, the detection data X of the time T1(T0+m·Δt) after m·Δt from the time T0 is read as X1, and in Step 1103, the signal change rate ΔX1(=X1−X1) is calculated.

In Step 1113, collision levels 1 to 3 and reference values of accelerations I and II according to the vehicle speed Vc are read from the memory means. In Step 1123, judgement is made if the signal change rate ΔX1 is below a level 1, and if below a level 1, in Step 1133, as the collision strength E, judgement is made if the vehicle speed Vc exceeds the reference vehicle speed Vr. If exceeds, judgement is made to be a pedestrian protective mode, and the judgement result is output.

If the signal change rate ΔX1 is not below a level 1, in Step 1143 the judgement is made if it is below a level 2. If below a level 2, judgement is made to be the collision against a fixed support pole or the like as the collision strength D to judge the occupant protective mode, and the judgement result is output.

If the signal change rate ΔX1 is not below a level 2, in Step 1153 the judgement is made if it is below a level 3. If below a level 3, judgement is made to be an occupant protective mode according to the collision strength as the collision strength C, and the judgement result is output.

If the signal change rate ΔX1 is above a level 3, in Step 1163 it is read as a vehicle speed acceleration Y2 a vehicle acceleration Y at the time of T2 after n·Δt from the time T1.

In Step 1173, the judgement is made if the read vehicle body acceleration data Y2 exceeds a level 1 of acceleration. If not exceeded, the judgement is made to be an occupant protective mode according to the collision strength as the collision strength C, and the judgement result is output.

If the vehicle body acceleration data Y2 exceeds a level I of acceleration, In Step 1183 the judgement is made if the vehicle body acceleration data Y2 exceeds a level II of acceleration. If not exceeded, the judgement is made to be an occupant protective mode according to the collision strength as the collision strength B, and the judgement result is output.

If the vehicle body acceleration data Y2 exceeds a level II of acceleration, the judgement is made to be an occupant protective mode according to the collision strength as the collision strength A, and the judgement result is output.

Figure 34:
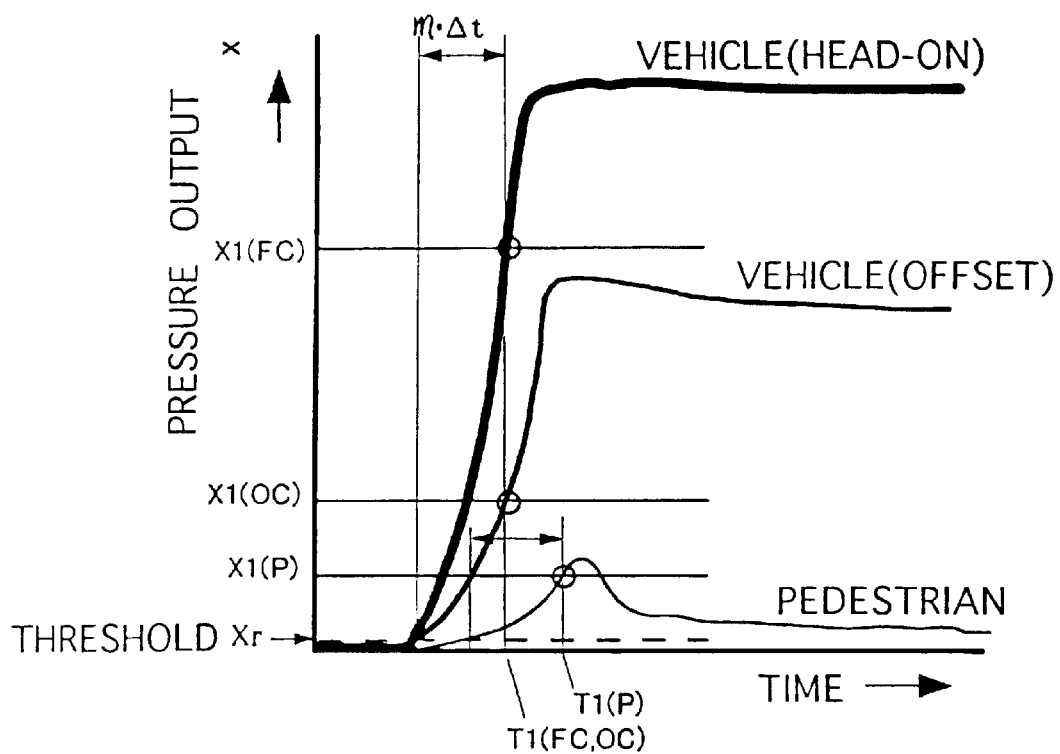
FIG. 34 is a diagram showing output waveforms of a typical collided body according to the tenth embodiment.
Figure 35:
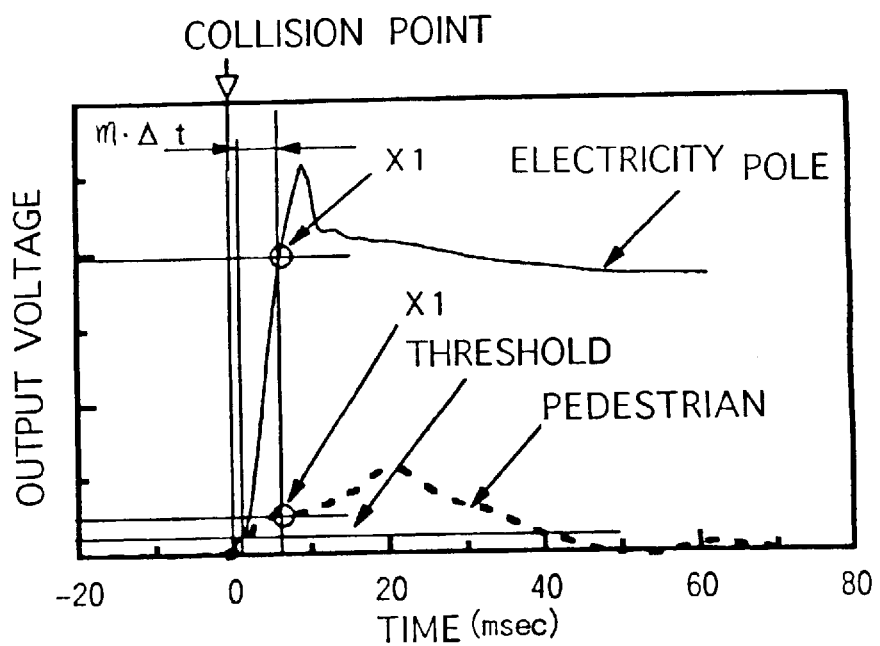
FIG. 35 is a diagram showing output waveforms of an elongated collided body according to the tenth embodiment.

FIGS. 34 and 35 show pressure waveforms which are outputs of typical kinds of collision objects (collided bodies) detected by the collision detection means 1. FIG. 34 is for the objects to collision with a pedestrian, or an offset vehicle, or a confront vehicle without offset and shows the difference in collision detection output at the time T1 after m·Δt (Δt is sampling time period) after exceeding the threshold by the collided body. FIG. 35 shows the output at the time of the collision with both a longitudinally elongated pedestrian and electricity pole, in which a difference in magnitude of output X1 at the time T1 is considered.

The collision discriminating apparatus for vehicles according to the tenth embodiment exhibiting the above-described operation is characterized by the judgement of the collision strength from both pressure signal which is an output at the time of collision from a single pressure sensor 3 and vehicle body acceleration.

The collision discriminating apparatus for vehicles according to the tenth embodiment exhibits the effect that particularly, for starting the operation of the occupant protective device as quick as possible, the collision strength from the output (pressure signal) of the collision detection means at the time T1 is divided into three stages (E, D, and C), and if above collision level 3 (collision strength C), instructions are issued so that the occupant protective device can be developed with minimum power.

The collision discriminating apparatus for vehicles according to the tenth embodiment exhibits the effect that the vehicle body acceleration at the time T2 at which the vehicle body is greatly deformed by the collision to increase the vehicle body acceleration is read, and the collision strength is looked over from the acceleration; and since the collision strength is judged in three stages (C, B, and A). If the collision strength (B or A) at the time T2 is greater than the collision strength C judged at the time T1, instructions are issued so as to increase the magnitude of the developing power output of the occupant protective device to enable the operation of the occupant protective device in the dual mode.

Further, the collision discriminating apparatus for vehicles according to the tenth embodiment can start the operation in a quick timing in comparison with the conventional system in which the final operation of the occupant protective device is judged merely by the acceleration, and therefore, the air bag or the like can be actuated with low power. This leads to the effect that the operating force unnecessary for an occupant or the operation of the shock force can be relieved.

(Eleventh Embodiment)

Figure 36:
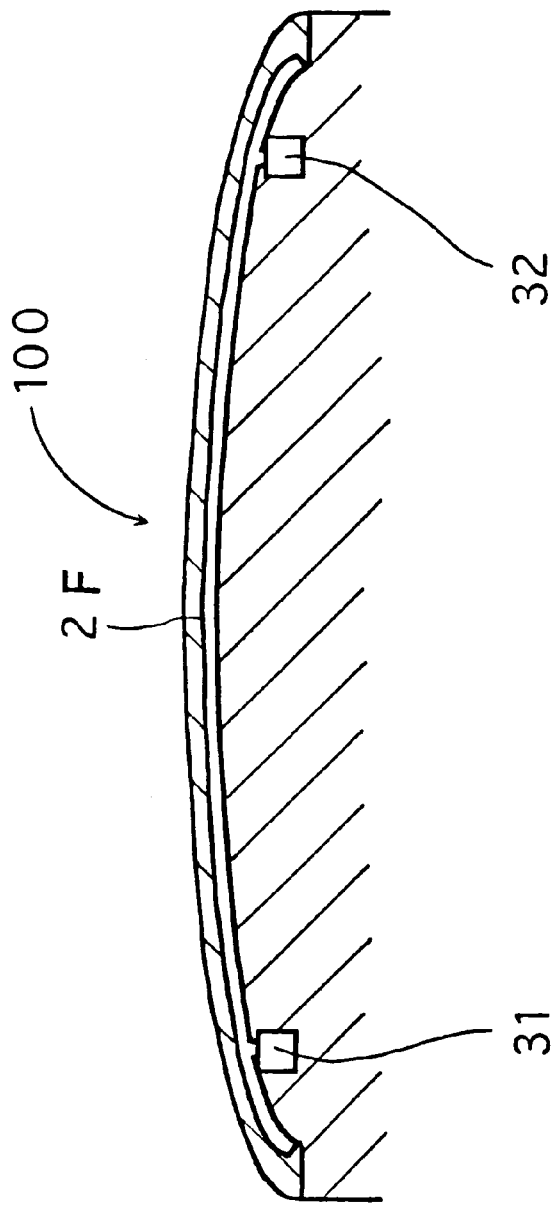
FIG. 36 is a sectional view showing an arrangement of a pressure sensor of a collision detection means in a collision discriminating apparatus for vehicles according to an eleventh embodiment.

The collision discriminating apparatus for vehicles according to an eleventh embodiment is that a collision detection means is constituted by a single collision sensitive tube 2F and two pressure sensors 31 and 32 as shown in FIG. 36. That is, the eleventh embodiment is different from the tenth embodiment in that the first and second sensors 31 and 32 are arranged on opposite sides of the collision sensitive tube 2F. The difference will be mainly explained below.

The sensor arrangement in the eleventh embodiment is to assume a collision position and a collided body from a difference in time between outputs of the first pressure sensor 31 and the second pressure sensor 32 and the magnitude of the change rate.

Figure 39:
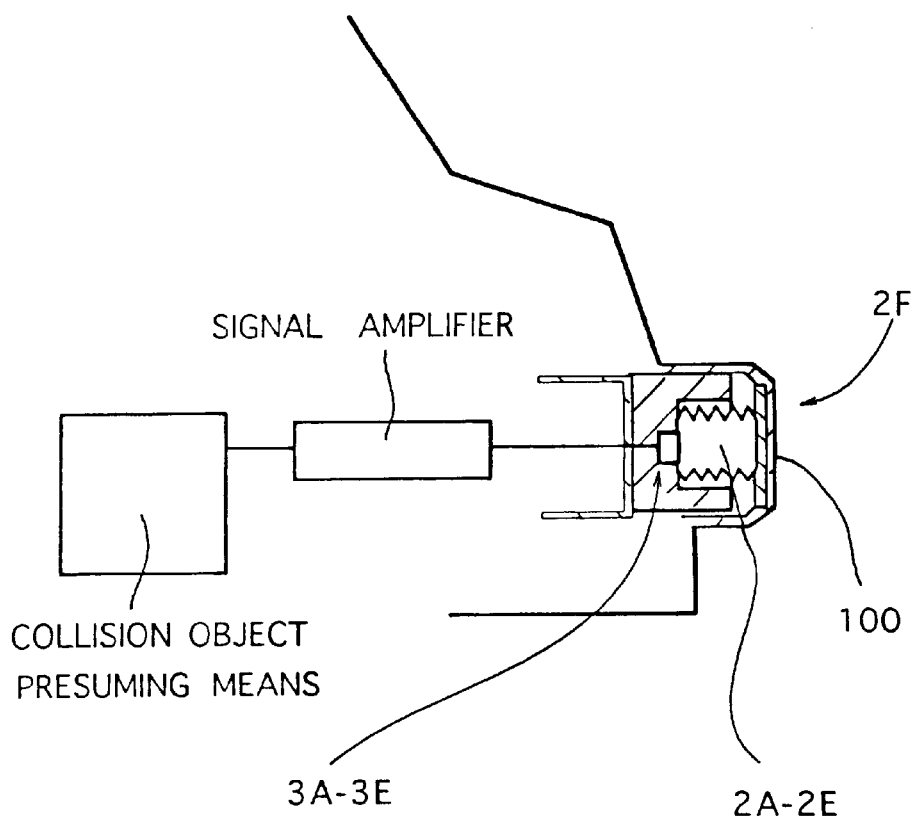
FIG. 39 is a sectional view showing a modification of the collision detection means according to the eleventh embodiment.

The propagation speed of pressure is approximately 50 to 300 m/s though it differs with the collision sensitive tube 2F and the rigidity of the shock absorbing members therearound. Therefore, if the width of the collision sensitive tube 2F is 1.5 m, the time for propagating there is 0.03 to 0.05 second. Of course, the amplitude of the pressure is attenuated in inverse proportion to the propagation time as shown in FIG. 39. A filler is preferably a incompressive fluid.

FIGS. 37 and 38 show a modified example of the sensor arrangement in the 11th embodiment, in which two collision sensitive tubes 21F and 22F are extended in the width direction at upper and lower portions of a collision part, and two pressure sensors 31 and 32 are arranged on different side ends thereof. This also results in the result similar to FIG. 33. If the length of the collision sensitive tubes 21F and 22F is ⅔ of the overall width of the vehicle, the discrimination precision of the collision position widthwise is further enhanced.

Figure 40:
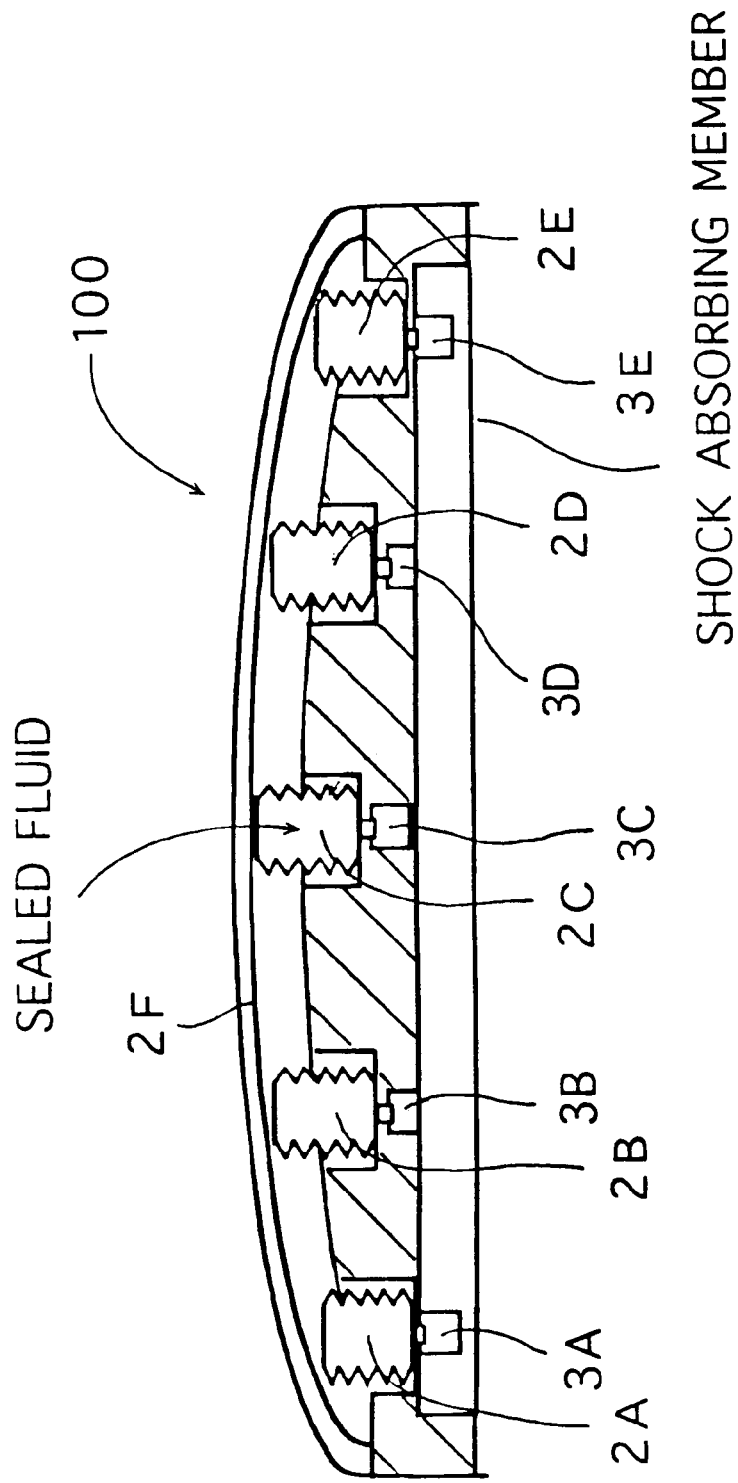
FIG. 40 is a sectional view showing a modification of the collision detection means extending over the entire bumper according to the eleventh embodiment.

FIGS. 39 and 40 show a modified example of the collision detection means comprising a plurality of collision detection chambers (expansion chambers i.e. cylindrical bellows) and pressure sensors. In this modification, there is constituted by five detection units 2A to 2E, each detection unit contacting a sheet-like plate 2F formed of a soft resin.

This plate has a function such that even when a longitudinally elongated collision body comes into collision with and between the detection units, it can be sufficiently detected by the detection units on both sides of the collided part. Further, the influence caused by the collision does not exert on both sides. Into the expansion chamber is sealed a compressive fluid such as nitrogen gas which softly receives an operating force with respect to compression in an axial direction of the chamber. However, if the expansion chamber is high in expandability in a radial direction, an incompressive liquid is preferable.

Figure 41:
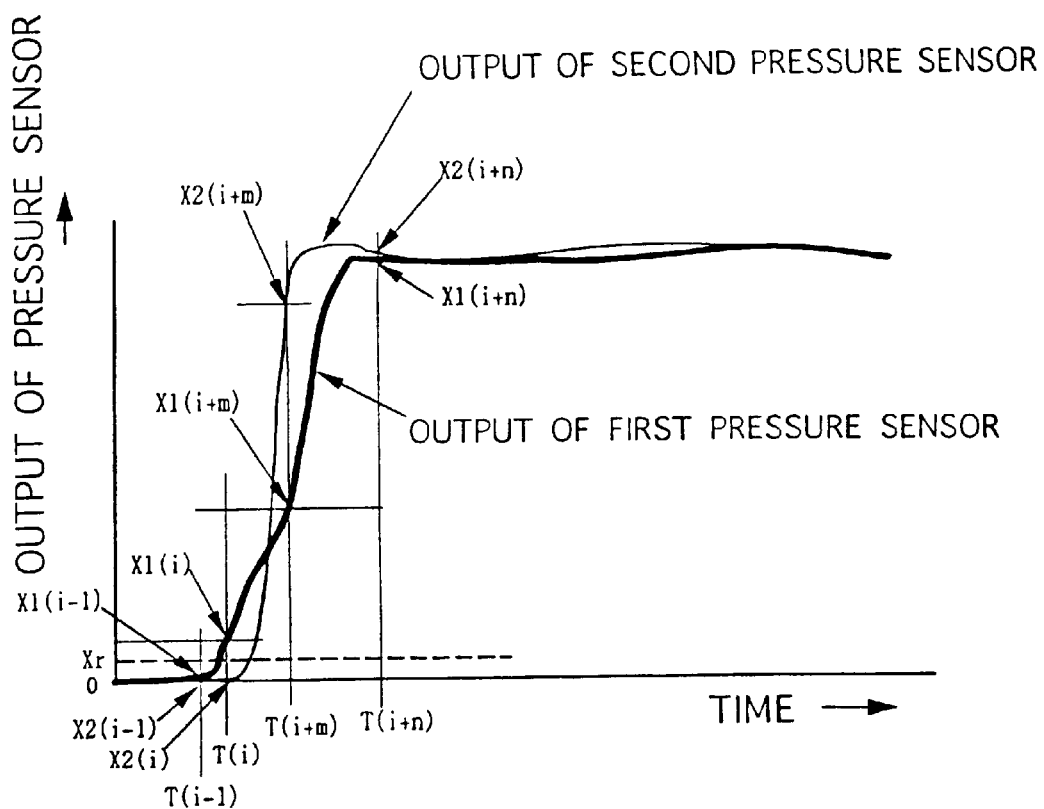
FIG. 41 is a diagram showing output waveforms at the time of collision with a vehicle having unevenness on the collision surface according to the eleventh embodiment.
Figure 42:
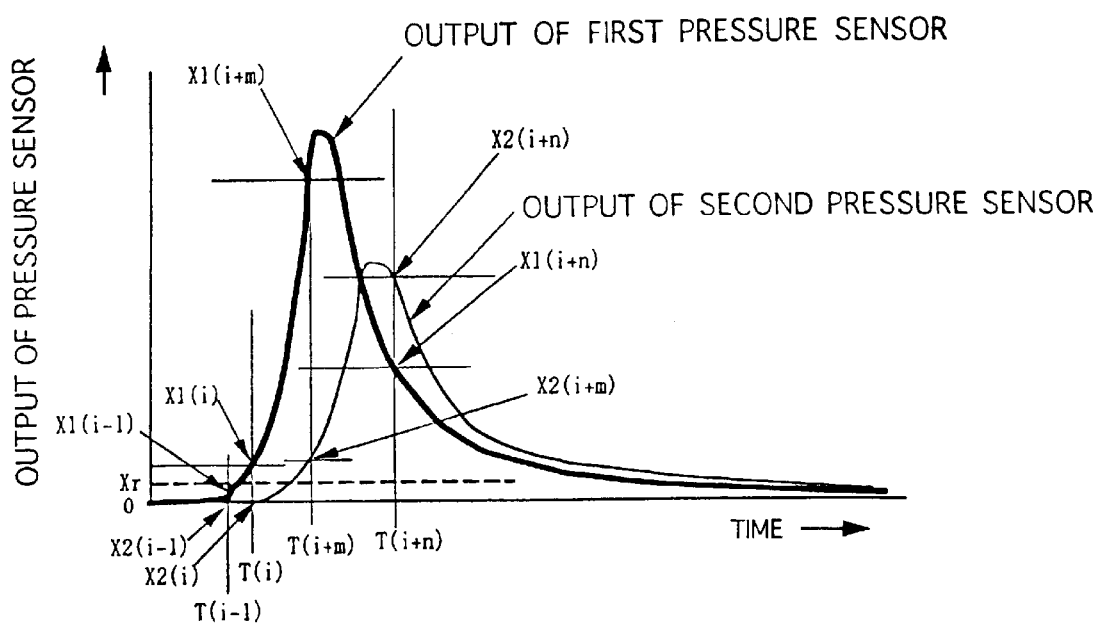
FIG. 42 is a diagram showing output waveforms at the time of collision with a pedestrian according to the eleventh embodiment.

FIGS. 41 and 42 show output waveforms of pressures in the sensor arrangement in the embodiments shown in FIGS. 36 or 37 and 38 and modified examples.

FIG. 41 shows an example of a collision with a vehicle having rugged portions on the collided surface, showing that a sensor which first exceeds a threshold is not always high at T1 which is the next sampling time. Therefore, it is necessary to compare the magnitude of output again at time T1, and evaluation for a greater one is necessary.

FIG. 42 shows an example in which a pedestrian collides with the first pressure sensor side from the center, and on the second pressure side, the time delay and the attenuation of output occur.

Figure 43:
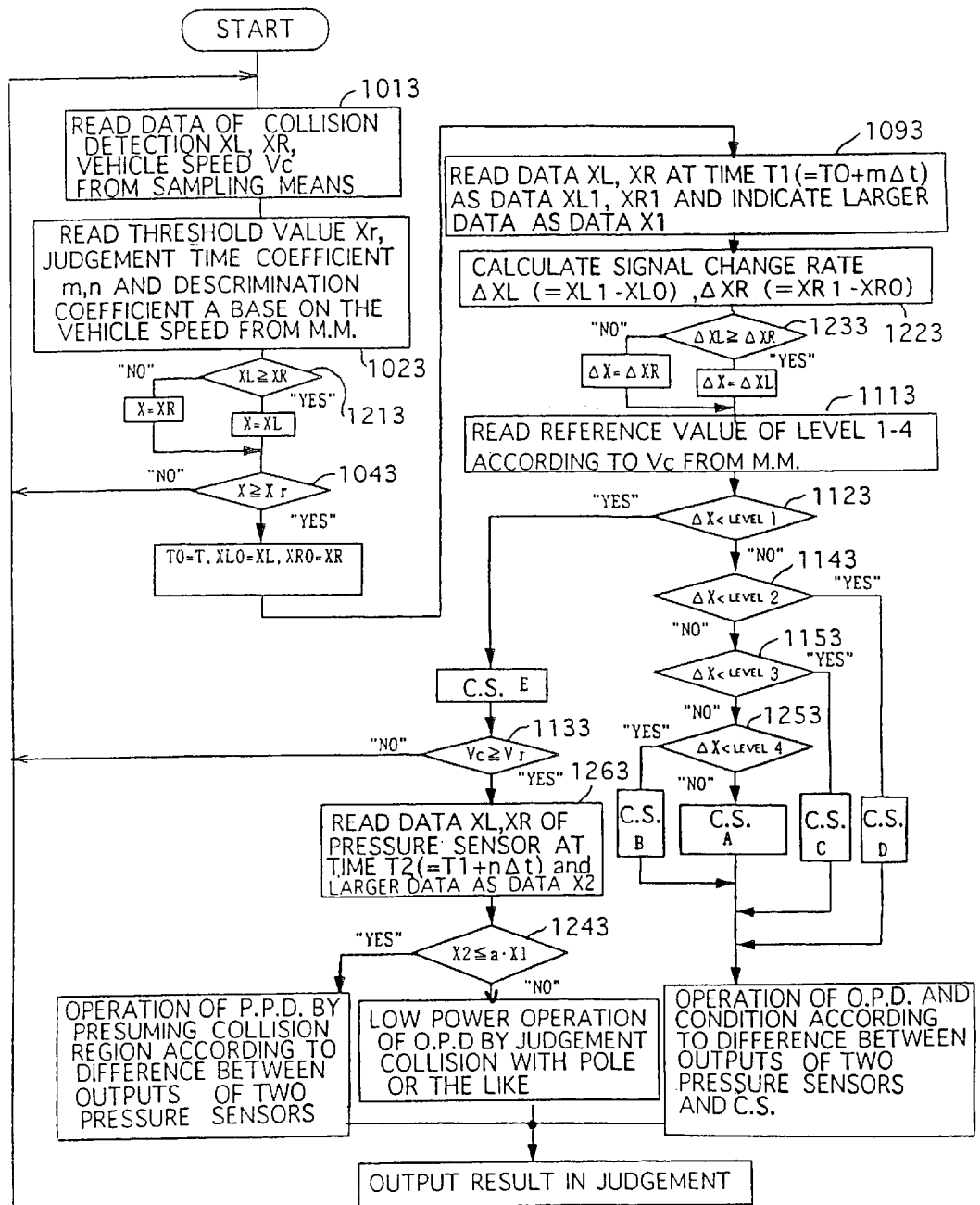
FIG. 43 is chart showing an judgement algorism of a modification according to the eleventh embodiment.

FIG. 43 shows a collision discrimination algorithm corresponding to the collision detection means in which two pressure sensors are arranged on both sides of a part which is apt to collide.

This discrimination algorithm can accurately extract the characteristics of the collied body from pressure values of two pressure sensors to operate the protective device. Let XL be the output of the first pressure sensor on the left hand, and XR be the output of the second pressure sensor on the right hand, and the collided body can be presumed accurately from the characteristics of the difference in magnitude between both outputs, the time delay and the like.

When comparison is first made if the value exceeds a threshold, higher one out of two left and right sensor outputs is selected as X.

At time T1, outputs from two sensors are read, large output is read as XR1, SL1 at X1, and increments from time T0 are indicated at ΔXL and ΔXR, respectively. The large increment is indicated at ΔX, which is used for discrimination of the collision strength.

In the case where judgement is made to be the collision strength E when ΔX is not more than level 1, and in the case where in Step 1133, the vehicle speed Vc is slower than the vehicle speed Vr of the threshold, the routine is returned to the routine of the monitoring mode again without operating any protective device. In the case of running at the vehicle speed over Vr, and in the case of the collision strength E, a collision with a pedestrian or a fixed support pole such as an electricity pole or weak collision with a rear-end of vehicle is considered. Therefore, in Step 1243, judgement is made if the large output value after the time n times of sampling time period Δt from the time T1 is larger or smaller than a (<1.0) times of output X1 at the time T1. The discrimination is made if the collided object is a pedestrian or a fixed support pole or the like according to the result of judgement.

When the pedestrian protective device and the occupant protective device are operated, a collision position is presumed from two pressure sensors in accordance with a fixed logic to precisely operate necessary protective device.

Further, in Step 1253, judgement is made if the signal change rate ΔX is below 4. If below a level 4, judgement is made of an occupant protective mode according to an output difference between two pressure sensors and the collision strength as the collision strength B, and the judgement result is output. If over a level 4, judgement is made of an occupant protective mode according to an output difference between two pressure sensors and the collision strength as the collision strength A, and the judgement result is output.

(Twelfth Embodiment)

Figure 44:
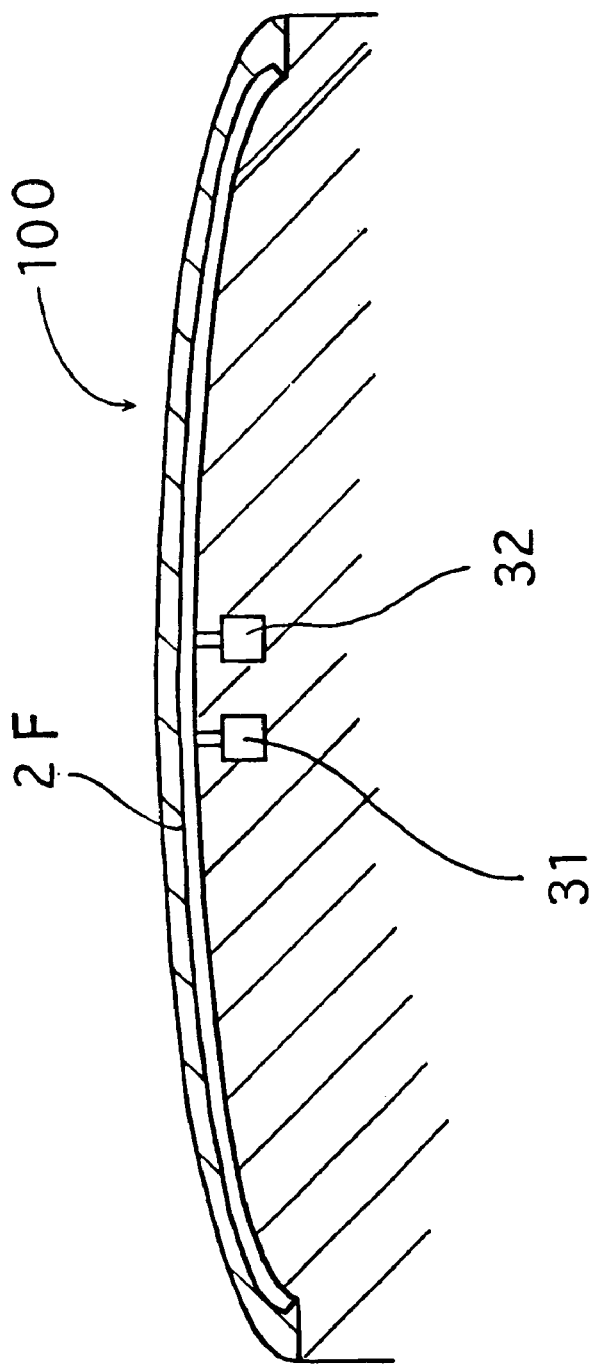
FIG. 44 is a sectional view showing an arrangement of a pressure sensor of a collision detection means in a collision discriminating apparatus for vehicles according to a twelfth embodiment.

The collision discriminating apparatus according to the 12th embodiment is provided with a collision detection means shown in FIG. 44, in which two pressure switches 31 and 32 which are different in setting are mounted on a single collision sensitive tube 2. And a collided body between a pedestrian and others is discriminated from turning ON and OFF of these switches.

An operating tale as one example of the collision discrimination is set so that the first pressure switch 31 senses in excess of a degree of collision of a pedestrian, that is, naturally senses a collision with a weight body such as a vehicle, and the second pressure switch 32 senses a collision with a weight body such as a vehicle but does not sense a collision with a pedestrian.

In the collision discriminating apparatus according to the 12th embodiment, since the first and second pressure switches 31 and 32 are set as described above, there exhibits the effect that positive discrimination can be made at lowest cost with respect to the vehicle which runs at fixed speed.

(Thirteenth Embodiment)

Figure 45:
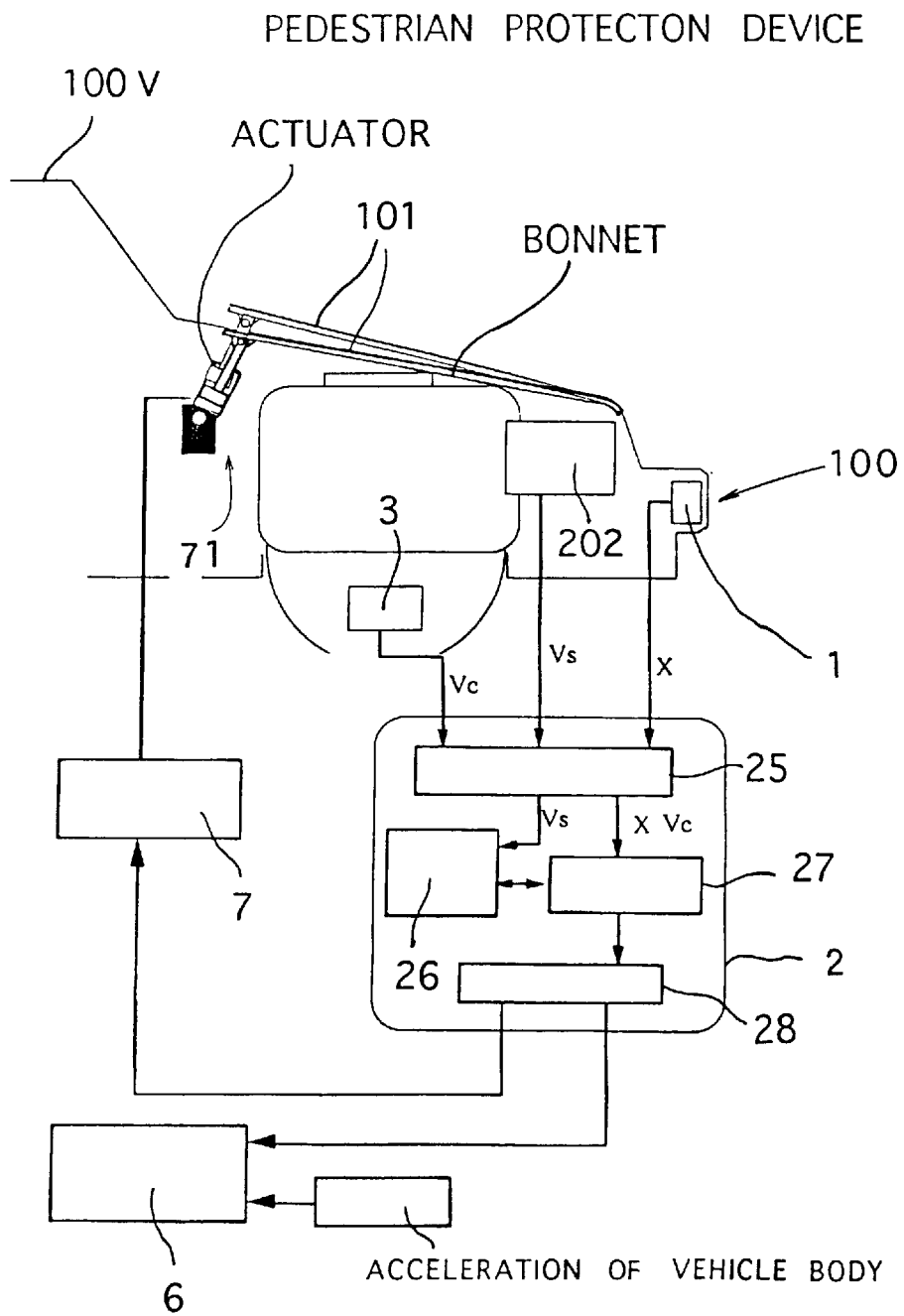
FIG. 45 is a block diagram showing a collision discriminating apparatus for vehicles according to a thirteenth embodiment.

The collision discriminating apparatus according to the 13th embodiment is different from the previous embodiment in that as shown in FIG. 45, a relative speed (Vs) immediately before collision with an obstacle collided is stored and detected, and a speed (Va) in a moving direction is calculated from information therefrom. The difference is mainly explained below.

The collision object presuming means according to the 13th embodiment is different from the previous embodiment in that a relative speed detection means 202 is disposed in place of the vehicle body acceleration sensor 201, and a sampling means 25 together with an operation processing means 27 are connected to a memory means 26.

The 13th embodiment is characterized in that a relative speed in place of a vehicle body acceleration is taken in by the sampling means 25, and the relative speed is stored for a period of fixed time in the memory means 26. This storing period is about 2 seconds because data up to data before 1 second from the time at which the output of the collision detection means exceeds the threshold are used.

The detection of the relative speed is carried out by a radar system, a supersonic system, a laser beam system and the like. Here, a radar system employed in an autocruise control system for protecting the distance between cars is used as an example.

Figure 46:
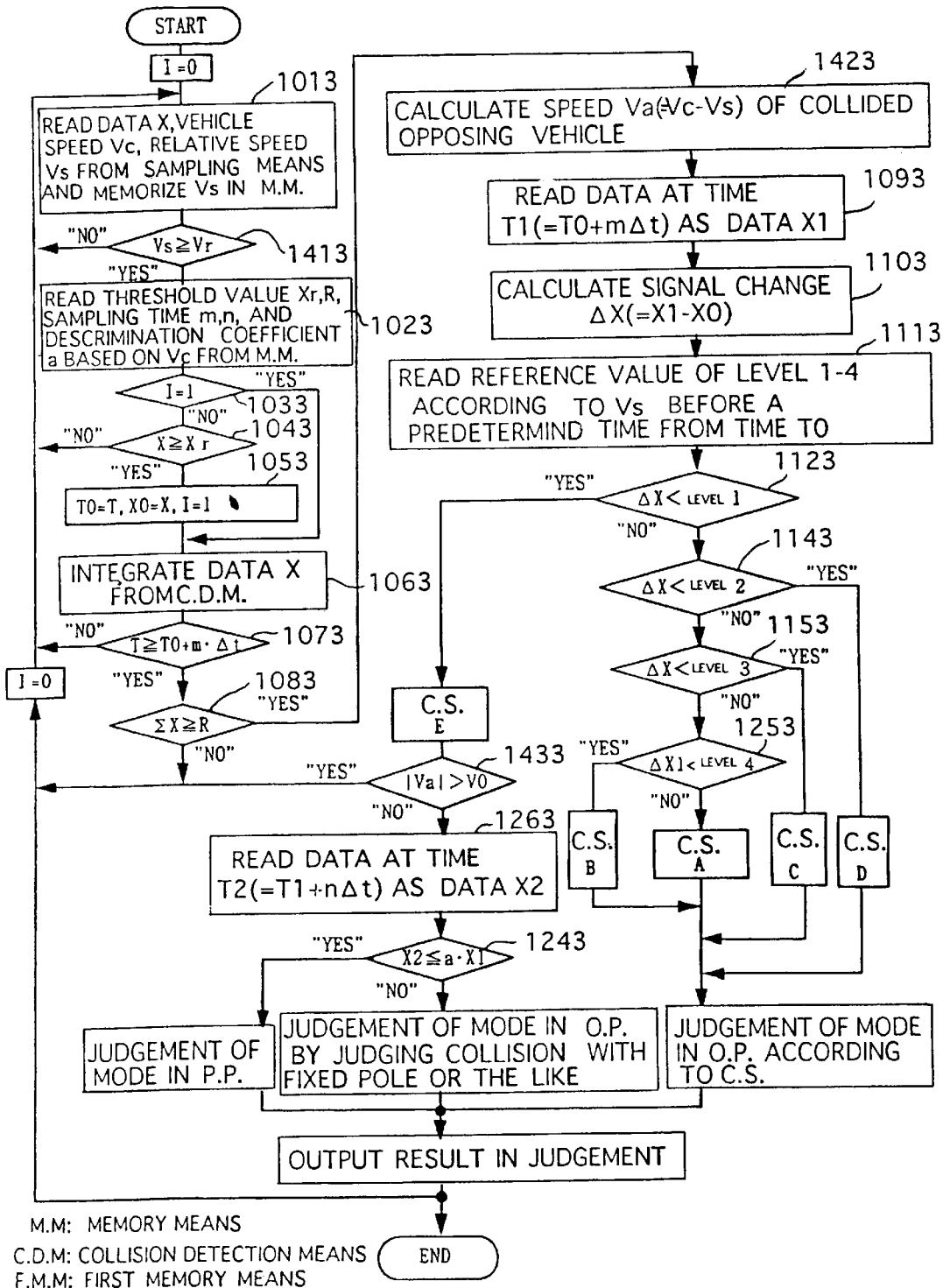
FIG. 46 is chart showing an judgement algorism of a modification according to the thirteenth embodiment.
Figure 47:
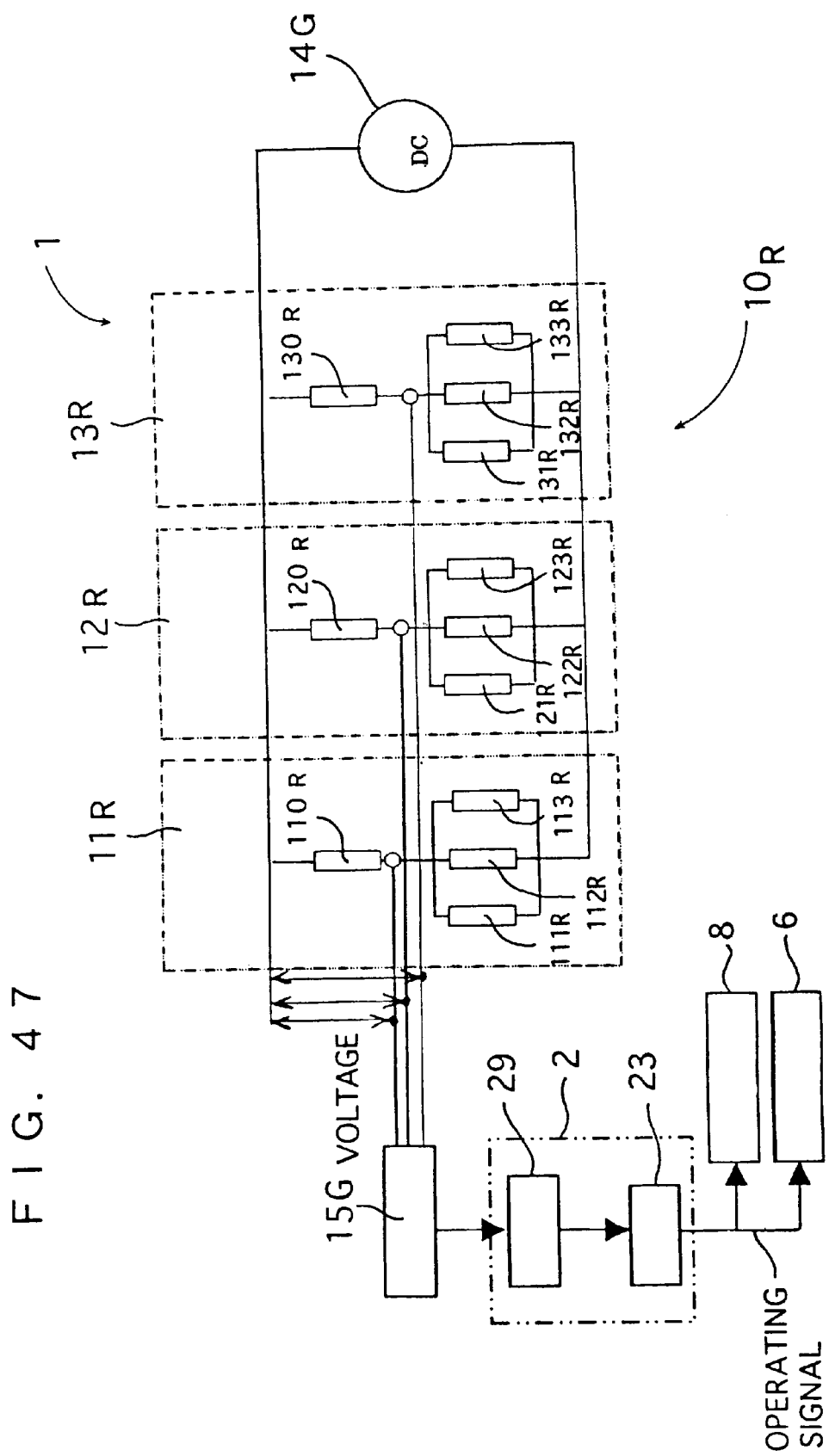
FIG. 47 is a block diagram showing the entirety of a pedestrian collision discriminating apparatus according to a fourteenth embodiment.

In the 13$^{th}$ embodiment, the difference from the collision discrimination algorithm in the above-described embodiments will be mainly explained below with reference to FIG. 46.

In Step 1413, judgement is made if the relative speed Vs detected by the relative speed detection means 202 is higher than the reference vehicle speed Vr. If higher, the procedure shifts to Step 1023.

In Step 1423, a speed in a moving direction Va(=Vc−Vs) of a collided opposing vehicle is calculated, and in Step 1113, reference values of levels 1 to 4 according to Vs before the fixed time from T0 are read in the memory means.

In Step 1123, judgement is made if the output change amount ΔX is smaller than a level 1. If small, judgement is made to be the collision strength E. In Step 1433, judgement is made if an absolute value of the speed in a moving direction Va of a collided opposing vehicle is larger than a level V0.

If small on low capability of weak collision with the rear-end of the vehicle, in Step 1263, output data at time T2(=T1+n·Δt) are read as X2. In Step 1243, judgement is made if the read output data X2 is smaller than a·X1.

That is, the collision discrimination algorithm in the 13$^{th}$ embodiment makes use of information of the relative speed with the collided body, and the speed of the opposing obstacle calculated therefrom. The algorithm in the 13$^{th}$ embodiment more clarifies the discrimination between a weak rear-end collision with the vehicle going ahead and a collision with a pedestrian. The main features are as follows:

A collision level is judged according to the relative speeds of one collided and one immediately before being collided. That is, at the time T1, an increment ΔX from the time T0 at which exceeding the threshold of the output tube X of the collision detection means is obtained, and the collision strength is divided into 5 ranks A to E by the comparison if the increment is at which level with respect to the reference value according to the relative speed.

Further, in the collision strength E, the collision with a pedestrian and a fixed support pole are divided from the speed Va immediately before the collision of a collided opposing vehicle. In the case where the opposing speed, other than the collision with a pedestrian or a fixed support pole or the like, is above a level V0, judgement is made to be a weak rear-end collision. In this case, since the collision strength E is at a level particularly not requiring an auxiliary occupant protective device such as an air bag, the mode is returned to the monitoring mode again.

The collision discriminating apparatus for vehicles according to the 13th embodiment exhibiting the above-described operation exhibits the effect that necessary protective devices are operated at precise speeds and an occupant and a pedestrian are protected in a most safety manner by the judgement in accordance with the relative speed, that is, the speed in a moving direction as described above. Particularly, there is an effect that an erroneous operation can be prevented in the case where there is an output of the collision detection means close to the collision with a pedestrian in a weak rear-end collision with the vehicle.

That is, the collision discriminating apparatus for vehicles according to the 13th embodiment has an effect that particularly, an erroneous operation can be prevented in the case where there is an output of the collision detection means close to the collision with a pedestrian in a weak rear-end collision with the vehicle, exhibiting the effect that more delicate operation of the protective device becomes enabled.

Further, in the collision discriminating apparatus for vehicles according to the 13th embodiment, if the vehicle body acceleration is taken in as information of the discrimination device as in the above-described 11th embodiment, the discrimination precision can be expected to be further enhanced.

(Fourteenth Embodiment)

The collision discriminating apparatus for vehicles in the 14th embodiment according to a fifth aspect comprises, as shown in FIGS. 47 to 50, a collision detection means 1 comprising an electric circuit network 10R comprising a plurality of detection regions 11R, 12R, and 13R arranged in a bumper 100 in an outer peripheral portion of a vehicle 100V, a voltage application circuit 14G for applying a voltage to respective detection regions, a voltage detection circuit 15G for detecting a voltage value in respective detection regions after collision, a collision object presuming means 2 comprising an addition circuit 29 for adding voltage values in respective detection regions after collision detected and a comparison circuit 23 for comparing the voltage values of respective detection regions after collision as the addition result with the regulation value to select the presence or absence of collision and the protective device to be operated, a pedestrian protective device 8 for protecting the collided pedestrian, and an occupant protective device 6 for protecting an occupant.

The electric circuit network 10R comprises conductive wires coated with insulator 111R to 133 and resistors 110R to 130R as shown in FIGS. 47 to 51, and is broken (sheared) by the shock of collision at the time of collision. A conductive channel of the electric circuit network 10R is changed due to the rupture (breakage) so that a voltage value detected by the voltage detection circuit 15G is changed. The conductive wires coated with insulator and the resistance values of the resistors are set to be different in magnitude every detection region, and the voltage values detected by the voltage detection circuit 15G are different according to the conductive channel.

Figure 51:
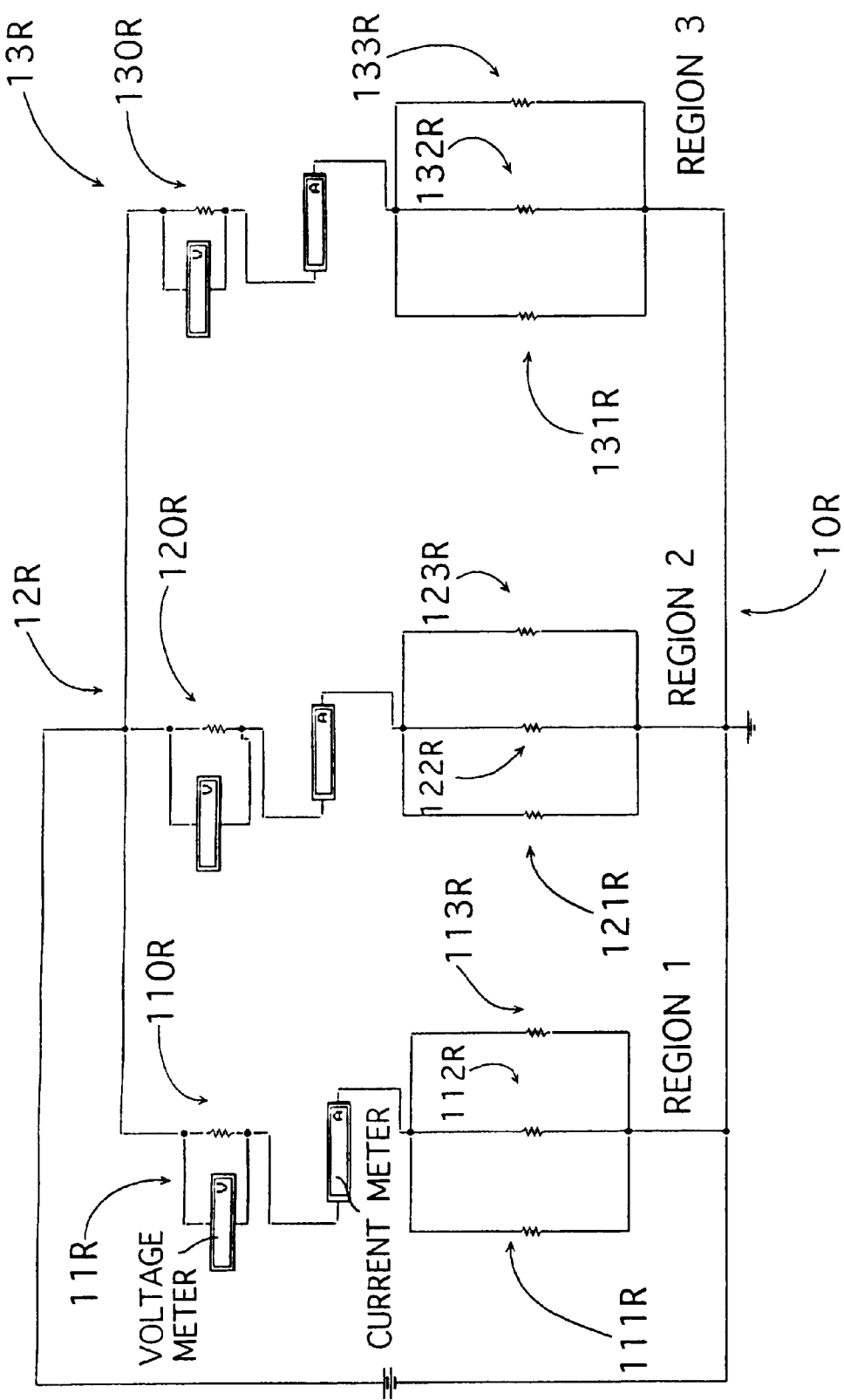
FIG. 51 is a circuit view showing the details of an electric circuit network according to the fourteenth embodiment.

That is, in the electric circuit network 10R shown in FIG. 51, the first detection region has resistor 110R=10 KΩ, conductive wire coated with insulator 111R=10 KΩ, conductive wire coated with insulator 112R=15 KΩ, and conductive wire coated with insulator 113R=20 KΩ; the second detection region has resistor 120R=10 KΩ, conductive wire coated with insulator 121R=30 KΩ, conductive wire coated with insulator 122R=35 KΩ, and conductive wire coated with insulator 123R=40 KΩ; and the third detection region has resistor 130R=10 KΩ, conductive wire coated with insulator 131R=70 KΩ, conductive wire coated with insulator 132R=75 KΩ, and conductive wire coated with insulator 133R=80 KΩ.

Figure 48:
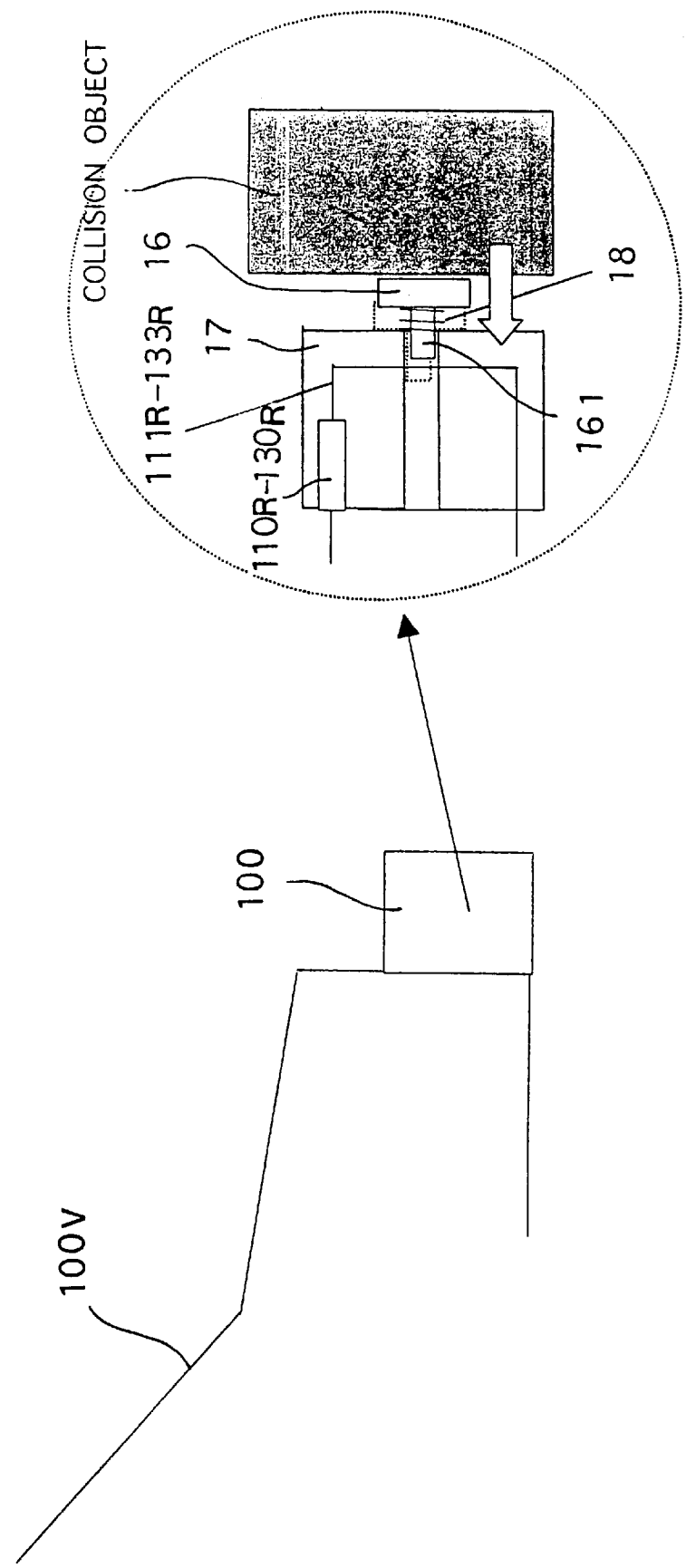
FIG. 48 is a side view of the front of a vehicle and an enlarged sectional view showing a mounting state of the collision detection means onto the bumper according to the fourteenth embodiment.

The collision detection means 1 comprises, as shown in FIG. 48, a plurality of cutting members 16 having a generally T-shape longitudinal section arranged in a width direction of the vehicle within the bumper 100, a guide 17 into which interposed a projecting portion 161 of the cutting member 16, a spring 18 for biasing the projecting portion of the cutting member forward in a moving direction of the vehicle, and conductive wires coated with insulator 111R to 133R constituting the electric circuit network 10R disposed on the guide 17 at a position to be cut by the rear end of the projecting portion 161 of the cutting member when said cutting member is pressed rearward in a moving direction of the vehicle when the cutting member collides with the collision object. At the time of collision, the cutting member 16 is pressed by the collision object so that the projecting portion 161 of the cutting member 16 moves within the guide 17 whereby the conductive wire coated with insulator is cut to thereby cutoff the conductive channel.

Figure 49:
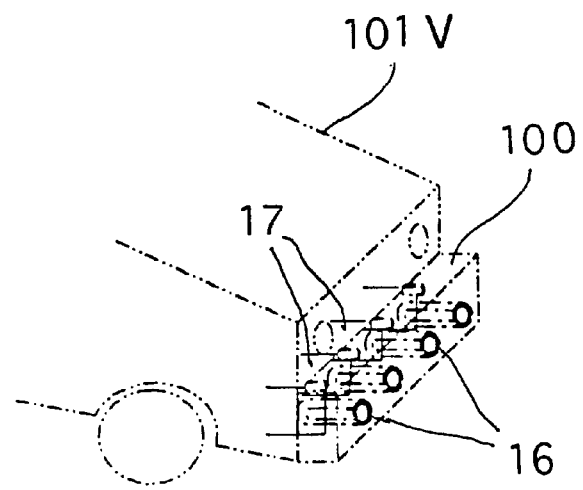
FIG. 49 is a perspective view showing an example in which a cutting member and a guide are constituted by a cylindrical member according to the fourteenth embodiment.
Figure 50:
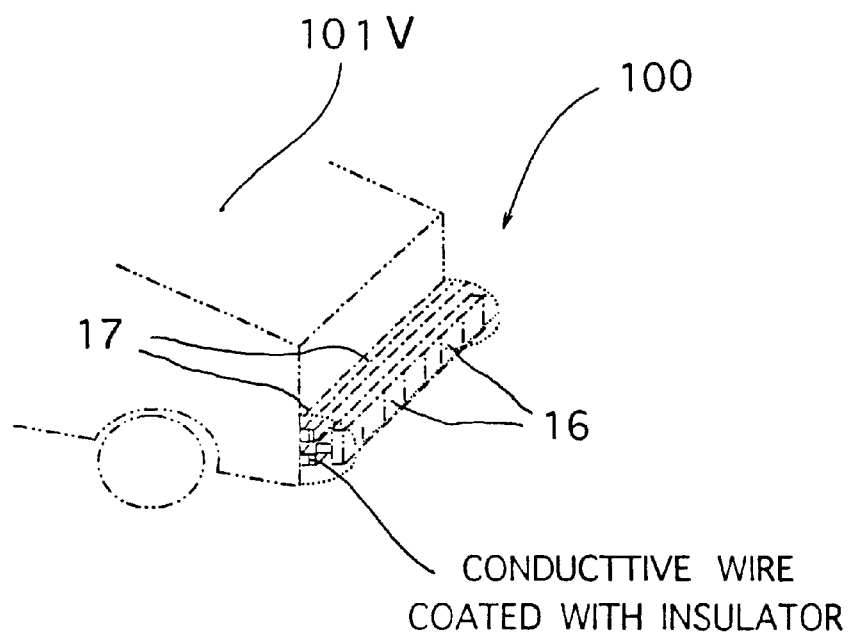
FIG. 50 is a perspective view showing an example in which a cutting member and a guide are constituted by a rectangular member according to the fourteenth embodiment.

The shape of the guide 17 in which the projecting portion 161 of the cutting member 16 is interposed may be cylindrical or rectangular as shown, for example, in FIG. 49 or 50, and can be suitably selected.

In the collision object presuming means 2, the addition results of the addition circuit 29 for adding voltage values detected by the voltage detection circuit 15G are compared with the regulation value by the comparison circuit 23 to know how the conductive channel changed due to the collision and to presume a degree of breakage of the electric circuit network 10R, that is, the collision state and the collision object. Whether the occupant protective device 6 is operated or the pedestrian protective device 8 is operated is determined on the basis of the results of presumption.

Figure 52:
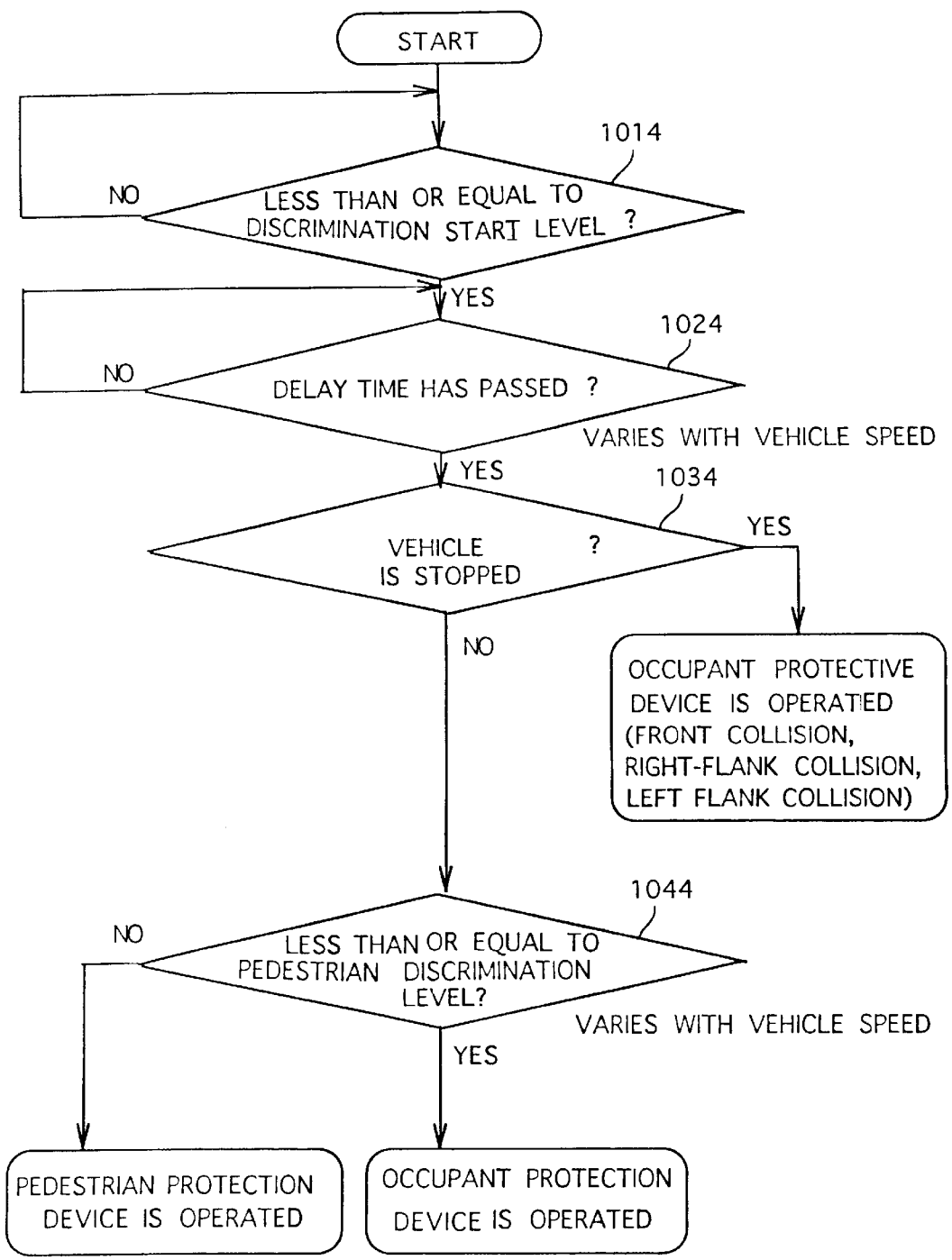
FIG. 52 is a chart showing the processing procedure of collision object presumption according to the fourteenth embodiment.

The procedure of processing for the judgement in the collision object presuming means 2 and the presumption of the collision object will be explained below with reference to a chart diagram of FIG. 52. FIG. 52 is an example of a processing chart at the time of a front collision trouble, in which the present invention is applied to the bumper 100.

In FIG. 52, voltages at a fixed portion of the electric circuit network 10R are added by the addition circuit 29, and the added value is subjected to sampling. If below a fixed value, processing is carried out. The added value is examined after a predetermined delay time, and the vehicle speed is further examined to thereby determine whether the occupant protective device is operated or the pedestrian protective device is operated.

In Step 1014, judgement is made if the addition output of the addition circuit 29 detected by the comparison circuit 23 is less than a discrimination start level shown in FIG. 52. If less than a discrimination start level, in Step 1024, judgement is made if the delay time which varies with the vehicle speed has passed.

If the delay time has passed, in Step 1034, judgement is made if the vehicle stops. If stopping, the occupant protective device corresponding to a front collision, a right-flank collision or a left-flank collision is operated.

In Step 1044, judgement is made if a level of the addition output of the addition circuit 29 is less than a pedestrian discrimination level. If at the pedestrian discrimination level, the pedestrian protective device 8 is operated, and if less than the pedestrian discrimination level (the breakage of the electric circuit network 10R is large), the occupant protective device 6 is operated.

In the collision discriminating apparatus for vehicles according to the 14$^{th}$ embodiment constructed as described above, the conductive wires coated with insulator 111R to 133R are cut by the cutting members 16 due to the collision whereby the conductive channel of the electric circuit network 10R disposed within the bumper 100 is cutoff. The collision position of the collided body against the bumper, the size of the collided body and the collision force, etc. are judged using the fact that the resistance of the electric circuit network 10R changes.

Figure 53:
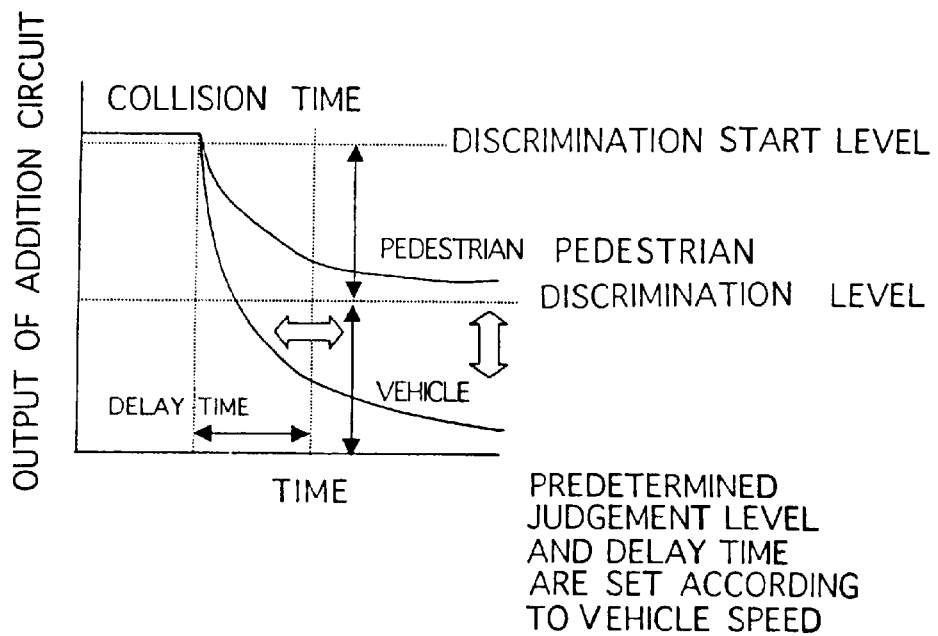
FIG. 53 is a diagram showing an addition circuit output every collision object according to the fourteenth embodiment.

The aforementioned presumption is carried out according to the changing circumstances of the output of the addition circuit. More specifically, as shown in FIG. 53, this is carried out in a manner such that the delay time and the discrimination level are changed according to operating information (vehicle speed, braking force and the like).

The pedestrian protective device 8 for protecting a pedestrian which is a safety protective device and the occupant protective device 6 for protecting an occupant are selectively operated on the basis of information relating to the collision body presumed.

The collision discriminating apparatus for vehicles according to the 14th embodiment exhibiting the operation as described above presumes the collision state by the change in conductive channel due to the breakage of the electric circuit network 10R resulting from the collision with the collision object. This exhibits the effect that the precision and reliability of the collision detection are enhanced, the occupant protection or the pedestrian protection can be selected positively, and the safety can be enhanced.

Further, in the collision discriminating apparatus for vehicles according to the 14th embodiment, the electric circuit network 10R is constituted by the conductive wires coated with insulator and the resistors. This exhibits the effect that miniaturization and lower cost can be easily attained.

Further, in the collision discriminating apparatus for vehicles according to the 14th embodiment, since the cutting member 16 moves while receiving the drag caused by the biasing force of the spring (elastic member) 18, the collision force for cutting the conductive wire coated with insulator can be changed by changes of a biasing force and a spring constant of the spring (elastic member) 18, and material of the elastic member and others.

Further, a plurality of sensors constituting the collision detection means 1 are arranged widthwise of the vehicle of the bumper 100, whereby the collision position of the collided object against the bumper, and the size of the collided body are presumed from the width size of the collision object and the collision position with the bumper to specify whether the collision object is a pedestrian or a vehicle or other obstacles.

Figure 54:
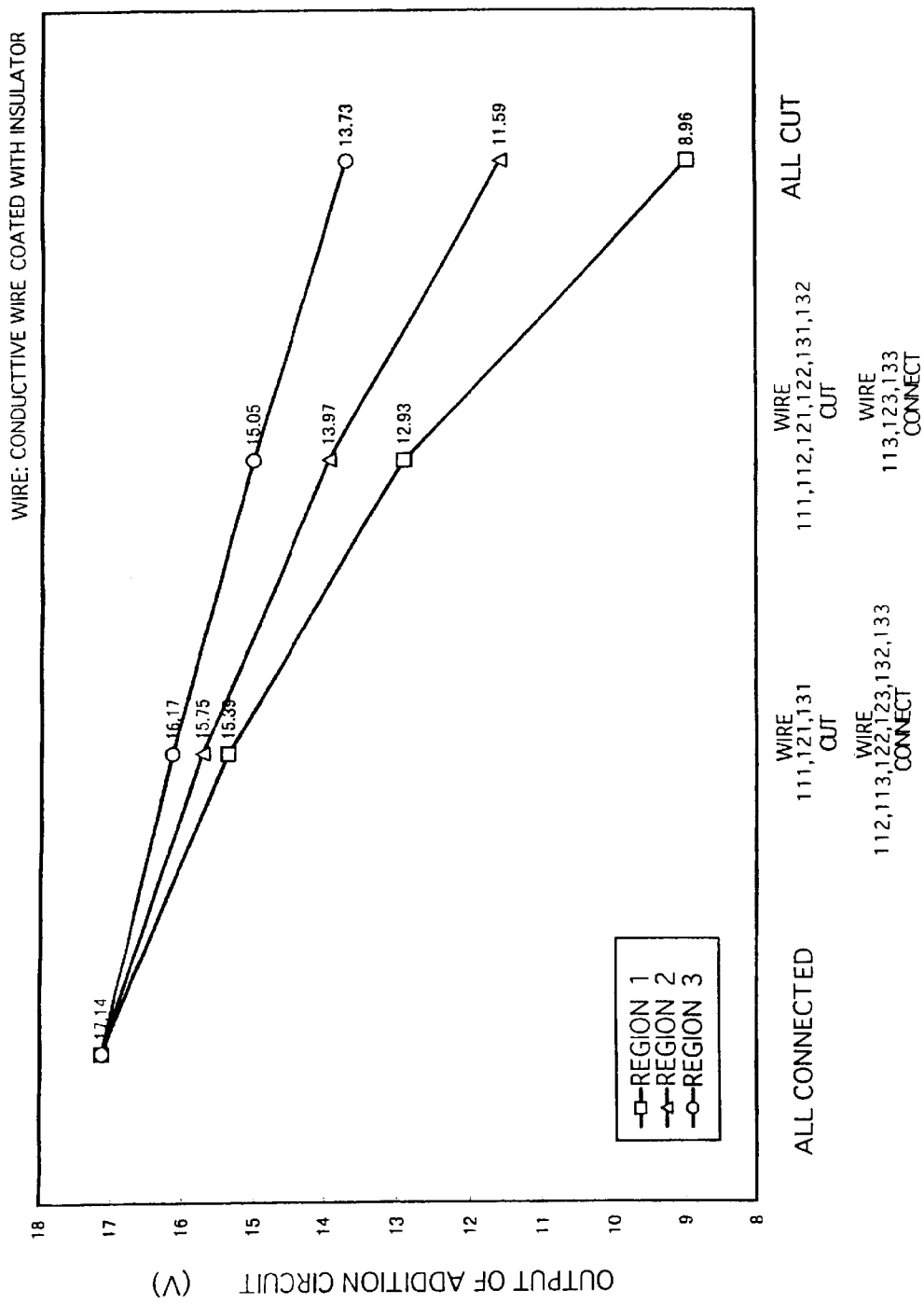
FIG. 54 is a diagram showing a relationship with an addition circuit output in a cut state of a conductive wire coated with insulator according to the fourteenth embodiment.

That is, in FIG. 54 showing an output example of the addition circuit in the case where the power voltage is 12 V, symbol □ indicates an output example of the addition circuit in the case where the collision object comes in collision with the first detection region 11R. In the case where the conductive channel of the conductive wire coated with insulator lllR is cut, output is 15.39 V; in the case where the conductive wires coated with insulator 111R and 112R are cut, 12.93 V; and in the case where the conductive wires coated with insulator 111R, 112R and 113R are cut, 8.96 V.

On the other hand, symbol Δ indicates an output example of the addition circuit in the case where the collision object comes in collision with the second detection region 12R, in the case where the conductive channel of the conductive wire coated with insulator 121R is cut, output is 15.75 V; in the case where the conductive wires coated with insulator 121R and 122R are cut, 13.97 V; and in the case where the conductive wires coated with insulator 121R, 122R and 123R are cut, 11.9 V.

Symbol ○ indicates an output example of the addition circuit in the case where the collision object comes in collision with the detection region 13R, in the case where the conductive channel of the conductive wire coated with insulator 131R is cut, output is 16.17 V; in the case where the conductive wires coated with insulator 131R and 132R are cut, 15.05 V; and in the case where the conductive wires coated with insulator 131R, 132R and 133R are cut, 13.73 V.

As described above, the collision region can be readily specified from the output value of the addition circuit. It is noted that the output value of the addition circuit can be suitably set by a combination of the resistors 110R, 120R and 130R with the shied wires 111R, 121R, 131R, 112R, 122R, 132R, 113R, 123R, and 133R. It is also possible to change the output value by adding resistors separately.

Also in the case where in the aforementioned examples, the collision regions are more than 2 regions, it is possible to discriminate the collision regions since the output value of the addition circuit differs with the combination of conductive channels.

The collision position of the collided body with the bumper 100, the size of the collided body and the collision force, etc. are judged using the fact that the conductive channel of the electric circuit network 10R in the bumper is cutoff due to the collision.

(Fifteenth Embodiment)

Figure 55:
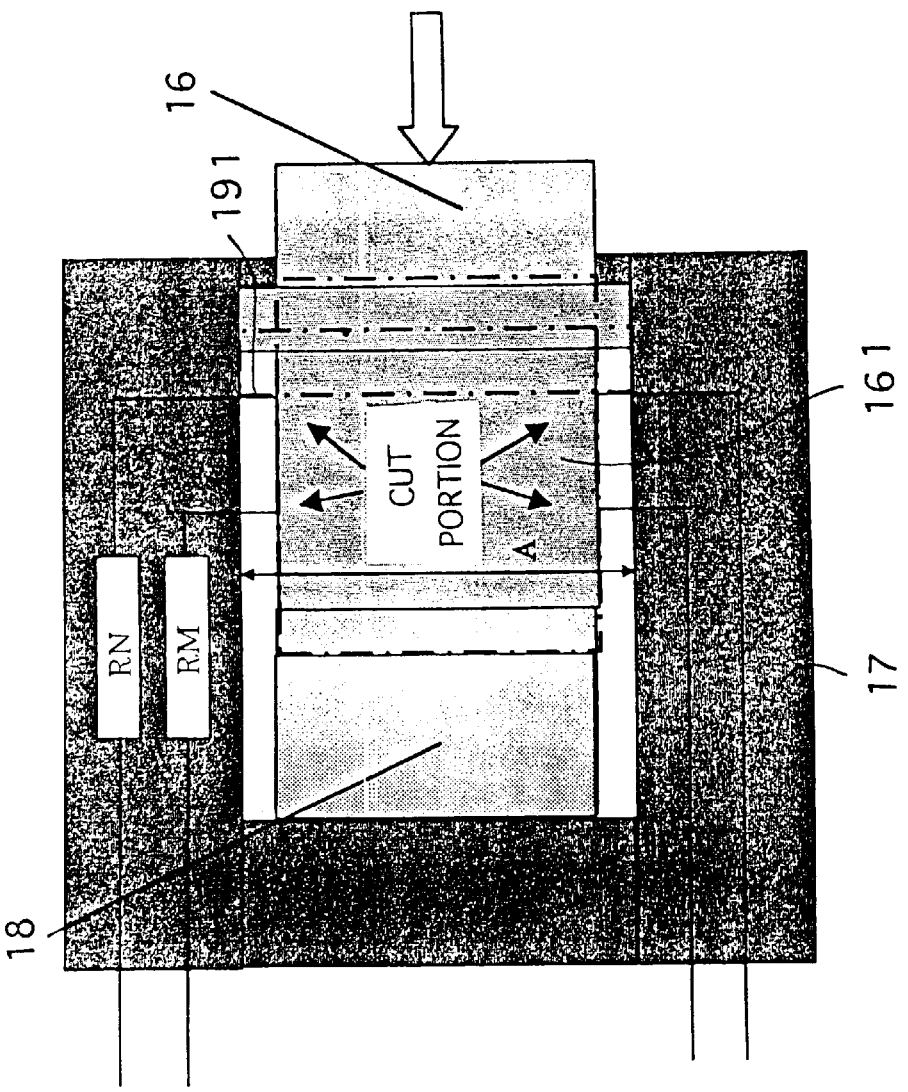
FIG. 55 is an enlarged sectional view showing a collision detection means in a pedestrian collision discriminating apparatus according to a fifteenth embodiment.
Figure 56:
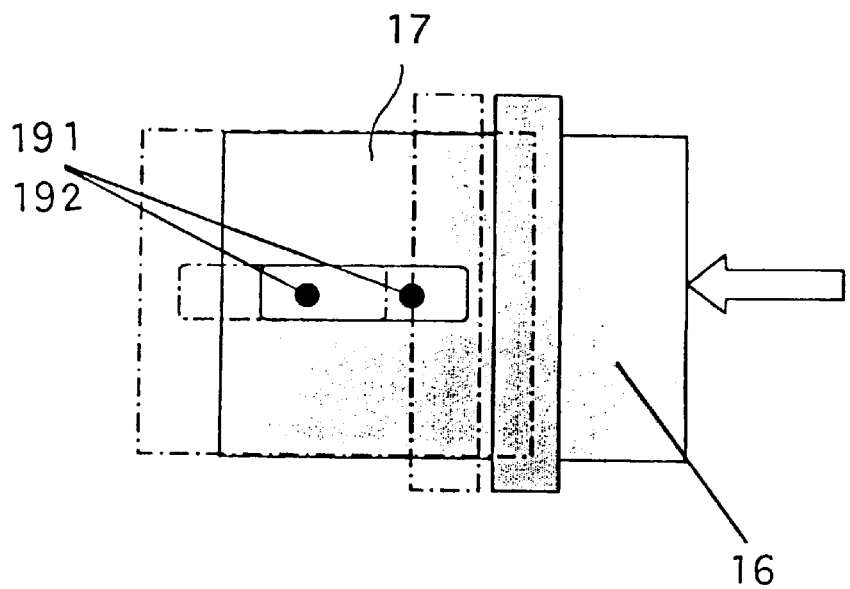
FIG. 56 is a plan view showing a collision detection means according to the fifteenth embodiment.

The collision discriminating apparatus for vehicles according to the 15th embodiment is different from the 14th embodiment in that as shown in FIGS. 55 and 56, a plurality of conductive wires coated with insulator 191 and 192 constituting an electric circuit network 10R are arranged front and rear at predetermined intervals in a moving direction of the vehicle in a guide 17.

The conductive wires coated with insulator are fixed at a position close to the inner peripheral wall of the guide 17, and the length of A is constant. Since the length of A is constant, the elongation when the conductive wire coated with insulator is pressed against the cutting member is small and cutting is facilitated. Note that the conductive wire coated with insulator is formed of a material having a high fragility to enable positive cutting.

When the cutting member 16 is pressed due to the collision with the collision object, the cutting member 16 and the projecting portion 161 are moved while receiving a draw of the elastic substance 18. When the cutting member 16 moves, the front conductive wire coated with insulator 191 connected to the resistor RN is first cut, and the rear conductive wire coated with insulator 192 connected to the resistor RM is then cut. Thereby, the conductive wire coated with insulator can be cutoff according to the collision force of the collided body.

Figure 57:
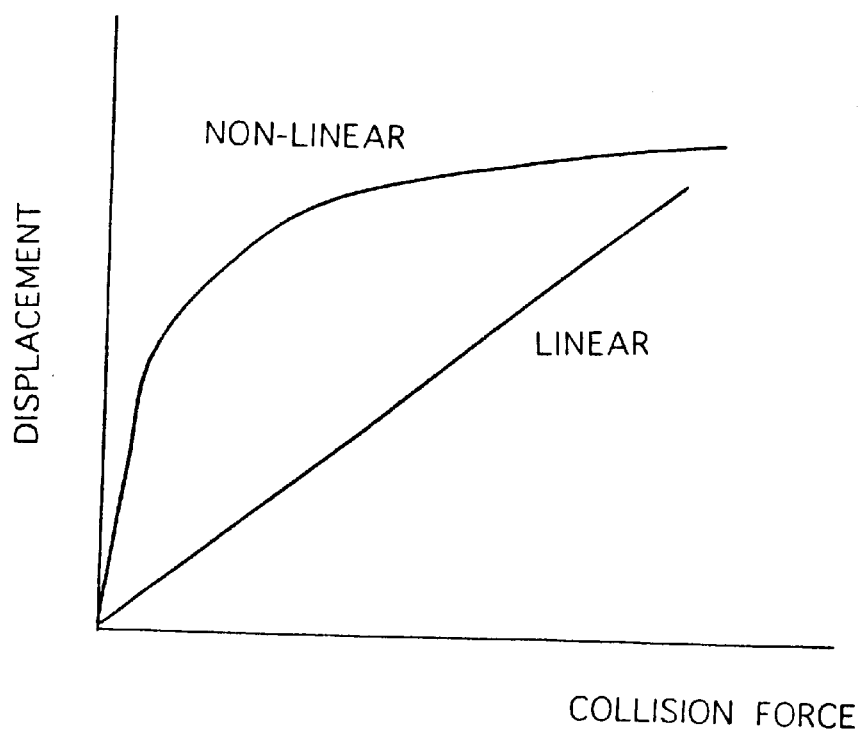
FIG. 57 is a diagram showing a non-linear characteristics of an elastic member of the collision detection means according to the fifteenth embodiment.

Further, the characteristics of the elastic member 18 is made, for example, to be non-linear as shown in FIG. 57 to thereby enable imparting the cutting characteristics according the collision force. That is, by the provision of the characteristics in which displacement rapidly increases while the collision force is small, so that it facilitates to discriminate the collision force in the case of a relatively small collided body, e.g., a pedestrian or the like.

In the case where the collision object is a pedestrian, since the collision force is smaller than the case of the vehicle, the front conductive wire coated with insulator 191 close to the outer peripheral portion of the vehicle is cutoff. On the other hand, in the case where the collision object is a vehicle, both the front conductive wire coated with insulator 191 close to the outer peripheral portion of the vehicle and the rear conductive wire coated with insulator 192 arranged within the deeper position are cut.

Thereby, discrimination of the presence or absence of collision and whether the collision object is a pedestrian is carried out.

The collision discriminating apparatus for vehicles according to the 15th embodiment having the above-described constitution and operation exhibits the effect that by arrangement of a plurality of the conductive wires coated with insulator 191 and 192 in a longitudinal direction of the vehicle, the conductive wire coated with insulator according to the collision force with the collision object and the size (inertia mass) of the collision object is selectively cut to thereby enable precise discrimination of the collision object and to facilitate the discrimination of collision with a pedestrian.

(Sixteenth Embodiment)

Figure 58:
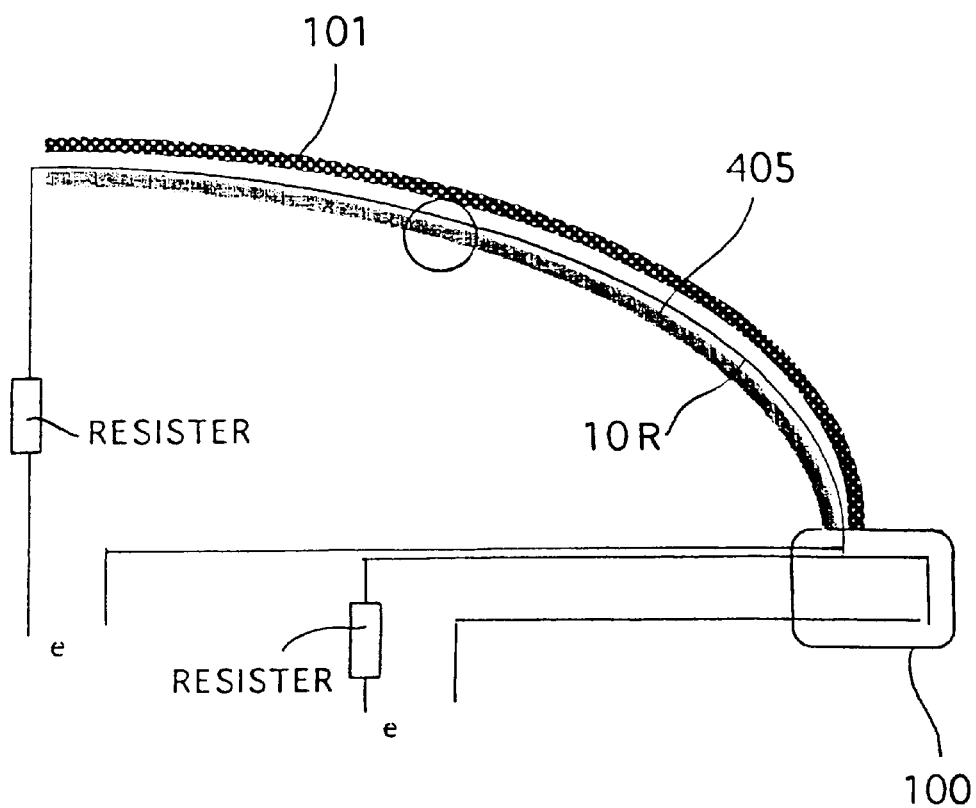
FIG. 58 is a fragmentary sectional view showing the applying form of the collision detection means in a pedestrian collision discriminating apparatus according to a sixteenth embodiment to a bumper and a bonnet.
Figure 59:
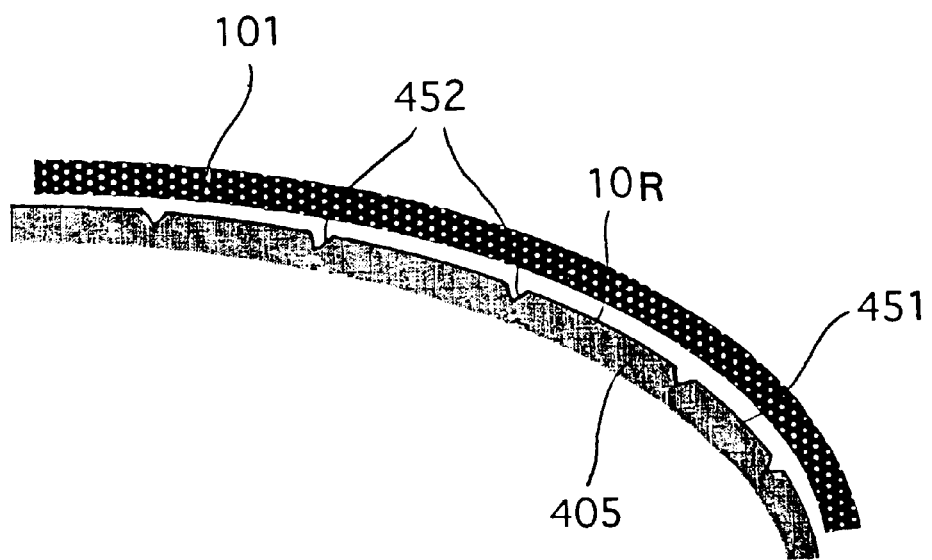
FIG. 59 is a fragmentary enlarged sectional view showing a bonnet mounting member juxaposed to the bonnet according to the sixteenth embodiment.
Figure 60:
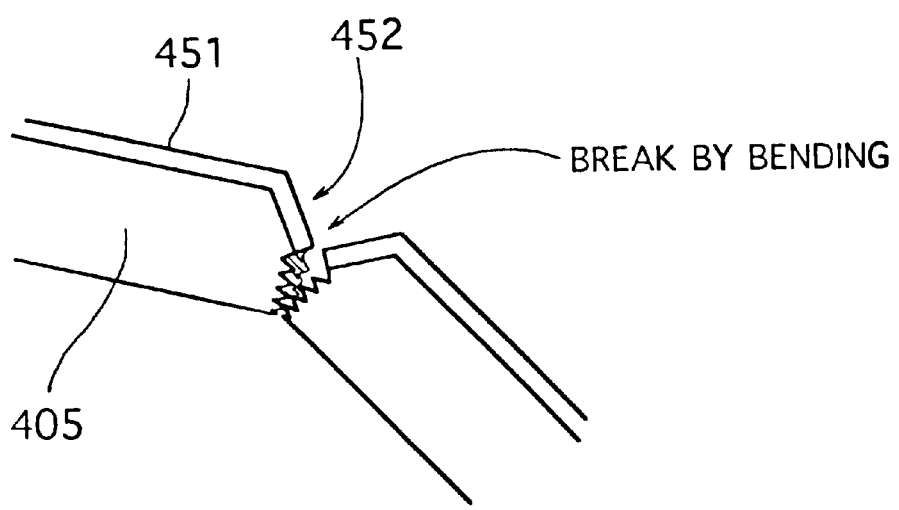
FIG. 60 is a fragmentary enlarged sectional view for explaining the cutting of notches accompanied by the collision of the bonnet mounting member according to the sixteenth embodiment.

The collision discriminating apparatus for vehicles according to the 16th embodiment is different from the previous embodiments in that as shown in FIGS. 58 to 60, an electric circuit network 10R is arranged also in a bonnet 101, and the collision with the bonnet 101 can be detected in addition to the bumper 100 of the collision object.

A bonnet mounting member 405 is mounted internally of the bonnet 101 along the bonnet 101, and a conductor 451 is coated on the outer peripheral portion of the bonnet mounting member 405. The bonnet mounting member 405 is provided with notches 452 in a predetermined spaced relation.

When the bonnet 101 and the bonnet mounting member 305 are deformed at the time of collision, the bonnet mounting member 405 is deformed to be bent at the notches 452. Thereby the conductor 451 coated on the bonnet mounting member 405 is extended and cut.

In the collision discriminating apparatus for vehicles according to the 16th embodiment having the constitution and operation as described above, a pedestrian as the collision object comes into collision with the bonnet 101 so that the bonnet 101 is deformed, the bonnet mounting member 405 disposed along the bonnet 101 is deformed to be bent at the notches 452 whereby the conductor 451 coated on the bonnet mounting member 405 is cut, thus exhibiting the effect that the collision of the pedestrian against the bonnet 101 can be detected.

(Seventeenth Embodiment)

Figure 61:
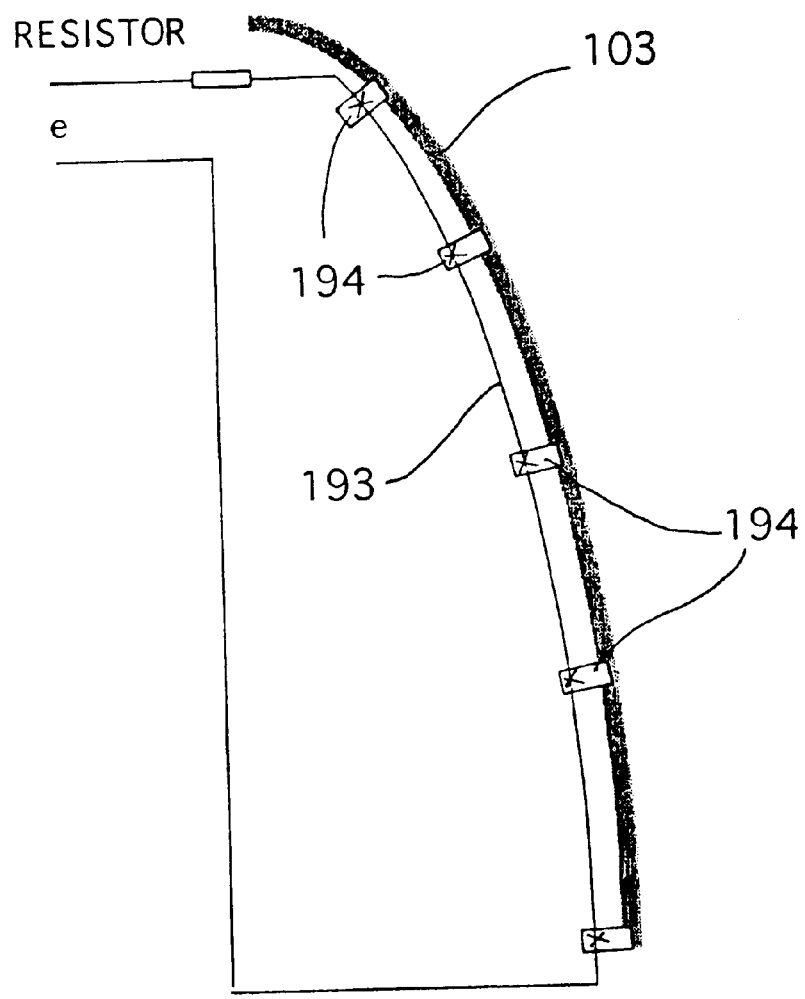
FIG. 61 is a fragmentary sectional view showing the applying form of the collision detection means in a pedestrian collision discriminating apparatus according to the seventeenth embodiment to the inner surface of a door.
Figure 62:
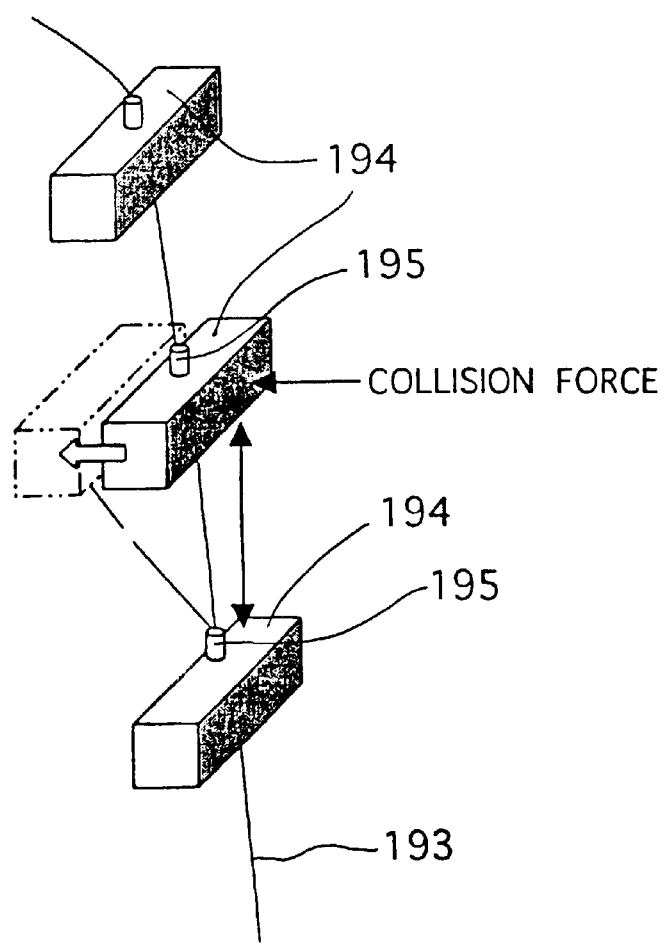
FIG. 62 is a fragmentary enlarged perspective view showing a relationship between a door mounting member, a shield restricting member and a conductive wire coated with insulator according to the seventeenth embodiment.

The collision discriminating apparatus for vehicles according to the 17th embodiment is different from the previous embodiments whose object is only a front collision trouble in that as shown in FIGS. 61 and 62, the present invention is applied to the detection of not only the front collision of a vehicle, but a flank collision trouble of a vehicle. The difference will be mainly explained below.

In the 17th embodiment, the collision discriminating apparatus for vehicles according to the present invention is mounted internally of a door outer plate 103 as shown in FIG. 61, and a conductive wire coated with insulator 193 is mounted internally of the door outer plate 103 by a door mounting member 194 and a conductive wire coated with insulator restricting member 195.

The conductive wire coated with insulator restricting member 195 is constituted to lock and restrict the conductive wire coated with insulator 193 so that the spacing between the door mounting members 194 is changed due to the deformation of the door outer plate 103 caused by the collision with the collision object at the time of collision to allow the conductive wire coated with insulator 193 to be easily cut.

Figure 63:
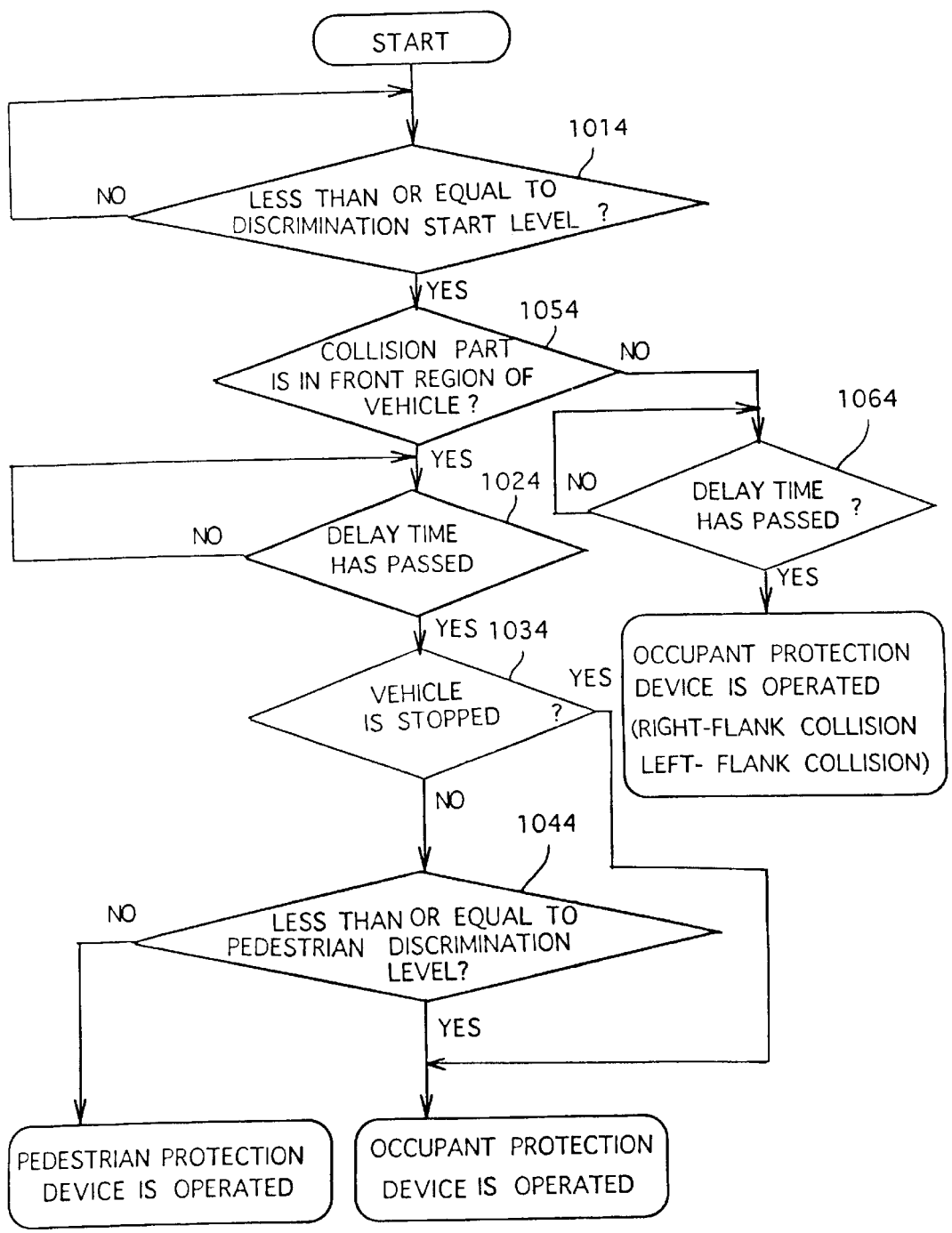
FIG. 63 is a chart showing the processing procedure for collision object presumption of the front collision and the side collision according to the seventeenth embodiment.

The processing procedure for the judgement and the presumption of collision object in the collision discriminating apparatus for vehicles according to the 17th embodiment will be explained below with reference to a chart of FIG. 63. FIG. 63 shows an example of a processing flow chart at the time of a front collision and a flank collision trouble in which the present invention is applied to the bumper 100 and the side door.

In Step 1014, judgement is made if the addition output of the addition circuit detected by the comparison circuit is below a discrimination start level shown in FIG. 63. If below the discrimination start level, judgement is made if a collision part is in a front region of the vehicle in Step 1054.

If the collision part is not in the front region of the vehicle, that is, in the side region of the vehicle, in Step 1064, judgement is made if the delay time which varies with the vehicle speed has passed.

If has passed the delay time, the corresponding occupant protective device according to the right side collision and left side collision is operated.

In Step 1054, if judgement is made that the collision part is in the front region of the vehicle, in Step 1064 similar to the aforementioned 14th embodiment, judgement is made if the delay time varying with the vehicle speed has passed.

If passed the delay time, in Step 1034, judgement is made if the vehicle is stopping. In case of the stopping, in Step 1044, judgement is made if a level of the addition output of the addition circuit 29 is below a pedestrian discrimination level. In the case of the pedestrian discrimination level, the pedestrian protective device 8 is operated. If below the pedestrian discrimination level (in the case there is a great deal breakage of the electric circuit network 10R), the occupant protective device 6 is operated.

In the collision discriminating apparatus for vehicles according to the 17th embodiment constituted as described above, a sensor constituting the collision detection means 1 is mounted on the door outer plate 103 to enable the detection of collision of the collision object with not only the front but the side of the vehicle, exhibiting the effect that after occurrence of collision, the protective device can be rapidly operated in a short time as compared with prior art for detecting the acceleration in collision.

(Eighteenth Embodiment)

Figure 64:
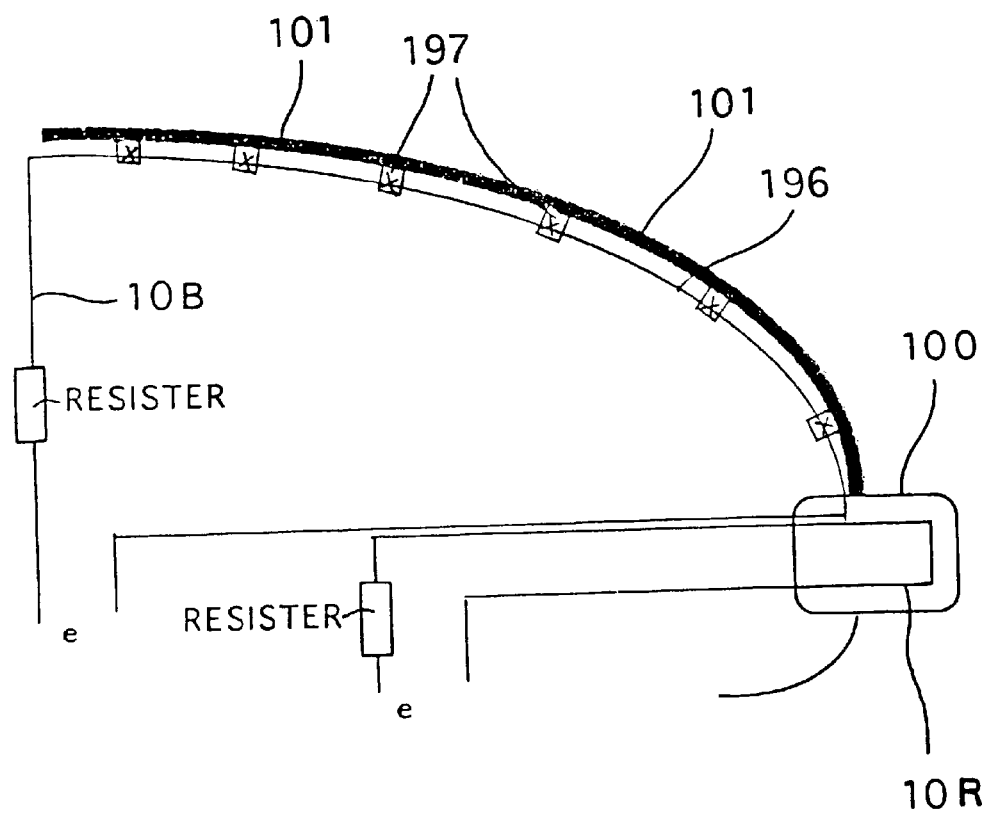
FIG. 64 is a perspective view showing the disposition form of a collision detection means in a pedestrian collision discriminating apparatus according to an eighteenth embodiment into a bumper, a fragmentary enlarged perspective view and a fragmentary plan view showing the disposition form of an moving member.

The collision discriminating apparatus for vehicles according to the 18th embodiment is different from the 14th embodiment in that as shown in FIG. 64, an electric circuit network 10B separately from that of the 14th embodiment is added to the bonnet 101.

In the 18th embodiment, the collision discriminating apparatus for vehicles according to the present invention is applied to and mounted internally of the bonnet 101 as shown in FIG. 64. A conductive wire coated with insulator 196 is mounted internally of the bonnet 101 by a bonnet mounting member 197.

The bonnet mounting member 197 is constituted to lock and restrict the conductive wire coated with insulator 196 so that the conductive wire coated with insulator is apt to be cutoff due to the deformation of the bonnet 101 caused by collision with the collision object at the time of collision.

The collision discriminating apparatus for vehicles according to the 18th embodiment constituted as described above exhibits the effect that the collision with the bonnet 101 in addition to the bumper 100 of the collision object can be also detected, and the collision area of the bonnet 101 is specified and the detection precision of the pedestrian collision can be enhanced.

(Nineteenth Embodiment)

Figure 65A:
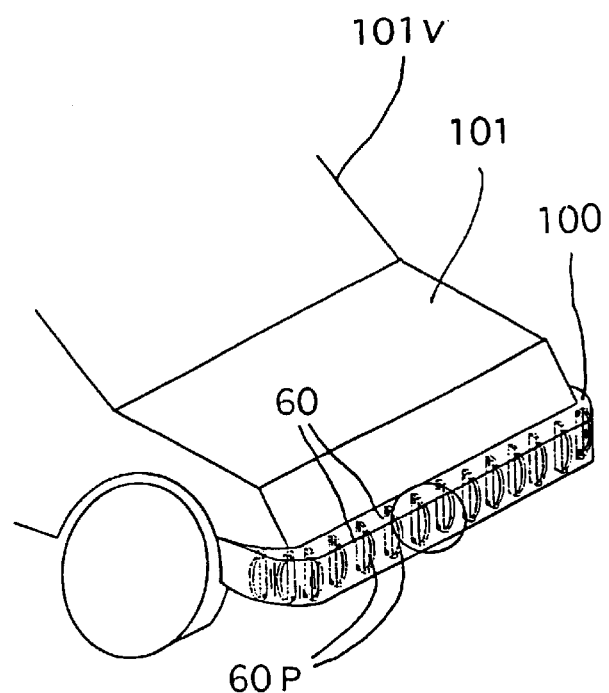
FIGS. 65A and 65B are perspective views showing the disposition form of a collision detection means in a pedestrian collision discriminating apparatus according to a nineteenth embodiment into a bumper, a fragmentary enlarged perspective view and a fragmentary plan view showing the disposition form of a moving member.
Figure 65B:
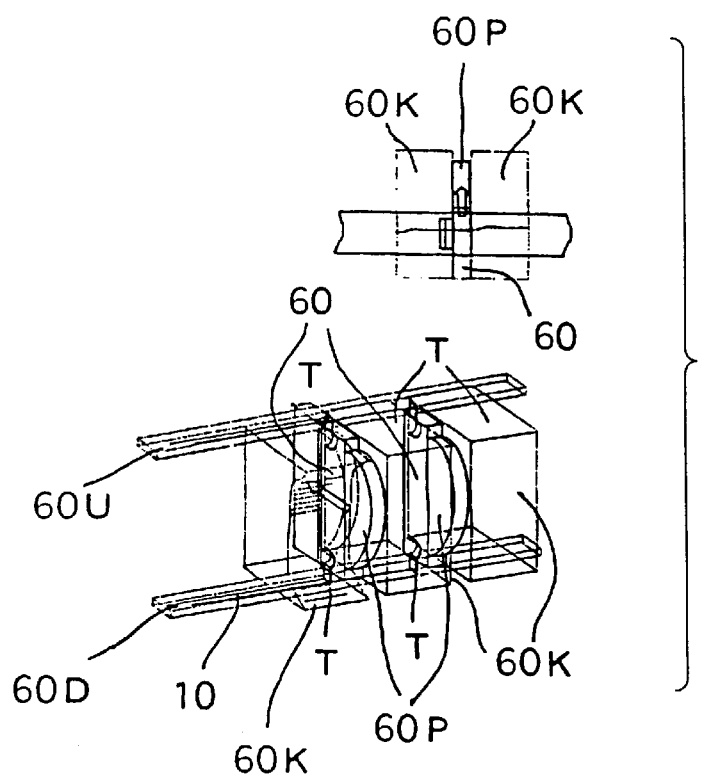

The collision discriminating apparatus for vehicles according to the $19^{th}$ embodiment is different from the previous embodiment in that as shown in FIGS. 65A and 65B, a moving member 60 is disposed which moves front and rear in a moving direction of the vehicle in order to control the connection to an electric circuit network 10R (see FIG. 64) extending in a longitudinal direction of the bumper 100 is disposed.

The moving member 60 is constituted by conductive rectangular members interposed between upper and lower terminal fixing plates 60U and 60D applied with wirings constituting the electric circuit network 10R and disposed at fixed intervals with a buffer member 60K sandwiched therebetween through a terminal T, and a semicircular pressing member 60P is disposed on the front.

A sensor constituting the collision detection means comprises a conductive moving member 60, a terminal T, a wiring constituting an electric circuit network 10R, and upper and lower terminal fixing plages 60U and 60D to form a circuit f wiring 10R—terminal T—conductive moving member 60—terminal T—wiring 10R.

In the collision discriminating apparatus for vehicles according to the 19th embodiment constituted as described above, the buffer member 60K is deformed due to the collision force at the time of collision, the conductive moving member 60 moves in a longitudinal direction (front and rear) of the vehicle, and the conductive moving member 60 is moved whereby the contact between the conductive moving member 60 and the terminal T disappears to cut off the electric circuit network 10R, thus exhibiting the effect of enabling the detection of the collision of a pedestrian with the bumper 100.

The buffering characteristics of the buffer member 60K interposed between the conductive moving members 60 adjacent to each other can be changed to cut off the circuit according to the collision force.

(Twentieth Embodiment)

Figures 66A, 66B:
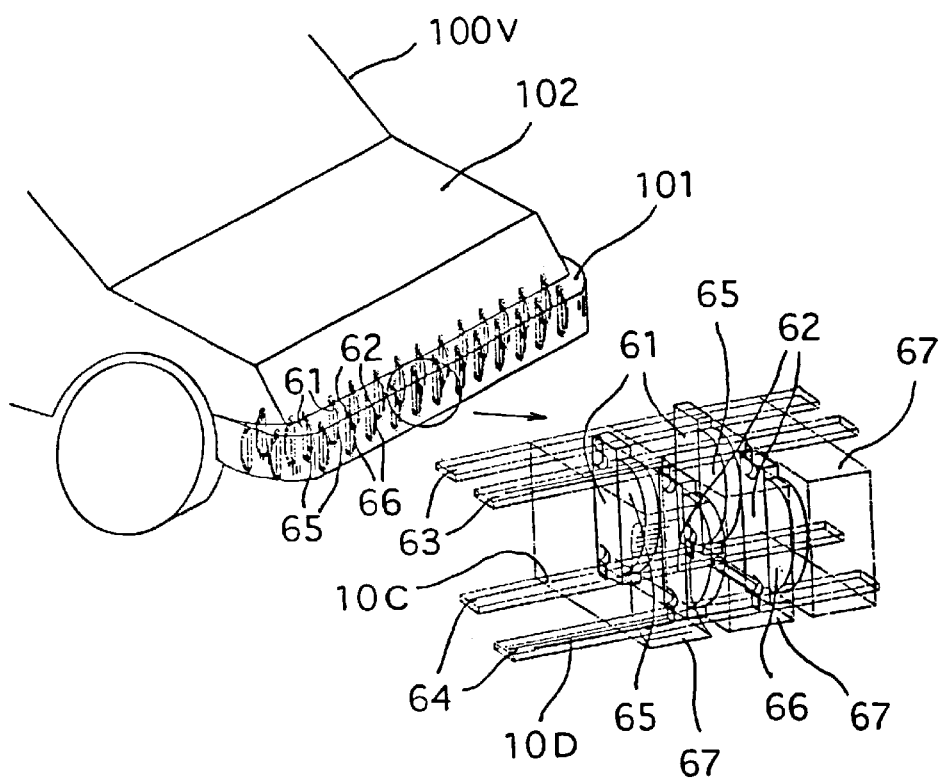
FIGS. 66A and 66B are perspective views showing the disposition form of a collision detection means in a pedestrian collision discriminating apparatus according to a twentieth embodiment into a bumper, and a fragmentary enlarged perspective view showing the disposition form of a moving member.

The collision discriminating apparatus for vehicles according to the $20^{th}$ embodiment is different from the previous embodiment in that as shown in FIGS. 66A and 66B, a plurality of moving members 61, 62 in order to control the connection to an electric circuit network extending in a longitudinal direction of the bumper 100 are juxtaposed front and rear in a moving direction of the vehicle.

The moving members 61, 62 are each constituted by a conductive rectangular member interposed between upper and lower terminal fixing plates 63 and 64 applied with wirings constituting electric circuit networks 10C, 10D and having a buffer member 67 sandwiched therebetween, and semicircular pressing members 65, 66 are disposed in the front.

In the case where the collision force of the collision object is small, the conductive rectangular member constituting the moving member 62 closed to the surface of the bumper 100 is pressed in by the pressing member 66 to cutoff the electric circuit network 10D. When the collision force becomes to be large, the conductive rectangular member constituting the moving member 61 at a deep location of the bumper is pressed in by the pressing member 65 to cutoff the electric circuit network 10C also.

In the collision discriminating apparatus for vehicles according to the 20th embodiment, a plurality of the moving members 61, 62 extending in a longitudinal direction of the bumper are juxtaposed front and rear in a moving direction of the vehicle to exhibit the effect capable of positively detecting an occurrence of collision and enhancing the discrimination precision of the collision force.

(Twenty-first Embodiment)

Figure 68:
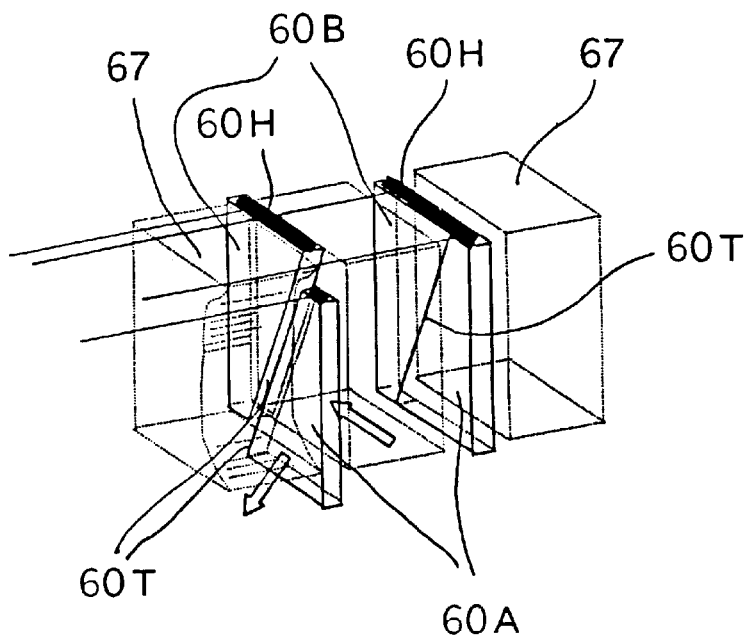
FIG. 68 is a fragmentary enlarged perspective view showing the disposition form of an moving member according to the twenty-first embodiment.

The collision discriminating apparatus for vehicles according to the 21st embodiment is different from the 19th embodiment in that as shown in FIGS. 67 and 68, front and rear members 60A, 60B formed of a trapezoidal sheet constituting a moving member 60 which moves front and rear in a moving direction of the vehicle provided with an electric circuit network extending in a longitudinal direction of the bumper 100 are disposed upside down and enabled vertical movement along the inclined engaging surface 60T.

A metal foil 60H is attached to the upper ends of the front and rear trapezoidal members 60A, 60B, the upper end of the front member 60A coincides with the upper end of the rear member 60B as shown at the right of an enlarged view of FIGS. 66A–B in a non-collision state, the metal foil 60H is continuous and two parallel wirings constituting an electric circuit network are in conduction. When the collision object collides and the front member 60A moves rearward in a moving direction, it moves downward along the inclined engaging surface 60T of the rear member 60B. Therefore, the upper end of the front member 60A does not coincide with the upper end of the rear member 60B so that the metal foil 60H becomes ruptured to be discontinuous, and the two parallel wirings 10H constituting the electric circuit network 10R is in non-conduction whereby the collision is judged.

In the collision discriminating apparatus for vehicles according to the 21st embodiment having the constitution and operation as described above, when the collision object collides, the front member 60A moves downward along the inclined engaging surface 60T of the rear member 60B. Therefore, the upper end of the front member 60A does not coincide with the upper end of the rear member 60B so that the metal foil 60H becomes ruptured to be discontinuous, and the two parallel wirings 10H constituting the electric circuit network 10R is in non-conduction to enable the collision judgement of the collision object against the bumper 100, and since the moving member 60 is formed of a trapezoidal sheet, the size of a sensor constituting a collision detection means can be made small.

(Twenty-second Embodiment)

Figure 69:
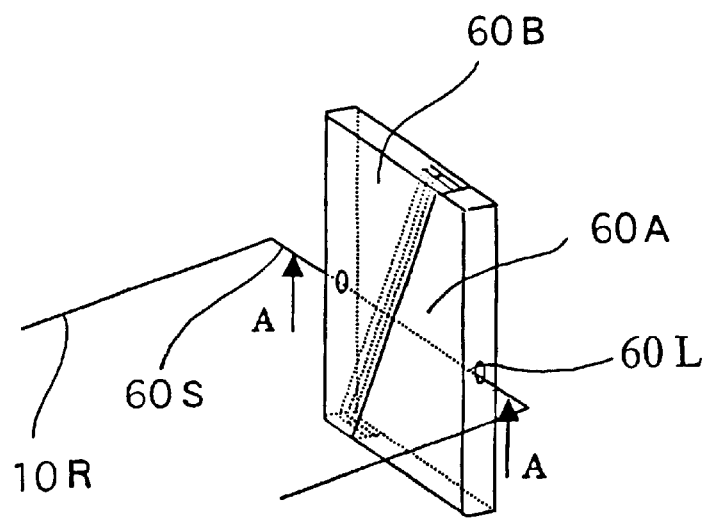
FIG. 69 is a fragmentary enlarged perspective view showing the disposition form prior to collision of an moving member of a collision detection means in a pedestrian collision discriminating apparatus according to a twenty-second embodiment.
Figure 70:
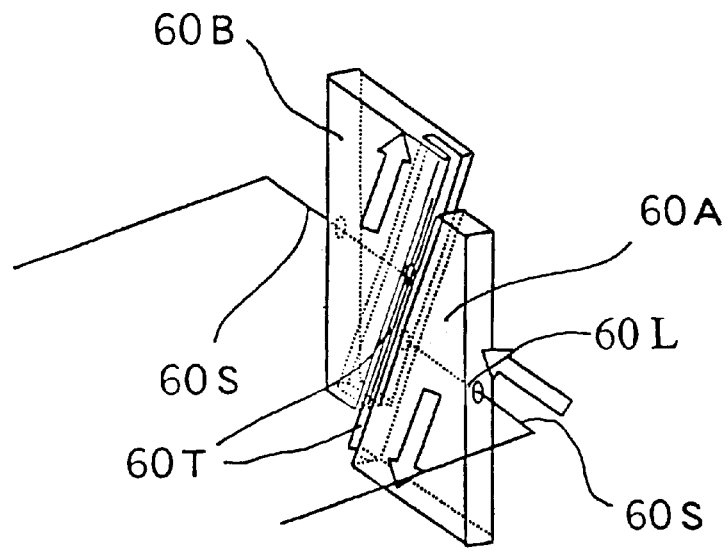
FIG. 70 is a fragmentary enlarged perspective view showing the disposition form after collision of the moving member according to a twenty-second embodiment.
Figure 71:
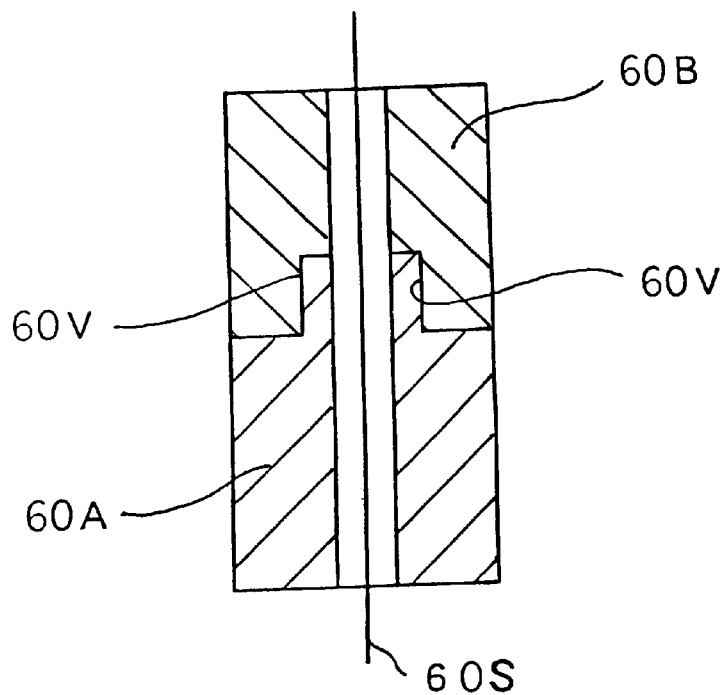
FIG. 71 is a sectional view showing the engaging relationship of two trapezoidal sheet members constituting the moving member according to a twenty-second embodiment.
Figure 72:
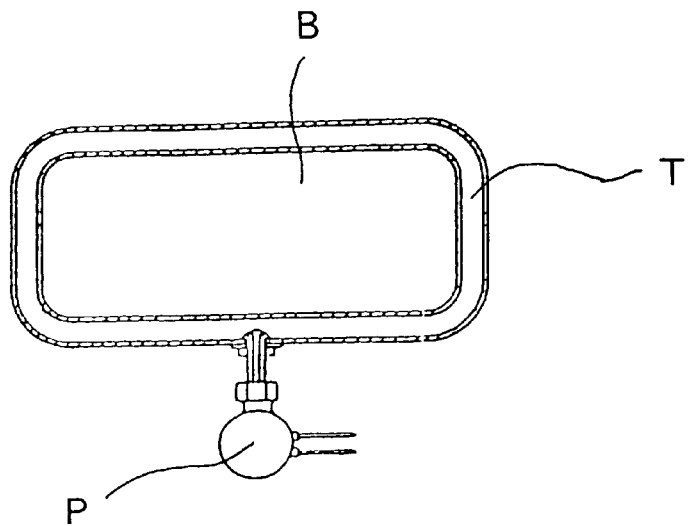
FIG. 72 is a sectional view showing a conventional collision detection device of an unmanned carrier.
Figure 74:
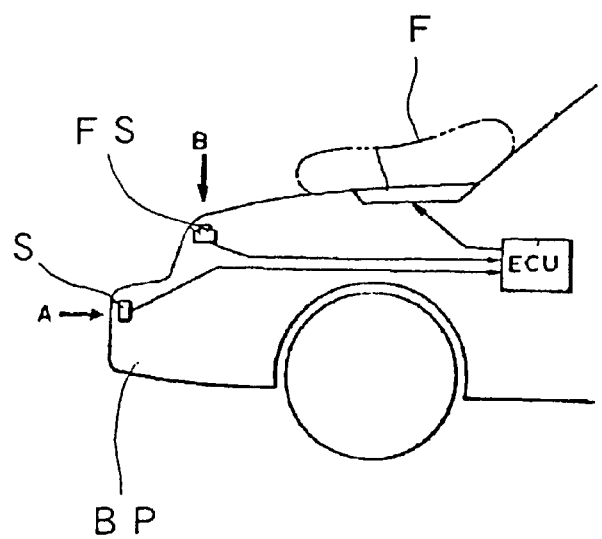
FIG. 74 is a fragmentary side view showing a conventional hood air bag sensor system.
Figure 73:
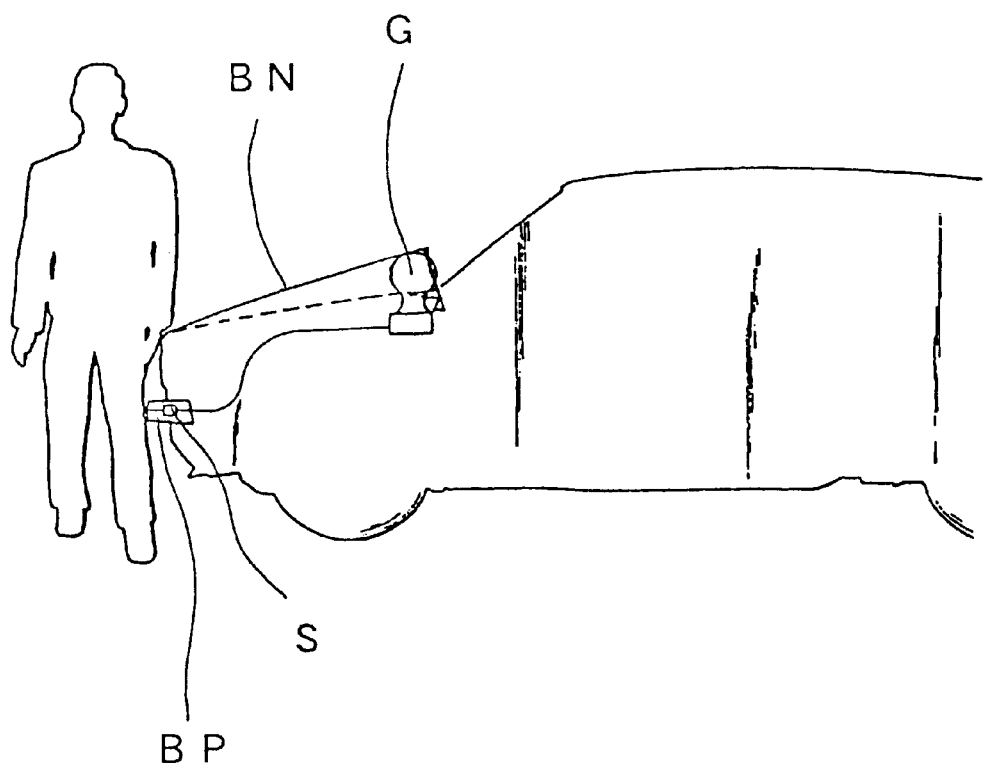
FIG. 73 is a fragmentary side view showing a conventional pedestrian protective safety device.
Figure 75:
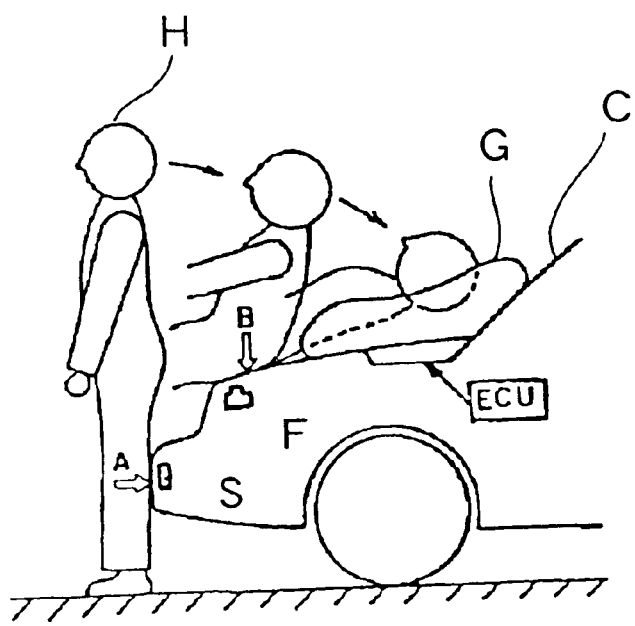
FIG. 75 is an explanatory view explaining a conventional pedestrian discriminating apparatus for vehicles.
Figure 76:
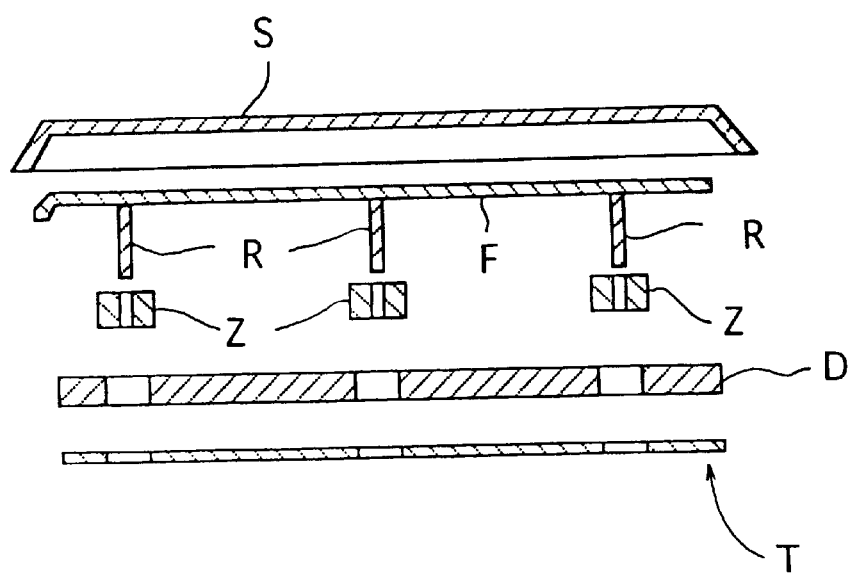
FIG. 76 is a developed sectional view showing a collision detection switch of a conventional occupant protective device for vehicles.
Figure 77:
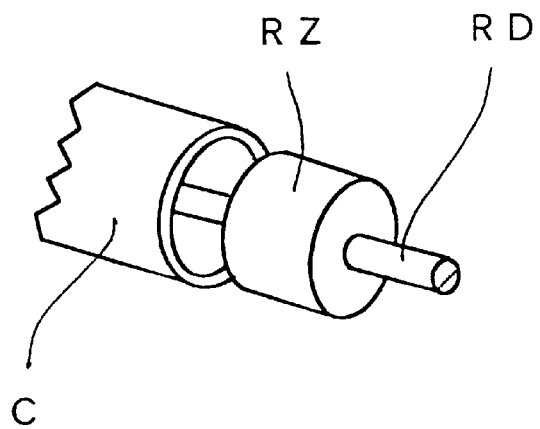
FIG. 77 is a fragmentary perspective view showing a conventional vehicle collision sensor for sensing breakage.

The collision discriminating apparatus for vehicles according to the 22nd embodiment is different from the 21st embodiment in that the metal foil 60H attached to the upper ends of front and rear members 60A, 60B formed of a trapezoidal sheet constituting an moving member 60 which moves front and rear in a moving direction of the vehicle provided with an electric circuit network extending in a longitudinal direction of the bumper 100 is changed into a conductive wire coated with insulator 60S wired in the operating bodies 60A, 60B formed of a sheet as shown in FIGS. 69 to 71.

The front and rear members 60A, 60B are disposed upside down, an inclined engaging surface 60T to enable vertical movement thereof is formed with a rectangular unevenness engaging portion 60V, a lateral hole 601, extending through the front and rear members 60A, 60B is formed, and the conductive wire coated with insulator 60S constituting the electric circuit network 10R is interposed in the lateral hole 60L.

When the collision object comes into collision with the bumper 100 at the time of collision, and when the front member 60A moves rearward in a moving direction of the vehicle, it moves downward along the inclined engaging surface 60T of the rear member 60B and the unevenness engaging portion 60V to cut the conductive wire coated with insulator 60S constituting the electric circuit network 10R interposed in the lateral hole 60L extending through the front and rear members 60A, 60B. The collision is then judged.

In the collision discriminating apparatus for vehicles according to the 22nd embodiment having the constitution and operation as described above, when the collision object collides, the front member 60A moves downward along the inclined engaging surface 60T of the rear member 60B, and the upper end of the front member 60A and the vertical position of the rear member 60B are changed whereby the conductive wire coated with insulator 60S constituting the electric circuit network 10R interposed in the lateral hole 60L extending through the front and rear members 60A, 60B is cut. This exhibits the effect of enabling the collision judgement of the collision object against the bumper 100 and forming the unevenness portion 60V on the contact surface between the two sheets 60A, 60B to provide the positive vertical movement of the sheets.

The preferred embodiments of the present invention, as herein disclosed, are taken as some embodiments for explaining the present invention. It is to be understood that the present invention should not be restricted by these embodiments and any modifications and any modifications and additions are possible so far as they are not beyond the technical idea or principle based on descriptions of the scope of the patent claims.

While in the 8th embodiment, a description is made of an example in which the electrostatic capacity change rate operation circuit 152 and the threshold-over decision circuit 153 are provided in the electrostatic capacity detection circuit of the collision detection means, as one example, the present invention is not limited thereto but a signal processing means independently of the collision detection means may be employed, and it can be provided in the collision object presuming means.

While in the second and third aspects and the 5th to 9th embodiment, a description is made of an example in which the collision detection means is constituted by the electrostatic capacity detection sensor having the dielectric interoposed between the opposed electrodes disposed opposedly at fixed intervals, the present invention is not limited thereto but any means capable of taking out, as an electric output, a deformation amount (volume change) between the opposed electrodes caused by the collision with the collision object can be employed. For example, a pressure sensitive element or an aspect for detecting an deformation amount, that is, a volume change, as an electric output by a pressure sensor filled with a liquid between the opposed electrodes caused by the collision with the collision object can be employed.

While in the 17th embodiment, a description is made of an example in which the collision detection means of the present invention is applied to the door on the side of the vehicle, the present invention is not limited thereto but it is mounted on not only the front and rear doors on the side of the vehicle but on the side of the front and rear fenders whereby the side collision part and the magnitude of collision can be presumed, and the behavior of the vehicle after the side collision trouble on the basis of these information can be predicated. For example, a secondary collision caused by a spin can be prevented.

TABLE 1

JUDGEMENT TABLE OF COLLISION STATE IN FIRST EMBODIMENT

|  | | RANK OF COLLISION STRENGTH IN C.D.M. | | | | |
|---|---|---|---|---|---|---|
|  | | A | B | C | D | E |
| VEHICLE SPEED RANK | a | | | | | |
|  | b | | | | | |
|  | c | | | | | |
|  | d | | | | | |

JUDGEMENT 4: O.P.D. is operated in urgent mode. (collision with stopped vehicle or confronted vehicle)

JUDGEMENT 3: O.P.D. is operated in normal mode. (offset collision of about ½ or rear-end collision)

JUDGEMENT 2: O.P.D. is operated slowly. (weak rear-end collision or collision against electricity pole)

JUDGEMENT 1: P.P.D. is operated. (collision with pedestrian)

C.D.M. Collision Detection Means
O.P.D. Occupant Protection Device
P.P.D. Pedestrian Protection Device

TABLE 2

JUDGEMENT TABLE OF COLLISION STATE IN SECOND EMBODIMENT (for each rank of vehicle speed)

|  | | RANK OF COLLISION STRENGTH IN S.C.D.M. | | | | |
|---|---|---|---|---|---|---|
|  | | a | b | c | d | e |
| RANK OF COLLISION STRENGTH IN F.C.D.M. | A | | | | | |
|  | B | | | | | |
|  | C | | | | | |
|  | D | | | | | |

JUDGEMENT 5: O.P.D. is operated in urgent mode. (collision with stopped vehicle or confronted vehicle)

TABLE 2-continued

JUDGEMENT TABLE OF COLLISION STATE IN SECOND EMBODIMENT (for each rank of vehicle speed)

JUDGEMENT 4: O.P.D. is operated in normal mode. (offset collision or rear-end collision)

JUDGEMENT 3: O.P.D. is operated slowly. (weak rear-end collision or collision against electricity pole)

JUDGEMENT 2: O.P.D. is operated in waiting mode. (collision with bycicle, a light vehicle, wheel chair or the like)

JUDGEMENT 1: P.P.D. is operated. (collision with pedestrian)

F.C.D.M. First Collision Detection Means
S.C.D.M. Second Collision Detection Means
O.P.D. Occupant Protection Device
P.P.D. Pedestrian Protection Device

TABLE 3

CORRECTING TABLE OF COLLISION STATE IN THIRD EMBODIMENT

|  |  | JUDGEMENT IN C.S.P.M. | | | | |
|---|---|---|---|---|---|---|
|  |  | 4 | 3 | 2 | 1 | 0 |
| DECELARATION RANK OF VEHICLE CAUSED BY COLLISION | a | 4 | 4 | 4 | 4 | 4 |
|  | b | 4 | 3 | 3 | 3 | 3 |
|  | c | 4 | 3 | 2 | 2 | 2 |
|  | d | 4 | 3 | 2 | 1 | 0 |

JUDGEMENT 4:O.P.D. is operated in urgent mode. (collision with stopped vehicle or confronted vehicle)
JUDGEMENT 3:O.P.D. is operated in normal mode. (offset collision of about 1/2 or rear-end collision)
JUDGEMENT 2:O.P.D. is operated slowly. (offset collision not more than 1/4 or collision against electricity pole)
JUDGEMENT 1:P.P.D. is operated. (collision with pedestrian)
JUDGEMENT 0:no operation (output below threshold value)
C.S.P.M. Collision State Presuming Means
O.P.D. Occupant Protection Device
P.P.D. Pedestrian Protection Device

TABLE 4

JUDGEMENT TABLE OF COLLISION STATE IN FOURTH EMBODIMENT detected collision zone / whether C.D.M. outputs signal or not / judgement of collision region

| | | | | | RANK OF COLLISION STRENGTH IN C.D.M | | | |
|---|---|---|---|---|---|---|---|---|
| 1 | 2 | 3 | | | A | B | C | D |
|  |  | O | F | | | | | |
| O |  | O | G | | | | | |
| O |  |  | H | | | | | |
| O | O |  | I | | | | | |
|  | O |  | J | | | | | |

JUDGEMENT 6: O.P.D. is operated in urgent mode. (collision with stopped vehicle or confronted vehicle)

TABLE 4-continued

JUDGEMENT TABLE OF COLLISION STATE IN FOURTH EMBODIMENT

JUDGEMENT 5: O.P.D. is operated in normal mode.
(offset collision of about ½ or rear-end collision)

JUDGEMENT 4: O.P.D. is operated slowly.
(rather weak rear-end collision)

JUDGEMENT 3: H.C.P.D. is operated slowly and F.C.P.D. in response to collision region is operated in in waiting mode
(collision with slender and long fixed object like electricity pole)

JUDGEMENT 2: P.P.D. is operated in waiting mode in response
to collision region (collision with bibycle)

JUDGEMENT 1: P.P.D. is operated in response to collision region (collision with pedestrian)

H.C.P.P. Head-on Collision Protective Device
H.C.P.P. Flank Collision Protective Device
C.D.M. Collision Detection Means
O.P.D. Occupant Protection Device
P.P.D. Pedestrian Protection Device

What is claimed is:

1. A collision discriminating apparatus for vehicles comprising:
    a collision detection means mounted on a part of a vehicle for detecting a deformed amount of a collided portion deformed by collision of a collision object against said vehicle; and
    a collision object presuming means for presuming said collision object collided against the vehicle on the basis of the deformed amount of said collided portion detected, and a vehicle speed before or when the vehicle collided,
    wherein said, collision object presuming means comprises
        a means for detecting a first output of said collision detection means when a detected signal reaches a threshold level, for detecting a second output of said collision detection means when a first predetermined time has passed after the time when said first output is detected and for comparing a difference of the first and second outputs with reference levels.

2. A collision discriminating apparatus for vehicles according to claim 1, wherein
    said collision object presuming means further comprises a means for detecting a third output of said collision detection means when a second predetermined time has passed after the time when said first output or said second output is detected and for comparing difference of the first output or second output and third output with a reference level.

3. A collision discriminating apparatus for vehicles according to claim 2, wherein
    the first and second predetermined time is predetermined in response to the vehicle speed.

4. A collision discriminating apparatus for vehicles according to claim 1, wherein
    said collision object presuming means comprises means for presuming said collision object based on a time variation of said deformed amount.

5. The collision discriminating apparatus for vehicles according to claim 1, wherein said collision object presuming means comprises means for presuming said collision object by comparing a time variation of said deformed amount with judgement reference data stored in advance.

6. A collision discriminating apparatus for vehicles according to claim 5, wherein
    said collision detection means comprises a collision detection sensor mounted in a bumper, for integrating a deformation force per unit width generated by the collision with a width in which the collision object acted on the vehicle.

7. A collision discriminating apparatus for vehicles according to claim 6, wherein
    said collision object presuming means comprises a first memory means for storing an input signal obtained by sampling at predetermined time intervals, a second memory means for storing the judgement reference data for comparison prepared at every vehicle speed, a comparison means for ranking the strength of the collision in response to the vehicle speed ranks, and a judgement means for presuming the collision object and determining a protective device and its operating modes.

8. A collision discriminating apparatus for vehicles according to claim 7, further comprising
    an acceleration sensor for detecting an acceleration of a vehicle body in order to correct the judgement result of said collision object presuming means by the detected acceleration.

9. A collision discriminating apparatus for vehicles according to claim 8, further comprising
    an acceleration memory means for storing the detected acceleration through a band pass filter, an acceleration comparison means for determining a deceleration rank of the vehicle from the filtered acceleration and a judgement correction means for correcting the judgement result by the acceleration.

10. A collision discriminating apparatus for vehicles according to claim 5, wherein
    said collision detection means comprises a first and second collision detection sensors respectively provided with detection portions in a bumper.

11. A collision discriminating apparatus for vehicles according to claim 10, wherein
    said object presuming means comprises means for comparing time variations of electric signals from said first and second collision detection sensors with the judgment reference data on the basis of a determination algorithm.

12. A collision discriminating apparatus for vehicles according to claim 5, wherein
    said collision detection means comprises a first collision detection sensor arranged on a lower side at a central portion in a bumper, a second collision detection sensor arranged on an upper side at a right hand portion in said bumper, and a third collision detection sensor arranged on an upper side at a left hand portion in said bumper.

13. A collision discriminating apparatus for vehicles comprising:
    a collision detection device mounted on a part of a vehicle and configured to detect a deformed amount of a collided portion deformed by collision of a collision object against said vehicle; and
    a collision object judging device configured to judge what type of collision object collided against the vehicle based on the deformed amount of said collided portion detected, and a vehicle speed before or when the vehicle collided with the object, wherein said collision object judging device includes a detector configured to detect a first output of said collision detection device when a detected signal reaches a threshold level, to detect a second output of said collision detection device when a first predetermined time has passed after the time when said first output is detected and to compare a difference of the first and second outputs with reference levels.

14. A collision discriminating apparatus for vehicles according to claim 13, wherein said collision object judging device judges the type of said collision object based on a time variation of said deformed amount.

15. The collision discriminating apparatus for vehicles according to claim 13, wherein said collision object judging device judges the type of said collision object by comparing a time variation of said deformed amount with judgement reference data stored in advance.

16. A collision discrimination apparatus for vehicles according to claim 15, wherein said collision detection device comprises a collision detection sensor mounted in a bumper configured to integrate deformation force per unit width generated by the collision with a width in which the collision object acted on the vehicle.

17. A collision discriminating apparatus for vehicles according to claim 16, wherein said collision object judging device comprises a first memory configured to store an input signal obtained by sampling at predetermined time intervals, a second memory configured to store the judgement reference data for comparison prepared at every vehicle speed, a comparator configured to rank the strength of the collision in response to the vehicle speed ranks, and a judgement unit configured to judge the type of collision object and to determine a protective device and its operating modes.

18. A collision discrimination apparatus for vehicles according to claim 17, further comprising an acceleration sensor configured to detect an acceleration of the vehicle body in order to correct the judgement result of said collision object judging device by the detected acceleration.

19. A collision discriminating apparatus for vehicles according to claim 18, further comprising an acceleration memory configured to store the detected acceleration through a band pass filter, an acceleration comparator configured to determine a deceleration rank of the vehicle from the filtered acceleration and a judgment correction unit configured to correct the judgement result by the acceleration.

20. A collision discriminating apparatus for vehicles according to claim 15, wherein said collision detection device comprises first and second collision detection sensors respectively provided with detection portions in a bumper.

21. A collision discriminating apparatus for vehicles according to claim 20, wherein said collision object judging device comprises a comparator configured to compare time variations of electric signals from said first and second collision detection sensor with the judgement reference data on the basis of a determination algorithm.

22. A collision discriminating apparatus for vehicles according to claim 15, wherein said collision detection device comprises a first collision detection sensor arranged on a lower side at a central portion in a bumper, a second collision detection sensor arranged on an upper side at a right hand portion in said bumper, and a third collision detection sensor arranged on an upper side at a left hand portion in said bumper.

* * * * *